(12) United States Patent
Kuhara et al.

(10) Patent No.: US 12,170,878 B2
(45) Date of Patent: Dec. 17, 2024

(54) UNMANNED MOVING BODY AND INFORMATION PROCESSING METHOD

(71) Applicant: Panasonic Intellectual Property Management Co., Ltd., Osaka (JP)

(72) Inventors: Shunsuke Kuhara, Osaka (JP); Stephen William John, Nara (JP); Kazunobu Konishi, Osaka (JP); Katsuhiko Asai, Nara (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 572 days.

(21) Appl. No.: 17/349,210

(22) Filed: Jun. 16, 2021

(65) Prior Publication Data

US 2021/0311506 A1 Oct. 7, 2021

Related U.S. Application Data

(63) Continuation of application No. PCT/JP2019/042665, filed on Oct. 30, 2019.

(30) Foreign Application Priority Data

Mar. 29, 2019 (JP) .................................. 2019-065940

(51) Int. Cl.
*G05D 1/00* (2024.01)
*B64U 101/00* (2023.01)

(52) U.S. Cl.
CPC ........... *G05D 1/12* (2013.01); *B64U 2101/00* (2023.01); *B64U 2201/20* (2023.01)

(58) Field of Classification Search
CPC ...... B64C 39/024; G05D 1/12; G05D 1/0094; B64U 2101/00; H04R 1/323; H04R 1/326;

(Continued)

(56) References Cited

U.S. PATENT DOCUMENTS

2006/0143017 A1 6/2006 Sonoura et al.
2007/0183618 A1* 8/2007 Ishii ........................ H04R 3/12
381/387

(Continued)

FOREIGN PATENT DOCUMENTS

JP 2004-34274 2/2004
JP 2005-319952 11/2005

(Continued)

OTHER PUBLICATIONS

Masaaki Takahashi et al., "TeleCoBot: a Telepresence system of taking account for conversation environment", IEICE Technical Report, vol. 114 No. 351, pp. 1-5, Dec. 4, 2014 (with English translation) (Year: 2014).*

(Continued)

*Primary Examiner* — Bao Long T Nguyen
(74) *Attorney, Agent, or Firm* — Wenderoth, Lind & Ponack, L.L.P.

(57) ABSTRACT

An unmanned moving body includes a directional speaker that outputs sound in an orientation direction and a processor that obtains one or more instances of sensing data. The processor: determines whether or not a second target is present in a vicinity of a first target in accordance with at least one of the one or more instances of sensing data; calculates a positional relationship between the first target and the second target when it is determined that the second target is present; and determines a first position of the unmanned moving body in accordance with the positional relationship and causes the unmanned moving body to move to the first position, the first position being a position that places the first target and the second target within a range over which the sound from the directional speaker reaches at at least a predetermined quality.

14 Claims, 59 Drawing Sheets

(58) Field of Classification Search
CPC .. H04R 2430/20; H04S 2400/15; H04S 7/303
See application file for complete search history.

(56) References Cited

U.S. PATENT DOCUMENTS

| | | |
|---|---|---|
| 2011/0235807 A1 | 9/2011 | Hayashi et al. |
| 2017/0220036 A1* | 8/2017 | Visser ................. H04R 29/004 |
| 2019/0082281 A1* | 3/2019 | Beran ..................... H04S 7/30 |

FOREIGN PATENT DOCUMENTS

| | | | |
|---|---|---|---|
| JP | 2006-181651 | | 7/2006 |
| JP | 2011-223549 | | 11/2011 |
| JP | 2012-76162 | | 4/2012 |
| JP | 2012076162 A | * | 4/2012 |
| JP | 2019-505047 | | 2/2019 |
| JP | 2019-36174 | | 3/2019 |
| JP | 2019036174 A | * | 3/2019 |
| WO | 2005/076661 | | 8/2005 |
| WO | 2017/131845 | | 8/2017 |

OTHER PUBLICATIONS

International Search Report (ISR) issued on Jan. 21, 2020 in International (PCT) Application No. PCT/JP2019/042665.
Masaaki Takahashi et al., "TeleCoBot: a Telepresence system of taking account for conversation environment", IEICE Technical Report, vol. 114 No. 351, pp. 1-5, Dec. 4, 2014 (with English translation).

\* cited by examiner

| Sound pressure of sound source | Sound pressure at location distanced from sound source | | |
|---|---|---|---|
| | 2 m | 4 m | 8 m |
| 56 dB | 50 dB | 44 dB | 38 dB |
| 62 dB | 56 dB | 50 dB | 44 dB |
| 68 dB | 62 dB | 56 dB | 50 dB |

Range over which sound reaches at 50 dB or higher

Conversation partner and related person

| Distance between conversation partner and related person | Sound pressure of sound emitted by unmanned moving body | Sound emission range extending in sound emission direction from unmanned moving body |
|---|---|---|
| 0 m~1.5 m → | 56 dB | Directional width × 2 m |
| 1.5 m~3.5 m → | 62 dB | Directional width × 4 m |
| 3.5 m~7.5 m → | 68 dB | Directional width × 8 m |

FIG. 10
| Sound source | 2 m | 4 m | 8 m | 16 m |
|---|---|---|---|---|
| 60 dB | 54 dB | 48 dB | 42 dB | 36 dB |
| 70 dB | 64 dB | 58 dB | 52 dB | 46 dB |
Range over which sound reaches at 46 to 54 dB
⇒ 2~5 m : 3 m
⇒ 6~16 m : 10 m
Range over which sound reaches at 46 to 54 dB
FIG. 11
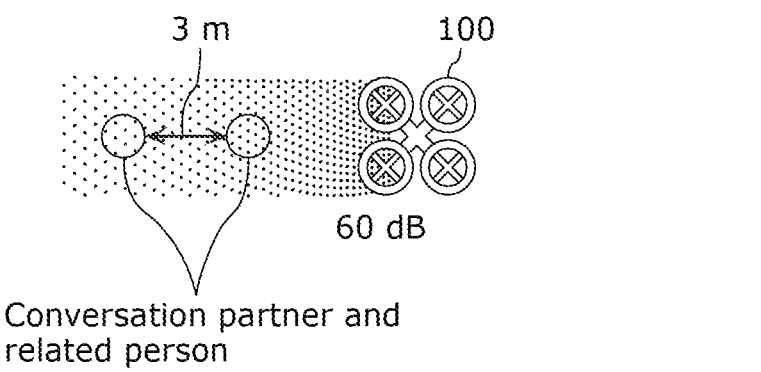
3 m    100
60 dB
Conversation partner and related person
FIG. 12
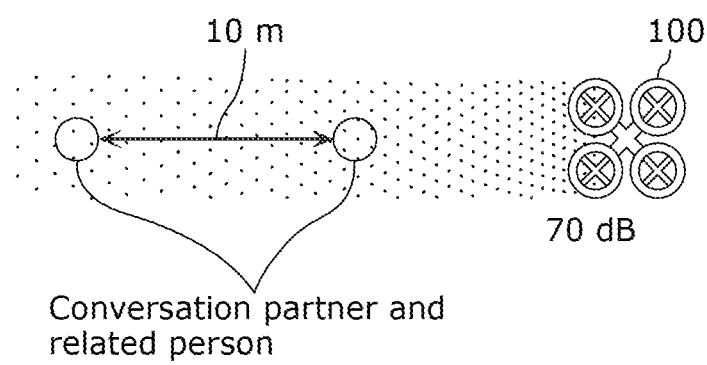
10 m    100
70 dB
Conversation partner and related person Front side Front side Related person  Conversation partner Related person  Conversation partner Move

UNMANNED MOVING BODY AND INFORMATION PROCESSING METHOD

CROSS REFERENCE TO RELATED APPLICATIONS

This is a continuation application of PCT International Application No. PCT/JP2019/042665 filed on Oct. 30, 2019, designating the United States of America, which is based on and claims priority of Japanese Patent Application No. 2019-065940 filed on Mar. 29, 2019. The entire disclosures of the above-identified applications, including the specifications, drawings and claims are incorporated herein by reference in their entirety.

FIELD

The present disclosure relates to an unmanned moving body and the like.

BACKGROUND

PTL 1 proposes a sound emission control device that controls the state of sound emission from a moving body to the exterior. PTL 1 discloses setting a direction corresponding to a recognized position of a detected object as a direction in which sound is to be emitted.

CITATION LIST

Patent Literature

PTL 1: Japanese Unexamined Patent Application Publication No. 2005-319952

SUMMARY

Technical Problem

However, in the case of sound emission or sound collection for a plurality of targets, it may be difficult to perform sound emission or sound collection for the plurality of targets in an integrated manner only by controlling the direction of sound.

Accordingly, an object of the present disclosure is to provide an unmanned moving body that can perform sound emission or sound collection for a plurality of targets in an integrated manner.

Solution to Problem

For example, an unmanned moving body according to one aspect of the present disclosure is an unmanned moving body including a directional speaker that outputs sound in an orientation direction and a processor that obtains one or more instances of sensing data. The processor: determines whether or not a second target is present in a vicinity of a first target in accordance with at least one of the one or more instances of sensing data; calculates a positional relationship between the first target and the second target from at least one of the one or more instances of sensing data when it is determined that the second target is present; and determines a first position of the unmanned moving body in accordance with the positional relationship and causes the unmanned moving body to move to the first position, the first position being a position that places the first target and the second target within a range over which the sound from the directional speaker reaches at at least a predetermined quality.

Additionally, for example, an unmanned moving body according to one aspect of the present disclosure is an unmanned moving body including a directional microphone that collects sound from an orientation direction and a processor that obtains one or more instances of sensing data including data obtained from the directional microphone. The processor: determines whether or not a second target is present in a vicinity of a first target in accordance with at least one of the one or more instances of sensing data; calculates a positional relationship between the first target and the second target from at least one of the one or more instances of sensing data when it is determined that the second target is present; and determines a first position of the unmanned moving body in accordance with the positional relationship and causes the unmanned moving body to move to the first position, the first position being a position that places the first target and the second target within a range over which the sound is collected by the directional microphone at at least a predetermined quality.

Note that these comprehensive or specific aspects may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

Advantageous Effects

An unmanned moving body and the like according to one aspect of the present disclosure can perform sound emission or sound collection for a plurality of targets in an integrated manner.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a data chart illustrating a relationship between the sound pressure of the sound source and a range over which sound reaches at a sound pressure in a predetermined range, according to Embodiment 1.

FIG. 11 is a conceptual diagram illustrating a case where the separation distance between a conversation partner and a related person is 3 m, according to Embodiment 1.

FIG. 12 is a conceptual diagram illustrating a case where the separation distance between a conversation partner and a related person is 10 m, according to Embodiment 1.

Figure 1:
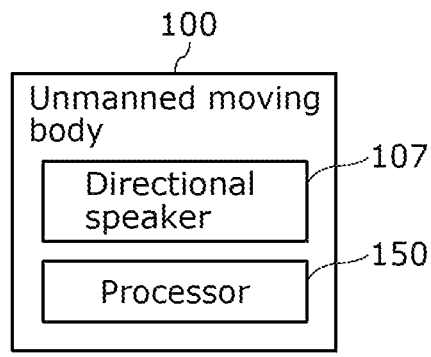
FIG. 1 is a block diagram illustrating an example of the basic configuration of an unmanned moving body according to Embodiment 1.

DESCRIPTION OF EMBODIMENTS (Underlying Knowledge Forming Basis of the Present Disclosure)

Providing an unmanned moving body with a microphone (a mic) and a speaker to converse with a person is being investigated. The unmanned moving body may be a robot, or an unmanned aircraft, also called a "drone". Additionally, the unmanned moving body may converse with a person having itself identified the details of the conversation using artificial intelligence (AI) or the like provided in the unmanned moving body. Alternatively, a remote operator, remote administrator, or the like of the unmanned moving body may converse with another person, different from the remote operator or the remote administrator, using the unmanned moving body.

An unmanned aircraft flies by rotating propellers at high speeds, and thus has a characteristic of producing a large amount of flight sound. Thus in consideration of this flight sound, during a conversation with a person, the unmanned aircraft emits sound at a high volume. As a result, the unmanned aircraft can ensure the person conversing with the unmanned aircraft recognizes the sound emitted by the unmanned aircraft. On the other hand, loud sounds emitted by the unmanned aircraft will be unpleasant to people in the vicinity of the person conversing with the unmanned aircraft.

To suppress such negative effects, rather than simply increasing the volume, a directional speaker may be used so that the sound emitted by the unmanned aircraft only reaches the person conversing with the unmanned aircraft. In this case, the directional speaker is oriented toward the person conversing with the unmanned aircraft. As a result, the person conversing with the unmanned aircraft can hear the sound emitted by the unmanned aircraft.

Furthermore, a directional mic may be used so that loud flight sound does not enter the mic as noise and only sound from the person conversing with the unmanned aircraft enters the mic. In this case, the directional mic is oriented toward the person conversing with the unmanned aircraft. As a result, the unmanned aircraft can recognize the sound emitted by the person conversing with the unmanned aircraft.

However, it is not always the case that only a single person is conversing with the unmanned aircraft. For example, there are cases where a conversation partner conversing with an unmanned aircraft converses with the unmanned aircraft together with a related person related to the conversation partner, such as a friend or family member of the conversation partner, a colleague at the company of the conversation partner, or the like. In such a case, if the unmanned aircraft emits sound only to the conversation partner, it will be difficult for a related person present in the vicinity of the conversation partner to hear the sound emitted by the unmanned aircraft. Additionally, if the mic is simply oriented toward the conversation partner, it will be difficult for the unmanned aircraft to appropriately collect sound emitted by a related person present in the vicinity of the conversation partner.

It is therefore difficult for a related person to enter into a conversation between an unmanned aircraft and a conversation partner, and for a conversation to be established among the unmanned aircraft, the conversation partner, and the related person, Such negative effects are not limited to unmanned aircraft, and can also arise in an unmanned moving body aside from an unmanned aircraft.

Accordingly, for example, an unmanned moving body according to one aspect of the present disclosure is an unmanned moving body including a directional speaker that outputs sound in an orientation direction and a processor that obtains one or more instances of sensing data. The processor: determines whether or not a second target is present in a vicinity of a first target in accordance with at least one of the one or more instances of sensing data; calculates a positional relationship between the first target and the second target from at least one of the one or more instances of sensing data when it is determined that the second target is present; and determines a first position of the unmanned moving body in accordance with the positional relationship and causes the unmanned moving body to move to the first position, the first position being a position that places the first target and the second target within a range over which the sound from the directional speaker reaches at at least a predetermined quality.

Through this, the unmanned moving body can emit sound appropriately to the first target and the second target. In other words, the unmanned moving body can emit sound for a plurality of targets in an integrated manner.

Additionally, for example, an unmanned moving body according to one aspect of the present disclosure is an unmanned moving body including a directional microphone that collects sound from an orientation direction and a processor that obtains one or more instances of sensing data including data obtained from the directional microphone. The processor: determines whether or not a second target is present in a vicinity of a first target in accordance with at least one of the one or more instances of sensing data; calculates a positional relationship between the first target and the second target from at least one of the one or more instances of sensing data when it is determined that the second target is present; and determines a first position of the unmanned moving body in accordance with the positional relationship and causes the unmanned moving body to move to the first position, the first position being a position that places the first target and the second target within a range over which the sound is collected by the directional microphone at at least a predetermined quality.

Through this, the unmanned moving body can collect sound appropriately from the first target and the second target. In other words, the unmanned moving body can collect sound from a plurality of targets in an integrated manner.

Additionally, for example, the processor adjusts the range in accordance with the positional relationship, and determines the first position in accordance with the range that has been adjusted.

Through this, the unmanned moving body can appropriately adjust the range of sound emission or sound collection in accordance with the positional relationship, and can appropriately include a plurality of targets in the adjusted range.

Additionally, for example, the first position is a position on a front side of the first target and the second target.

Through this, the unmanned moving body can move to an appropriate position for conversing with a plurality of targets.

Additionally, for example, the processor obtains body information of the first target and body information of the second target in accordance with at least one of the one or more instances of sensing data, and determines the first position in accordance with the body information of the first target and the body information of the second target.

Through this, the unmanned moving body can move to a position appropriate with respect to the body information of the first target and the body information of the second target.

Additionally, for example, the processor estimates at least one of an age of the first target or an age of the second target in accordance with at least one of the one or more instances of sensing data, and determines the first position in accordance with at least one of the age of the first target or the age of the second target.

Through this, the unmanned moving body can move to an appropriate position in accordance with the age, and can appropriately emit sound to or collect sound from a plurality of targets.

Additionally, for example, the processor determines the first position to be a position that does not place a third target unrelated to the first target and the second target within the range.

Through this, the unmanned moving body can suppress a situation in which sound is emitted to or collected from a third target which is unrelated.

Additionally, for example, the processor detects a position of an obstruction in accordance with at least one of the one or more instances of sensing data, and determines the first position in accordance with the position of the obstruction.

Through this, the unmanned moving body can appropriately determine a position for emitting sound to or collecting sound from a plurality of targets in accordance with the position of an obstruction. Then, the unmanned moving body can use the obstruction to suppress a situation in which sound is emitted to or collected from a third target which is unrelated.

Additionally, for example, when it is determined that the second target is present during a period in which sound is being emitted to or collected from the first target, the processor causes the unmanned moving body to move to the first position in a state in which the first target is within the range.

Through this, the unmanned moving body can move to a position appropriate for conversing with the first target and the second target while continuing a conversation with the first target.

Additionally, for example, when it is determined that the second target is present during a period in which sound is being emitted to or collected from the first target, the processor causes the unmanned moving body to move to the first position by passing on a front side of the first target.

Through this, the unmanned moving body can move to a position appropriate for conversing with the first target and the second target by passing through a region appropriate for having a conversation with the first target.

Additionally, for example, when it is determined that the second target is present during a period in which sound is being emitted to or collected from the first target, the processor causes the unmanned moving body to move to the first position while maintaining a constant quality of sound emitted to or collected from the first target.

Through this, the unmanned moving body can move to a position appropriate for conversing with the first target and the second target while appropriately continuing a conversation with the first target.

Additionally, for example, the second target is a target related to the first target, and the processor: obtains at least one of information indicating a relationship with the first target or information indicating a relationship with the unmanned moving body from at least one of the one or more instances of sensing data; and determines whether or not the second target is present in the vicinity of the first target by determining whether or not a target present in the vicinity of the first target is related to the first target in accordance with the at least one of the information indicating a relationship with the first target or the information indicating a relationship with the unmanned moving body.

Through this, the unmanned moving body can appropriately determine whether or not a second target related to the first target is present in the vicinity of the first target.

Additionally, for example, the processor detects a frequency at which the first target emits sound and a frequency at which the second target emits sound in accordance with at least one of the one or more instances of sensing data, and determines the first position in such a manner that the first position is closer to one of the first target and the second target that emits sound at a higher frequency than an other of the first target and the second target.

Through this, the unmanned moving body can move close to a target that emits sound at a high frequency. Accordingly, the unmanned moving body can collect sound appropriately from the target that emits sound at a high frequency.

Additionally, for example, the processor detects a volume of the first target and a volume of the second target in accordance with at least one of the one or more instances of sensing data, and determines the first position in such a manner that the first position is closer to one of the first target and the second target having a lower volume than an other of the first target and the second target.

Through this, the unmanned moving body can move close to a target that has a low volume. Accordingly, the unmanned moving body can collect sound appropriately from the target that has a low volume.

Additionally, for example, the unmanned moving body further includes a directional microphone, and the range is also a range over which sound is collected by the directional microphone at at least a predetermined quality.

Through this, the unmanned moving body can emit sound appropriately to the first target and the second target, and can collect sound appropriately from the first target and the second target.

Additionally, for example, the processor controls a timing of movement of the unmanned moving body in accordance with a conversation between the first target and the unmanned moving body.

Through this, the unmanned moving body can move at an appropriate timing based on the conversation.

Additionally, for example, the processor causes the unmanned moving body to move to the first position during a period in which sound is being collected from the first target.

Through this, the unmanned moving body can move during a period in which it is assumed that the first target is emitting sound and the unmanned moving body is not emitting sound. Accordingly, the unmanned moving body can suppress situations in which the second target enters the range of sound emission while sound is being emitted, and can ensure all content of the sound emission reaches the second target.

Additionally, for example, when sound emitted from the first target has stopped during the movement of the unmanned moving body, the processor causes the directional speaker to emit sound after the movement of the unmanned moving body is complete.

Through this, the unmanned moving body can start emitting sound after moving to a position appropriate for emitting sound to the first target and the second target. Accordingly, the unmanned moving body can suppress situations in which the second target enters the range of sound emission while sound is being emitted, and can ensure all content of the sound emission reaches the second target.

Additionally, for example, the processor causes the unmanned moving body to move during a period in which no sound is being emitted to or collected from the first target.

Through this, the unmanned moving body can suppress fragmentation of the sound, and can emit or collect sound in complete units. The unmanned moving body can also suppress situations in which noise produced by movement is intermixed.

Additionally, for example, the one or more instances of sensing data include image data generated by an image sensor, and the processor obtains the positional relationship in accordance with the image data generated by the image sensor.

Through this, the unmanned moving body can appropriately obtain the positional relationship between the first target and the second target in accordance with the image data.

Additionally, for example, the one or more instances of sensing data include range data generated by a range sensor, and the processor obtains the positional relationship in accordance with the range data generated by the range sensor.

Through this, the unmanned moving body can appropriately obtain the positional relationship between the first target and the second target in accordance with the range data.

Additionally, for example, the positional relationship includes at least one of a distance or a position pertaining to the first target and the second target.

Through this, the unmanned moving body can move to an appropriate position in accordance with the distance or the position pertaining to the first target and the second target.

Additionally, for example, an information processing method according to one aspect of the present disclosure includes: obtaining one or more instances of sensing data; determining whether or not a second target is present in a vicinity of a first target in accordance with at least one of the one or more instances of sensing data; calculating a positional relationship between the first target and the second target from at least one of the one or more instances of sensing data when it is determined that the second target is present; and determining a first position of an unmanned moving body in accordance with the positional relationship and causes the unmanned moving body to move to the first position, the first position being a position that places the first target and the second target within a range over which sound from a directional speaker included in the unmanned moving body reaches at at least a predetermined quality.

Through this, sound can be emitted appropriately to the first target and the second target by performing the information processing method. In other words, sound can be emitted to a plurality of targets in an integrated manner.

Additionally, for example, a program according to one aspect of the present disclosure causes a computer to execute the information processing method.

Through this, sound can be emitted appropriately to the first target and the second target by executing the program. In other words, sound can be emitted to a plurality of targets in an integrated manner.

Additionally, for example, an information processing method according to one aspect of the present disclosure includes: obtaining one or more instances of sensing data; determining whether or not a second target is present in a vicinity of a first target in accordance with at least one of the one or more instances of sensing data; calculating a positional relationship between the first target and the second target from at least one of the one or more instances of sensing data when it is determined that the second target is present; and determining a first position of an unmanned moving body in accordance with the positional relationship and causes the unmanned moving body to move to the first position, the first position being a position that places the first target and the second target within a range over which sound is collected by a directional microphone included in the unmanned moving body at at least a predetermined quality.

Through this, sound can be collected appropriately from the first target and the second target by performing the information processing method. In other words, sound can be collected from a plurality of targets in an integrated manner.

Additionally, for example, a program according to one aspect of the present disclosure causes a computer to execute the information processing method.

Through this, sound can be collected appropriately from the first target and the second target by executing the program. In other words, sound can be collected from a plurality of targets in an integrated manner.

Furthermore, these comprehensive or specific aspects of the present disclosure may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

Embodiments will be described in detail hereinafter with reference to the drawings, Note that the following embodiments describe comprehensive or specific examples of the present disclosure. The numerical values, shapes, materials, constituent elements, arrangements and connection states of constituent elements, steps, orders of steps, and the like in the following embodiments are merely examples, and are not intended to limit the scope of claims, Additionally, of the constituent elements in the following embodiments, constituent elements not denoted in the independent claims, which express the broadest interpretation, will be described as optional constituent elements.

Additionally, in the following descriptions, ordinals such as first, second, and third may be appended to elements. These ordinals are appended to the elements in order to identify the elements, and do not necessarily correspond to any meaningful order. These ordinals may be replaced, newly added, or removed as appropriate.

Additionally, in the following descriptions, "sound pressure" may be read as "sound pressure level" or "volume", and "volume" may be read as "sound pressure" or "sound pressure level". Furthermore, "conversation" may be read as "communication".

Embodiment 1

FIG. 1 is a block diagram illustrating an example of the basic configuration of an unmanned moving body according to the present embodiment. FIG. 1 illustrates unmanned moving body 100, which includes directional speaker 107 and processor 150.

Unmanned moving body 100 is a device that moves. For example, unmanned moving body 100 moves or stops autonomously, Unmanned moving body 100 may move according to an operation upon being subjected to such an operation, Although typically an unmanned aircraft, unmanned moving body 100 is not limited to an unmanned aircraft, and may be a device that travels on a surface, Unmanned moving body 100 may include a movement mechanism, such as a motor, an actuator, and the like, for moving through the air or on a surface.

Additionally, unmanned moving body 100 may include one or more sensors. For example, unmanned moving body 100 may include an image sensor, a range sensor, a microphone serving as a sound sensor, a person detection sensor, a position detector serving as a position sensor, and so on.

Directional speaker 107 is a speaker that emits sound in an orientation direction. The orientation direction of directional speaker 107 may be adjustable, and a sound pressure of the sound emitted by directional speaker 107 may be adjustable. The orientation direction of directional speaker 107 may also be referred to as a "sound emission direction".

Processor 150 is constituted by circuitry that processes information. For example, processor 150 may control the movement of unmanned moving body 100. Specifically, processor 150 may control the movement of unmanned moving body 100 by controlling the operations of a movement mechanism, such as a motor, an actuator, and the like, for moving through the air or on a surface.

Additionally, processor 150 may adjust the orientation direction of directional speaker 107, and may adjust the sound pressure of the sound emitted by directional speaker 107, by sending control signals to directional speaker 107. Additionally, processor 150 may adjust the orientation direction of directional speaker 107 by adjusting an orientation of unmanned moving body 100.

Figure 2:
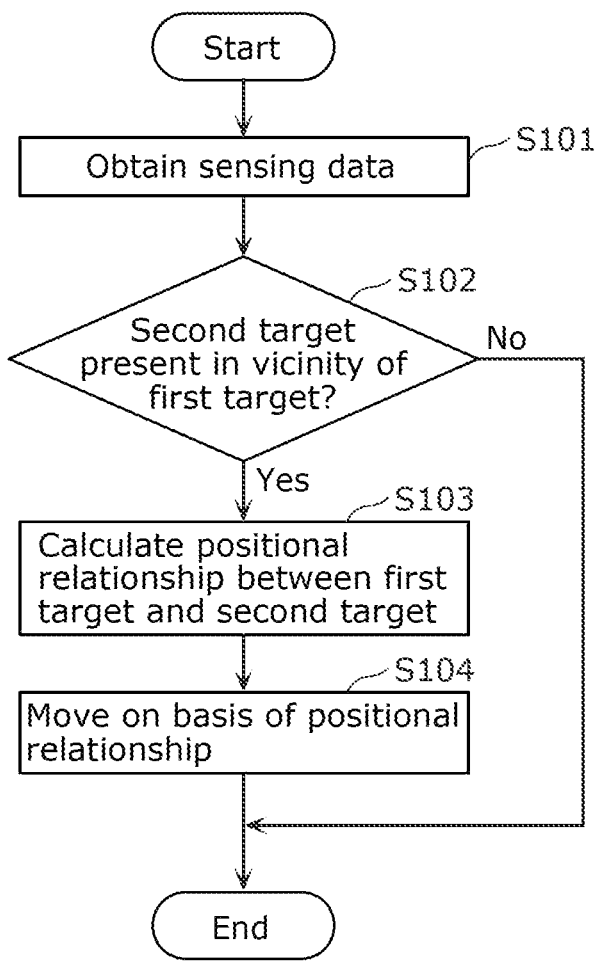
FIG. 2 is a flowchart illustrating an example of the basic operations of the unmanned moving body according to Embodiment 1.

FIG. 2 is a flowchart illustrating an example of the basic operations of unmanned moving body 100 illustrated in FIG. 1. The operations illustrated in FIG. 2 are mainly performed by processor 150 of unmanned moving body 100.

First, processor 150 obtains one or more instances of sensing data (S101). Processor 150 may obtain the one or more instances of sensing data from one or more sensors within unmanned moving body 100, or may obtain the one or more instances of sensing data from one or more sensors outside unmanned moving body 100. Additionally, processor 150 may obtain a plurality of instances of sensing data from one or more sensors within unmanned moving body 100 and one or more sensors outside unmanned moving body 100.

For example, an image sensor, a range sensor, a microphone, a person detection sensor, a position detector, and the like may be used as the one or more sensors outside unmanned moving body 100.

Then, processor 150 determines whether or not a second target is present in a vicinity of a first target in accordance with at least one of the one or more instances of sensing data that have been obtained (S102). For example, the first target is a conversation partner, and the second target is a related person related to the conversation partner. However, the first target and the second target are not limited to people, and may be animals or devices. Note that the "vicinity" of the first target is a predetermined range based on the first target.

Then, processor 150 calculates a positional relationship between the first target and the second target from the at least one of the one or more instances of sensing data when it is determined that the second target is present in the vicinity of the first target (S103). In other words, processor 150 calculates a positional relationship between the first target and the second target from at least one of the one or more instances of sensing data.

For example, the positional relationship includes at least one of a position or a distance related to the first target and the second target. The positional relationship may include the positions of both the first target and the second target, and may include a distance between the first target and the second target.

Specifically, processor 150 may calculate the position of the first target, the position of the second target, the distance between the first target and the second target, and the like using image data obtained from the image sensor, Additionally, processor 150 may calculate a distance between unmanned moving body 100 and the first target, a distance between unmanned moving body 100 and the second target, the distance between the first target and the second target, and the like using range data obtained from the range sensor.

Processor 150 then determines a first position in accordance with the positional relationship that has been calculated. The first position is a position of unmanned moving body 100 at which the first target and the second target are within a range over which sound from directional speaker 107 reaches at at least a predetermined quality. Processor 150 then causes unmanned moving body 100 to move to the first position that has been determined (S104).

As a result, unmanned moving body 100 can emit sound appropriately to the first target and the second target. In other words, unmanned moving body 100 can emit sound for a plurality of targets in an integrated manner.

For example, the second target is a target related to the first target. Then, processor 150 may determine whether or not a target present in the vicinity of the first target is related to the first target in accordance with at least one of the one or more instances of sensing data, Through this, processor 150 may determine whether or not the second target is present in the vicinity of the first target.

At this time, processor 150 may obtain at least one of information indicating a relationship with the first target or information indicating a relationship with unmanned moving body 100 from at least one of the one or more instances of sensing data. Then, processor 150 may determine whether or not the target present in the vicinity of the first target is related to the first target in accordance with at least one of the information indicating a relationship with the first target or the information indicating a relationship with unmanned moving body 100.

Specifically, processor 150 may determine that the target present in the vicinity of the first target is related to the first target when the target present in the vicinity of the first target satisfies at least one of a plurality of conditions.

The plurality of conditions may include, for example, "is in contact with the first target", "is conversing with the first target", "is present at a distance of no greater than a threshold from the first target", "has the same clothing as the first target", "is present with the first target in a predetermined area", "is associated with the first target", "is approaching the first target", "is present within a range over which the first target's voice reaches", "is talking to unmanned moving body 100 while the first target and unmanned moving body 100 are conversing", "is looking at unmanned moving body 100 while the first target and unmanned moving body 100 are conversing", and the like.

Figure 3:
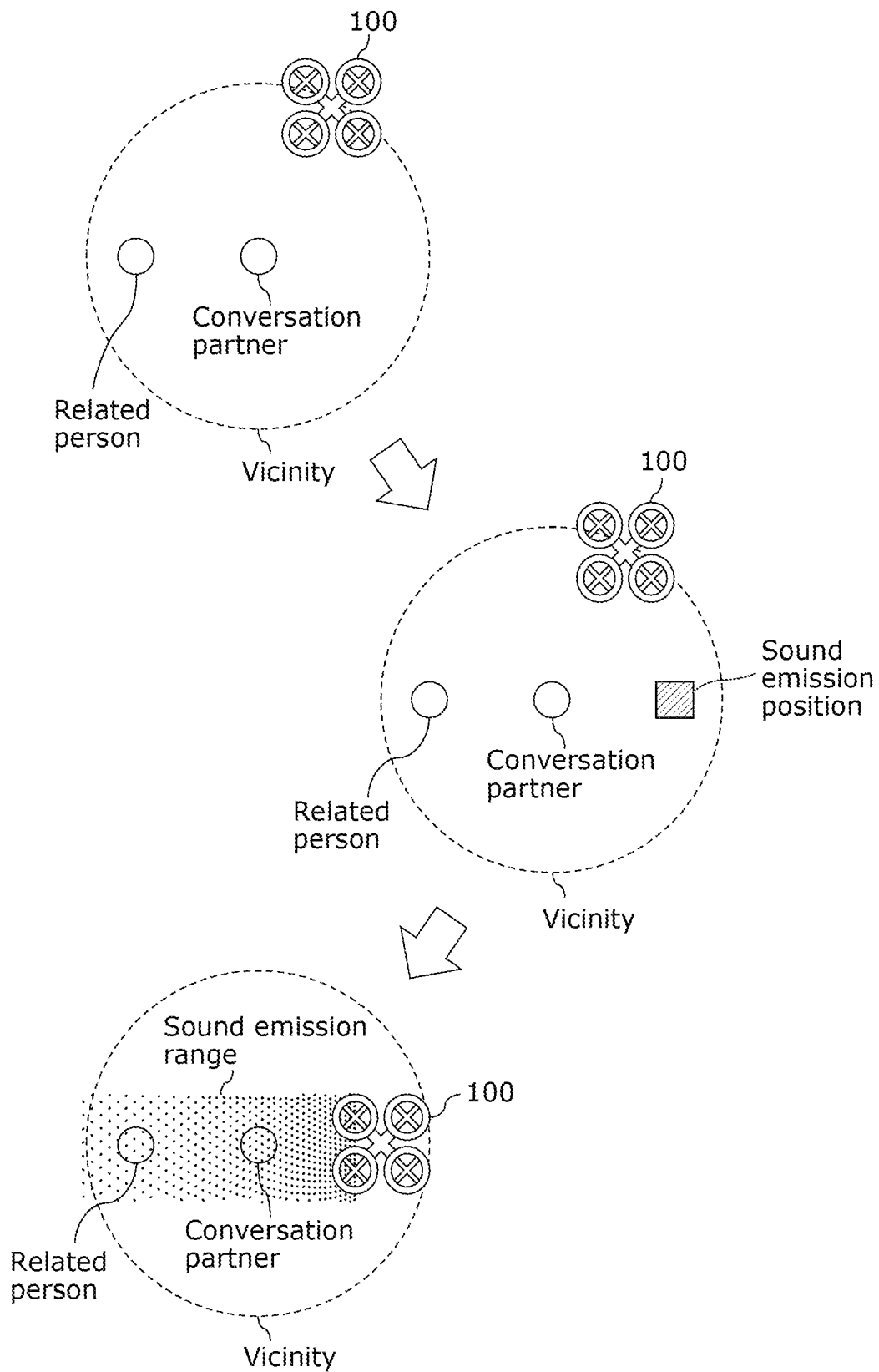
FIG. 3 is a conceptual diagram illustrating an example of specific operations of the unmanned moving body according to Embodiment 1.

FIG. 3 is a conceptual diagram illustrating an example of specific operations of unmanned moving body 100 illustrated in FIG. 1. In this example, unmanned moving body 100 is an unmanned aircraft, also called a "drone", The "conversation partner" corresponds to the first target and the "related person" corresponds to the second target.

For example, unmanned moving body 100 emits sound to the conversation partner while in the vicinity of the conversation partner. Unmanned moving body 100 then determines whether or not the related person is present in the vicinity of the conversation partner.

For example, unmanned moving body 100 senses the vicinity of the conversation partner using a sensor included in unmanned moving body 100, and in accordance with a result thereof, determines whether or not a person is present in the vicinity of the conversation partner. Specifically, an image sensor can be used as the sensor included in unmanned moving body 100. Then, when it is determined that the person present in the vicinity of the conversation partner is a related person related to the conversation partner, unmanned moving body 100 determines that the related person is present in the vicinity of the conversation partner.

When it is determined that the related person is present in the vicinity of the conversation partner, unmanned moving body 100 determines a sound emission position in such a manner that the conversation partner and the related person are within a sound emission range over which sound emitted by unmanned moving body 100 reaches. The sound emission range over which sound emitted by unmanned moving body 100 reaches may be determined in accordance with the orientation direction of directional speaker 107. Then, unmanned moving body 100 moves to the determined sound emission position and emits sound, Through this, unmanned moving body 100 can deliver sound to the conversation partner and the related person who are within the sound emission range.

Figure 4:
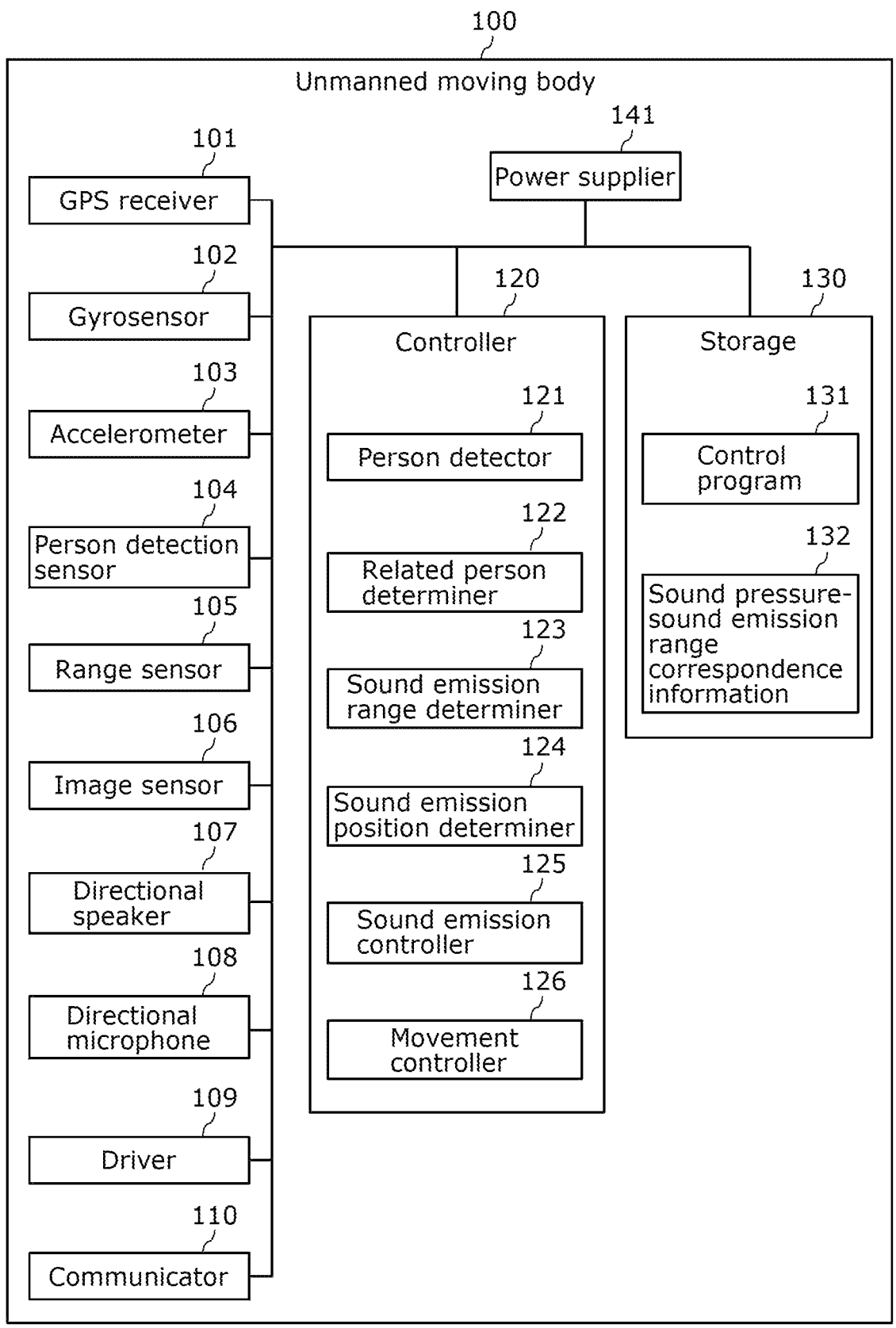
FIG. 4 is a block diagram illustrating an example of the specific configuration of the unmanned moving body according to Embodiment 1.

FIG. 4 is a block diagram illustrating an example of the specific configuration of unmanned moving body 100 illustrated in FIG. 3. Unmanned moving body 100 illustrated in FIG. 4 includes GPS receiver 101, gyrosensor 102, accelerometer 103, person detection sensor 104, range sensor 105, image sensor 106, directional speaker 107, directional microphone 108, driver 109, communicator 110, controller 120, storage 130, and power supplier 141.

GPS receiver 101 is a receiver that constitutes a GPS (Global Positioning System) for measuring a position and obtains a position by receiving a signal. For example, GPS receiver 101 obtains the position of unmanned moving body 100. In other words, GPS receiver 101 functions as a sensor that detects the position of unmanned moving body 100.

Gyrosensor 102 is a sensor that detects an attitude of unmanned moving body 100, i.e., an angle or a tilt of unmanned moving body 100. Accelerometer 103 is a sensor that detects an acceleration of unmanned moving body 100. Person detection sensor 104 is a sensor that detects a person in the vicinity of unmanned moving body 100. Person detection sensor 104 may be an infrared sensor.

Range sensor 105 is a sensor that measures a distance between unmanned moving body 100 and a target, and generates range data. Image sensor 106 is a sensor that captures an image, and generates an image through the capturing. Image sensor 106 may be a camera.

Directional speaker 107 is, as described above, a speaker that emits sound in an orientation direction. The orientation direction of directional speaker 107 may be adjustable, and the sound pressure of the sound emitted by directional speaker 107 may be adjustable, Directional microphone 108 is a microphone that collects sound from an orientation direction. The orientation direction of directional microphone 108 may be adjustable, and a sound collection sensitivity of directional microphone 108 may be adjustable. The orientation direction of directional microphone 108 may also be referred to as a "sound collection direction".

Driver 109 is a motor, an actuator, and the like that cause unmanned moving body 100 to move. Communicator 110 is a communication device that communicates with a device outside unmanned moving body 100. Communicator 110 may receive operation signals for moving unmanned moving body 100, Additionally, communicator 110 may send and receive content of conversations.

Controller 120 corresponds to processor 150 illustrated in FIG. 1, and is constituted by circuitry that processes information, Specifically, in this example, controller 120 includes person detector 121, related person determiner 122, sound emission range determiner 123, sound emission position determiner 124, sound emission controller 125, and movement controller 126. In other words, processor 150 may realize these roles.

Person detector 121 detects a person present in the vicinity of unmanned moving body 100. Person detector 121 detects the person present in the vicinity of unmanned moving body 100 in accordance with sensing data obtained from person detection sensor 104 or another sensor.

Related person determiner 122 determines whether or not the person detected by person detector 121 is a related person related to the conversation partner. Sound emission range determiner 123 determines a sound emission range in accordance with a positional relationship between the conversation partner and the related person. Sound emission position determiner 124 determines a sound emission position in accordance with the determined sound emission range. Sound emission controller 125 controls emission of sound from directional speaker 107 by sending control signals to directional speaker 107.

Movement controller 126 controls movement of unmanned moving body 100 by sending control signals to driver 109. In this example, movement controller 126 controls flight of unmanned moving body 100, which is an unmanned aircraft.

Storage 130 is memory for storing information, and stores control program 131 and sound pressure-sound emission range correspondence information 132. Control program 131 is a program with which controller 120 processes information. Sound pressure-sound emission range correspondence information 132 is information indicating a correspondence relationship between a sound pressure at which directional speaker 107 emits sound and a sound emission range over which sound reaches at at least a predetermined quality.

Power supplier 141 is a circuit that supplies power to a plurality of constituent elements included in unmanned moving body 100. For example, power supplier 141 includes a power source.

Figure 5:
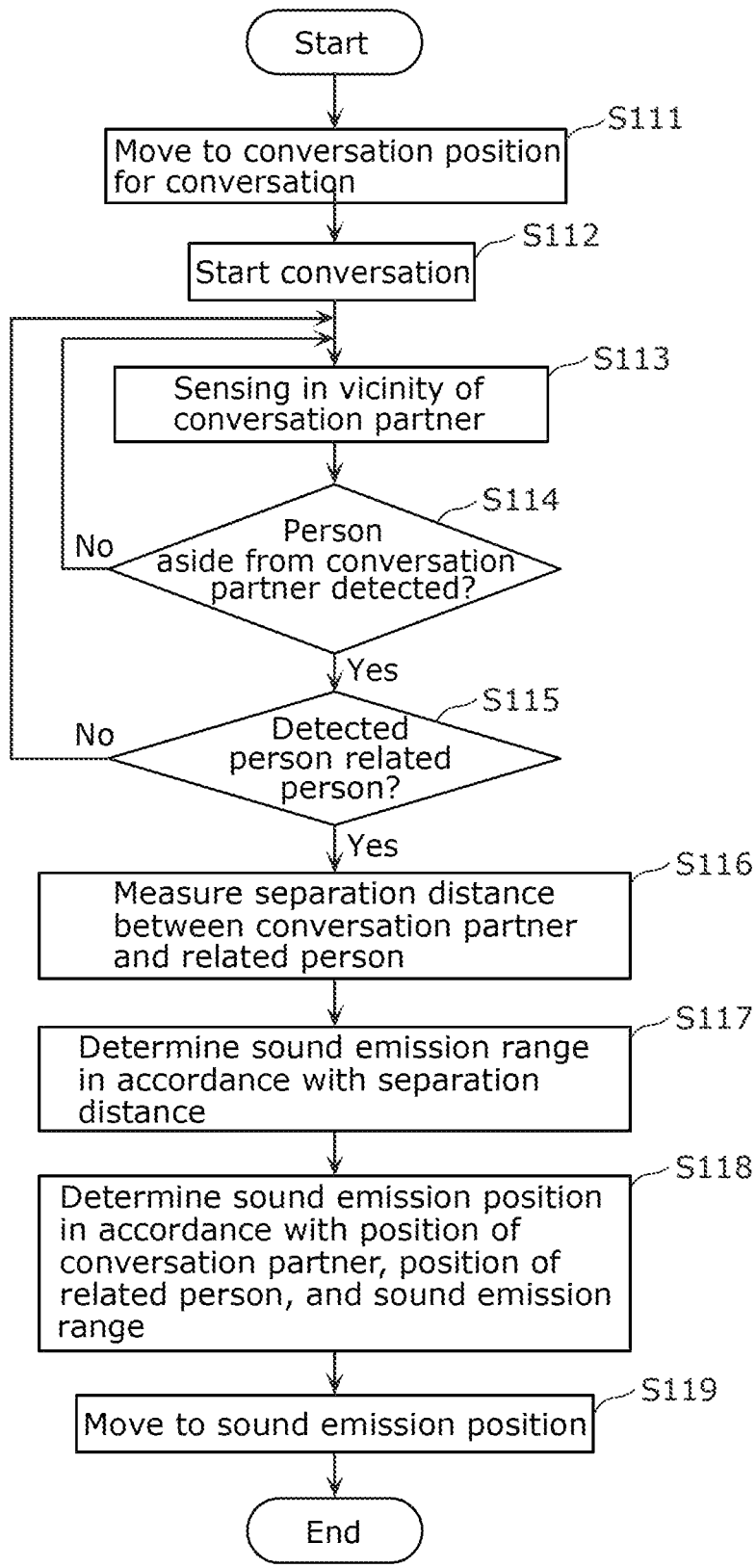
FIG. 5 is a flowchart illustrating an example of specific operations of the unmanned moving body according to Embodiment 1.

FIG. 5 is a flowchart illustrating an example of the specific operations of unmanned moving body 100 illustrated in FIG. 3, For example, a plurality of constituent elements of unmanned moving body 100, illustrated in FIG. 4, perform the operations illustrated in FIG. 5 by operating in tandem.

First, unmanned moving body 100 moves to the conversation position for conversing with the conversation partner (S111). The conversation position can be, for example, a position which voice emitted by the conversation partner reaches from the conversation partner's position and a position which sound from unmanned moving body 100 reaches. The conversation partner may be determined in advance. Unmanned moving body 100 may determine the conversation partner during flight.

For example, in unmanned moving body 100, person detector 121 detects the conversation partner in accordance with sensing data obtained from person detection sensor 104, image sensor 106, or the like. Then, using driver 109, movement controller 126 causes unmanned moving body 100 to move to a conversation position within a predetermined range from the conversation partner.

Then, unmanned moving body 100 starts a conversation (S112). In other words, unmanned moving body 100 starts at least one of emitting sound or collecting sound. For example, sound emission controller 125 causes directional speaker 107 to start emitting sound. Controller 120 may also cause directional microphone 108 to start collecting sound.

Then, unmanned moving body 100 senses the vicinity of the conversation partner (S113). For example, person detector 121 detects a person in the vicinity of the conversation partner by causing person detection sensor 104, image sensor 106, or the like to sense the vicinity of the conversation partner. Any sensor for detecting a person can be used for this detection. Additionally, the vicinity of the conversation partner corresponds to, for example, a region in a predetermined range from the conversation partner.

Then, unmanned moving body 100 determines whether or not a person aside from the conversation partner has been detected (S114). For example, person detector 121 determines whether or not a person aside from the conversation partner has been detected in the vicinity of the conversation partner. When a person aside from the conversation partner has not been detected (No in S114), unmanned moving body 100 repeats the sensing of the vicinity of the conversation partner (S113).

When a person aside from the conversation partner has been detected (Yes in S114), unmanned moving body 100 determines whether or not the detected person is a related person related to the conversation partner (S115). For example, related person determiner 122 may determine whether or not the detected person is the related person in accordance with whether or not the distance between the conversation partner and the related person is within a threshold, or may determine whether or not the detected person is the related person in accordance with another determination standard pertaining to grouping or the like. This determination will be described later.

When the detected person is not the related person (No in S115), unmanned moving body 100 repeats the sensing of the vicinity of the conversation partner (S113).

When the detected person is the related person (Yes in S115), unmanned moving body 100 measures a separation distance between the conversation partner and the related person (S116). For example, the separation distance between the conversation partner and the related person may be measured by sound emission range determiner 123 calculating a distance between the position of the conversation partner detected in accordance with the sensing data and the position of the related person detected in accordance with the sensing data.

Then, unmanned moving body 100 determines the sound emission range in accordance with the separation distance between the conversation partner and the related person (S117). For example, sound emission range determiner 123 determines the sound emission range in accordance with the measured separation distance. At this time, sound emission range determiner 123 makes the sound emission range larger the larger the measured separation distance is.

The sound emission range is, for example, a range defined relatively using unmanned moving body 100 as a reference, and is a range over which sound from directional speaker 107 reaches at at least a predetermined quality. "At least a predetermined quality" may correspond to a sound pressure within a predetermined range, or may correspond to an SN ratio (signal-to-noise ratio) within a predetermined range. The determination of the sound emission range will be described later.

Then, unmanned moving body 100 determines the sound emission position in accordance with the position of the conversation partner, the position of the related person, and the sound emission range (S118). For example, sound emission position determiner 124 determines the sound emission position in such a manner that the position of the detected conversation partner and the position of the detected related person are within the determined sound emission range. The determination of the sound emission position will be described later.

Then, unmanned moving body 100 moves to the sound emission position (S119). For example, movement controller 126 causes unmanned moving body 100 to move to the sound emission position by controlling operations of driver 109. Additionally, sound emission controller 125 may control the emission of sound from directional speaker 107 so that sound reaches the sound emission range at at least the predetermined quality.

This makes it possible for unmanned moving body 100 to emit sound appropriately to the conversation partner and the related person.

Although the foregoing example describes unmanned moving body 100 as performing the processing for moving to the sound emission position (S113 to S119) after starting the conversation with the conversation partner (after S112), the processing for moving to the sound emission position may be performed before starting a conversation with the conversation partner.

Additionally, in the foregoing example, when the detected person is not the related person (No in S115), unmanned moving body 100 repeats the sensing of the vicinity of the conversation partner (S113), However, unmanned moving body 100 may modify the sound emission position such that sound is not emitted to a person who is not a related person (a third target). In other words, sound emission position determiner 124 in unmanned moving body 100 may modify the sound emission position such that a person who is not a related person is not included in the sound emission range.

Additionally, sound emission position determiner 124 may modify the sound emission position such that a person who is not a related person is excluded from the sound emission direction. Through this, the likelihood that a person who is not a related person will enter the sound emission range upon moving is reduced.

Additionally, if the sound emission range is fixed, i.e., if the sound pressure of the sound emitted by directional speaker 107 is fixed, unmanned moving body 100 may determine whether or not the separation distance between the conversation partner and the related person is within the sound emission range. Then, unmanned moving body 100 may determine the sound emission position such that the separation distance is within the sound emission range, and move to the determined sound emission position, Unmanned moving body 100 need not move if the separation distance is not within the sound emission range.

Figures 6, 7:
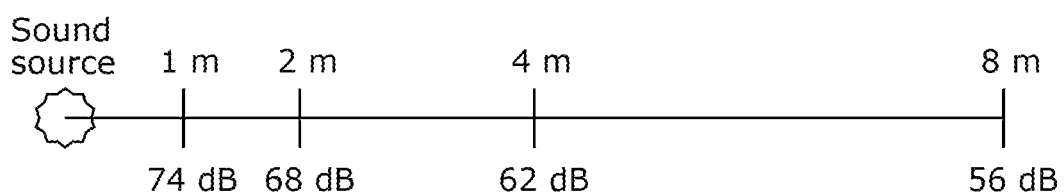
FIG. 6 is a conceptual diagram illustrating attenuation of sound pressure according to Embodiment 1.
FIG. 7 is a data chart illustrating a relationship between sound pressure of a sound source and sound pressure at a position distanced from the sound source, according to Embodiment 1.

FIG. 6 is a conceptual diagram illustrating attenuation of sound pressure. It can be assumed that for a sound source (and specifically, a point sound source), the sound pressure will attenuate by 6 dB each time the distance is doubled. In the example illustrated in FIG. 6, the sound pressure is 74 dB at a position 1 m from the sound source. The sound pressure is 68 dB at a position 2 m from the sound source. The sound pressure is 62 dB at a position 4 m from the sound source. The sound pressure is 56 dB at a position 8 m from the sound source.

FIG. 7 is a data chart illustrating a relationship between sound pressure of a sound source and sound pressure at a position distanced from the sound source. In this example, when the sound pressure of the sound source is 56 dB, the sound pressure at a position 2 m from the sound source is 50 dB, the sound pressure at a position 4 m from the sound source is 44 dB, and the sound pressure at a position 8 m from the sound source is 38 dB.

Additionally, when the sound pressure of the sound source is 62 dB, the sound pressure at a position 2 m from the sound source is 56 dB, the sound pressure at a position 4 m from the sound source is 50 dB, and the sound pressure at a position 8 m from the sound source is 44 dB. Additionally, when the sound pressure of the sound source is 68 dB, the sound pressure at a position 2 m from the sound source is 62 dB, the sound pressure at a position 4 m from the sound source is 56 dB, and the sound pressure at a position 8 m from the sound source is 50 dB.

Accordingly, when the sound pressure of the sound source is 56 dB, a range over which sound of at least 50 dB reaches is a range of 2 m from the sound source. When the sound pressure of the sound source is 62 dB, the range over which sound of at least 50 dB reaches is a range of 4 m from the sound source. When the sound pressure of the sound source is 68 dB, the range over which sound of at least 50 dB reaches is a range of 8 m from the sound source. The sound pressure of the sound emitted by unmanned moving body 100 and the sound emission range extending in the sound emission direction from unmanned moving body 100 are determined using these characteristics.

Figures 8, 9:
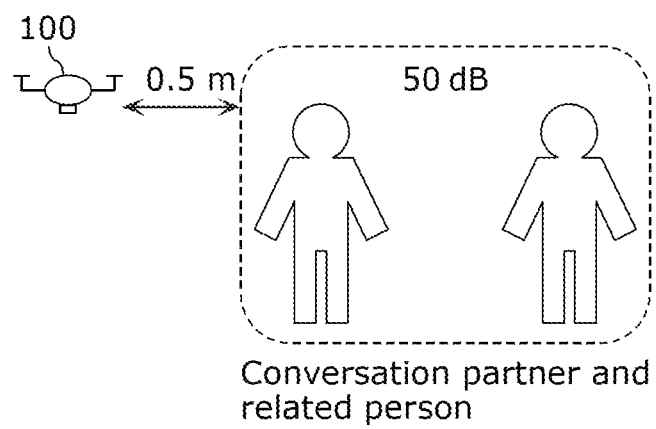
FIG. 8 is a conceptual diagram illustrating a positional relationship between a conversation partner, a related person, and the unmanned moving body according to Embodiment 1.
FIG. 9 is a data chart illustrating a relationship between a separation distance between a conversation partner and a related person, and a sound pressure and sound emission range of a sound produced by the unmanned moving body, according to Embodiment 1.

FIG. 8 is a conceptual diagram illustrating a positional relationship between a conversation partner, a related person, and unmanned moving body 100. For example, the sound pressure of sound delivered to the conversation partner and the related person by unmanned moving body 100 may be set to at least 50 dB in advance. The separation distance between unmanned moving body 100 and the one of the conversation partner and the related person who is closer to unmanned moving body 100 may be set to at least 0.5 min advance. The sound pressure of the sound emitted by unmanned moving body 100 and the sound emission range extending in the sound emission direction from unmanned moving body 100 are determined with these prerequisites, for example.

FIG. 9 is a data chart illustrating a relationship between a separation distance between a conversation partner and a related person, and a sound pressure and sound emission range of a sound produced by unmanned moving body 100, according to the present embodiment. For example, with the prerequisites described with reference to FIGS. 6 to 8, when the sound pressure of sound emitted by unmanned moving body 100 is 56 dB, the sound emission range extending in the sound emission direction from unmanned moving body 100, i.e., the range over which sound reaches at a sound pressure of at least 50 dB, is a range of a directional width×2 m. The directional width is a width of a sound spread in a direction perpendicular to the sound emission direction.

When the sound pressure of sound emitted by unmanned moving body 100 is 62 dB, the sound emission range extending in the sound emission direction from unmanned moving body 100 is a range of the directional width×4 m. When the sound pressure of sound emitted by unmanned moving body 100 is 68 dB, the sound emission range extending in the sound emission direction from unmanned moving body 100 is a range of the directional width×8 m.

Unmanned moving body 100 emits sound at a position distanced from the conversation partner and the related person by at least 0.5 m. As such, when the distance between the conversation partner and the related person is in a range of from 0 m to 1.5 m, the conversation partner and the related person can be included in a range of 2 m from unmanned moving body 100. Accordingly, in this case, unmanned moving body 100 can set the sound pressure of sound emitted from unmanned moving body 100 to 56 dB, and can set the sound emission range extending in the sound emission direction from unmanned moving body 100 to the directional width×2 m.

Likewise, when the distance between the conversation partner and the related person is in a range of from 1.5 m to 3.5 m, unmanned moving body 100 can set the sound pressure of sound emitted from unmanned moving body 100 to 62 dB, and can set the sound emission range extending in the sound emission direction from unmanned moving body 100 to the directional width×4 m. Likewise, when the distance between the conversation partner and the related person is in a range of from 3.5 m to 7.5 m, unmanned moving body 100 can set the sound pressure of sound emitted from unmanned moving body 100 to 68 dB, and can set the sound emission range extending in the sound emission direction from unmanned moving body 100 to the directional width×8 m.

FIG. 10 is a data chart illustrating a relationship between the sound pressure of the sound source and a range over which sound reaches at a sound pressure in a predetermined range. In this example, the sound pressure in the predetermined range is specifically 46 to 54 dB.

Additionally, in this example, when the sound pressure of the sound source is 60 dB, sound reaches a position 2 m away from the sound source at 54 dB, sound reaches a position 4 m away from the sound source at 48 dB, sound reaches a position 8 m away from the sound source at 42 dB, and sound reaches a position 16 m away from the sound source at 36 dB. Additionally, when the sound pressure of the sound source is 70 dB, sound reaches a position 2 m away from the sound source at 64 dB, sound reaches a position 4 m away from the sound source at 58 dB, sound reaches a position 8 m away from the sound source at 52 dB, and sound reaches a position 16 m away from the sound source at 46 dB.

Accordingly, a position where sound reaches at 46 to 54 dB is approximately 2 to 5 m from the sound source when the sound pressure of the sound source is 60 dB, and is approximately 6 to 16 m from the sound source when the sound pressure of the sound source is 70 dB. In other words, the range over which sound reaches at 46 to 54 dB has a length of 3 m when the sound pressure of the sound source is 60 dB, and has a length of 10 m when the sound pressure of the sound source is 70 dB.

For example, the sound emission position is determined such that the conversation partner and the related person are within such a range over which sound reaches at a sound pressure in a predetermined range.

FIG. 11 is a conceptual diagram illustrating a case where the separation distance between the conversation partner and the related person is 3 m. Specifically, this drawing illustrates an example of the sound emission position determined based on FIG. 10 when the separation distance between the conversation partner and the related person is 3 m. When the separation distance between the conversation partner and the related person is 3 m, unmanned moving body 100 can include the conversation partner and the related person, who are 3 m away from each other, in the range over which sound reaches at 46 to 54 dB by emitting sound at 60 dB.

Accordingly, unmanned moving body 100 moves to the sound emission position at which the conversation partner and the related person are within the range over which sound reaches at 46 to 54 dB, and emits sound at 60 dB. This makes it possible for unmanned moving body 100 to deliver sound to the conversation partner and the related person at 46 to 54 dB.

FIG. 12 is a conceptual diagram illustrating a case where the separation distance between the conversation partner and the related person is 10 m. Specifically, this drawing illustrates an example of the sound emission position determined based on FIG. 10 when the separation distance between the conversation partner and the related person is 10 m. When the separation distance between the conversation partner and the related person is 10 m, unmanned moving body 100 can include the conversation partner and the related person, who are 10 m away from each other, in the range over which sound reaches at 46 to 54 dB by emitting sound at 70 dB.

Accordingly, unmanned moving body 100 moves to the sound emission position at which the conversation partner and the related person are within the range over which sound reaches at 46 to 54 dB, and emits sound at 70 dB. This makes it possible for unmanned moving body 100 to deliver sound to the conversation partner and the related person at 46 to 54 dB.

Note that unmanned moving body 100 can also include the conversation partner and the related person, who are 3 m away from each other, in the range over which sound reaches at 46 to 54 dB by emitting sound at 70 dB, However, increasing the sound pressure also increases the power consumption. Accordingly, when the conversation partner and the related person are 3 m away from each other, unmanned moving body 100 emits sound at 60 dB.

In other words, unmanned moving body 100 emits sound at the minimum sound pressure at which the conversation partner and the related person can be included in the range over which sound reaches at at least the predetermined quality. Then, unmanned moving body 100 determines the sound emission position according to the minimum sound pressure and moves to the determined sound emission position. This reduces the power consumption. This also reduces the sound emission range, which in turn reduces the likelihood of an unrelated person being within the sound emission range.

Unmanned moving body 100 may determine the sound emission position in such a manner that sound reaching the conversation partner stays at the current sound pressure and sound also newly reaches a related person. This suppresses a sense of discomfort on the part of the conversation partner. Additionally, in this case, the sound pressure of the sound reaching the conversation partner is maintained, and thus the minimum sound pressure described above need not be used. In other words, a higher sound pressure than the minimum sound pressure described above may be used.

Additionally, although FIGS. 6 to 12 do not take into account noise produced by unmanned moving body 100, noise produced by unmanned moving body 100 may be taken into account. For example, a higher sound pressure may be used.

Additionally, the relationship between the sound pressure and the sound emission range, such as that described above, may be stored in storage 130 as sound pressure-sound emission range correspondence information 132.

Examples of criteria for determining whether or not a detected person is a related person will be described next with reference to FIGS. 13 to 23. Basically, unmanned moving body 100 determines a related person by performing image recognition processing on an image generated by capturing an image of the vicinity of the conversation partner. The determination of the related person may be performed before the conversation or during the conversation. For example, related person determiner 122 of unmanned moving body 100 determines the related person in accordance with the criteria described below.

Figure 13:
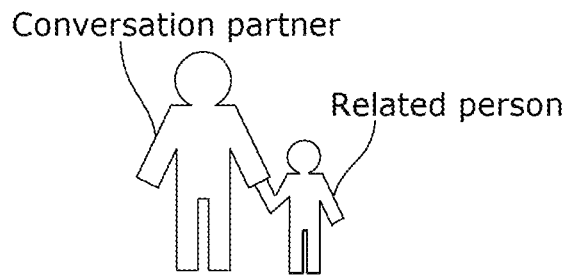
FIG. 13 is a conceptual diagram illustrating an example of a related person who is in contact with a conversation partner, according to Embodiment 1.

FIG. 13 is a conceptual diagram illustrating an example of a related person who is in contact with a conversation partner. Unmanned moving body 100 may determine that a person who is in contact with the conversation partner is a related person. Additionally, unmanned moving body 100 may determine that the person who is in contact with the conversation partner is a related person when the time for which the person is in contact with the conversation partner has exceeded a predetermined amount of time. Through this, unmanned moving body 100 can suppress erroneous determinations arising due to a person mistakenly making contact with the conversation partner.

Although FIG. 13 illustrates an example in which a parent and a child are holding hands, with the parent being the conversation partner and the child being the related person, the conversation partner and the related person may be reversed.

Figure 14:
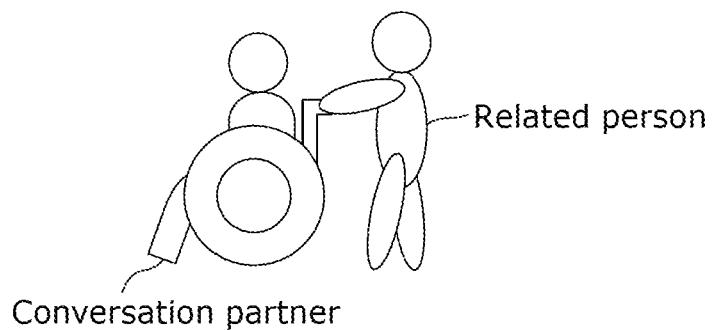
FIG. 14 is a conceptual diagram illustrating an example of a related person who is in contact with a conversation partner via an object, according to Embodiment 1.

FIG. 14 is a conceptual diagram illustrating an example of a related person who is in contact with a conversation partner via an object. In addition to a person who is in direct contact with the conversation partner, unmanned moving body 100 may determine that a person who is in contact with the conversation partner via an object is a related person. In the example illustrated in FIG. 14, a person is in contact with the conversation partner via a wheelchair. In this case, unmanned moving body 100 may determine that a person who is in contact with the conversation partner via the wheelchair is a related person.

Like the example illustrated in FIG. 13, unmanned moving body 100 may determine that the person who is in contact with the conversation partner via an object is a related person when the time for which the person is in contact with the conversation partner has exceeded a predetermined amount of time. Additionally, although FIG. 14 illustrates an example where the person sitting in the wheelchair is the conversation partner and the person pushing the wheelchair is the related person, the conversation partner and the related person may be reversed.

Figure 15:
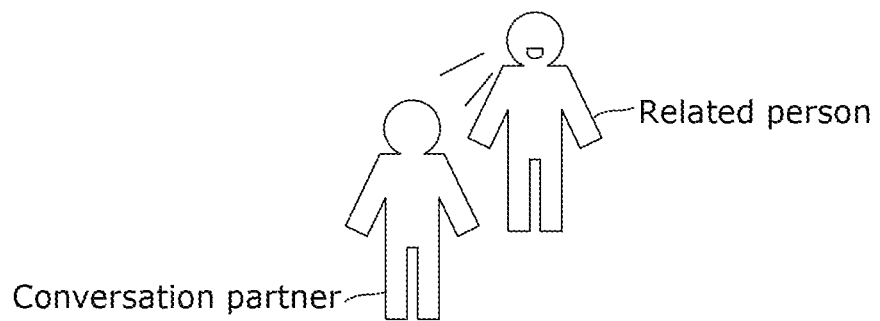
FIG. 15 is a conceptual diagram illustrating an example of a related person who is conversing with a conversation partner, according to Embodiment 1.

FIG. 15 is a conceptual diagram illustrating an example of a related person who is conversing with a conversation partner. Unmanned moving body 100 may determine that a person who is conversing with the conversation partner is a related person. For example, when, through image recognition processing, the conversation partner is detected as facing a person and having their mouth open, unmanned moving body 100 may determine that the person is a related person. Additionally, for example, when, through image recognition processing, a person is detected as facing the conversation partner and having their mouth open, unmanned moving body 100 may determine that the person is a related person.

Although FIG. 15 illustrates an example in which a person facing the conversation partner with their mouth open is the related person, the conversation partner and the related person may be reversed.

Figure 16:
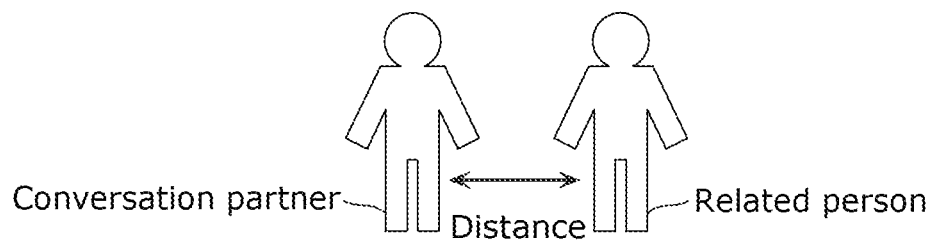
FIG. 16 is a conceptual diagram illustrating an example of a related person at a short distance from a conversation partner, according to Embodiment 1.

FIG. 16 is a conceptual diagram illustrating an example of a related person at a short distance from a conversation partner. Unmanned moving body 100 may determine that a person at a short distance from the conversation partner is a related person. For example, unmanned moving body 100 detects the position of the conversation partner and the position of a person aside from the conversation partner, and calculates the distance between the conversation partner and the person aside from the conversation partner in accordance with the position of the conversation partner and the position of the person aside from the conversation partner. Then, unmanned moving body 100 determines that the person is a related person when the calculated distance is no greater than a threshold.

When the time for which the distance between the conversation partner and the person aside from the conversation partner is no greater than the threshold has exceeded a predetermined amount of time, unmanned moving body 100 may determine that the person is a related person. Through this, unmanned moving body 100 can suppress erroneous determinations arising due to the conversation partner and a person aside from the conversation partner temporarily approaching each other.

Figure 17:
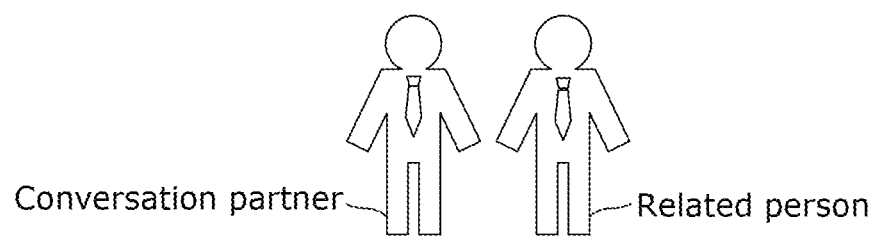
FIG. 17 is a conceptual diagram illustrating an example of a related person wearing the same clothing as a conversation partner, according to Embodiment 1.

FIG. 17 is a conceptual diagram illustrating an example of a related person wearing the same clothing as a conversation partner. Unmanned moving body 100 may determine that a person wearing the same clothing as the conversation partner is a related person. Specifically, unmanned moving body 100 may determine that a person wearing the same uniform as the conversation partner is a related person. For example, by performing image recognition processing, unmanned moving body 100 may determine whether or not the clothing of the conversation partner and the clothing of a person aside from the conversation partner are the same. When the clothing of the conversation partner and the clothing of the person aside from the conversation partner are the same, unmanned moving body 100 may determine that the person is a related person.

Note that when the clothing of the conversation partner and the clothing of the person aside from the conversation partner are the same, and furthermore, that same clothing is different from the clothing of another person, unmanned moving body 100 may determine that the person wearing the same clothing as the conversation partner is a related person.

For example, when many people are wearing the same clothing, unmanned moving body 100 may determine that the many people wearing the clothing are not related persons. More specifically, when a large number of people are wearing a suit and a necktie, it is possible that those people are not related persons. Accordingly, unmanned moving body 100 can suppress erroneous determinations by determining that many people wearing the same clothing are not related persons.

Figure 18:
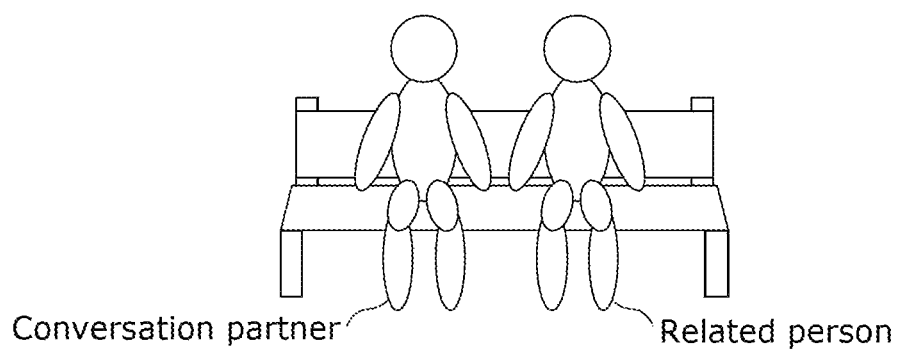
FIG. 18 is a conceptual diagram illustrating an example of a related person present in a predetermined area with a conversation partner, according to Embodiment 1.

FIG. 18 is a conceptual diagram illustrating an example of a related person present in a predetermined area with a conversation partner, Unmanned moving body 100 may determine that a person who is present in a predetermined area with the conversation partner is a related person, Here, the predetermined area may be a place which the conversation partner and the related person use together, which is registered in advance. Specifically, as illustrated in FIG. 18, the predetermined area may be a place where a bench is installed. The predetermined area may be the vicinity of a single table, a meeting room, a vehicle that can be shared by a small number of people, such as a boat, or the like.

Figure 19:
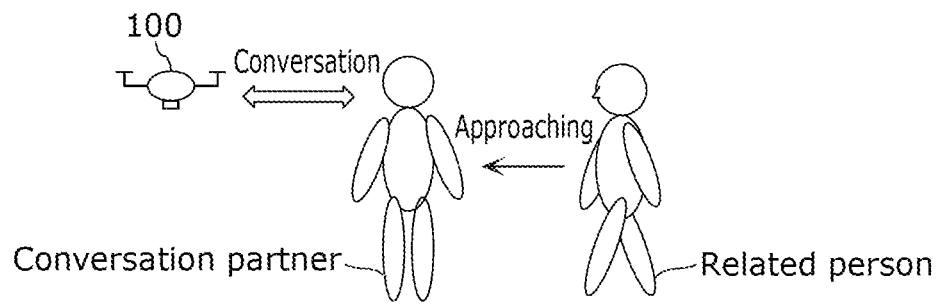
FIG. 19 is a conceptual diagram illustrating an example of a related person approaching a conversation partner, according to Embodiment 1.

FIG. 19 is a conceptual diagram illustrating an example of a related person approaching a conversation partner. Unmanned moving body 100 may determine that a person approaching the conversation partner is a related person.

For example, by detecting the position of the conversation partner and the position of a person aside from the conversation partner at any given time, unmanned moving body 100 may detect a person approaching the conversation partner and determine that the person approaching the conversation partner is a related person. A person approaching the conversation partner is highly likely to be a person related to the conversation partner, and is also presumed to be trying to hear the sound emitted by unmanned moving body 100. Accordingly, by determining that a person approaching the conversation partner is a related person, unmanned moving body 100 can emit sound to those people as appropriate.

Note that when a person aside from the conversation partner approaches within a predetermined range from the conversation partner, unmanned moving body 100 may determine that the person is a related person, Additionally, when the amount of time for which a person aside from the conversation partner is approaching within a predetermined range from the conversation partner exceeds a predetermined amount of time, unmanned moving body 100 may determine that the person is a related person.

Figure 20:
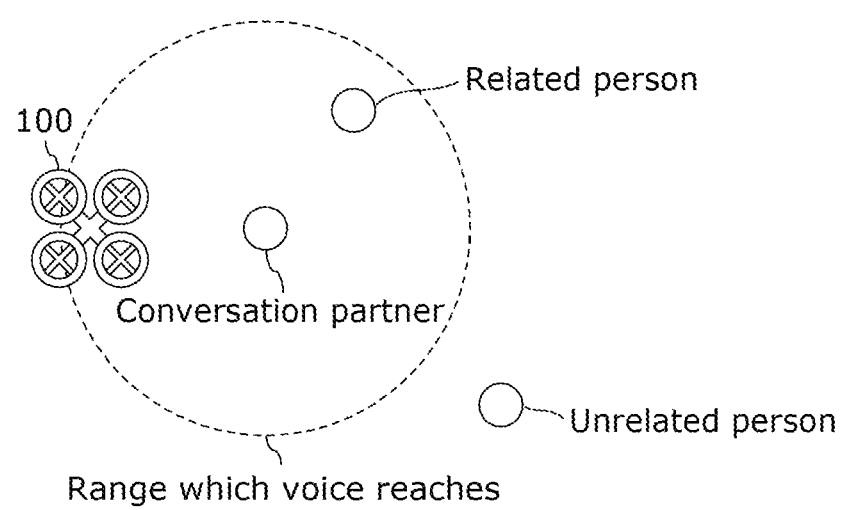
FIG. 20 is a conceptual diagram illustrating an example of a related person present in a range which a conversation partner's voice reaches, according to Embodiment 1.

FIG. 20 is a conceptual diagram illustrating an example of a related person present in a range which a conversation partner's voice reaches, Unmanned moving body 100 may determine that a person who is present in a range which the conversation partner's voice reaches is a related person. For example, unmanned moving body 100 estimates the range which sound emitted from the conversation partner reaches in accordance with the sound pressure of the sound emitted by the conversation partner. Then, unmanned moving body 100 determines that a person present in the estimated range is a related person. This example corresponds to determining the threshold in the example described with reference to FIG. 16 in accordance with the sound pressure of the sound emitted by the conversation partner.

Figure 21:
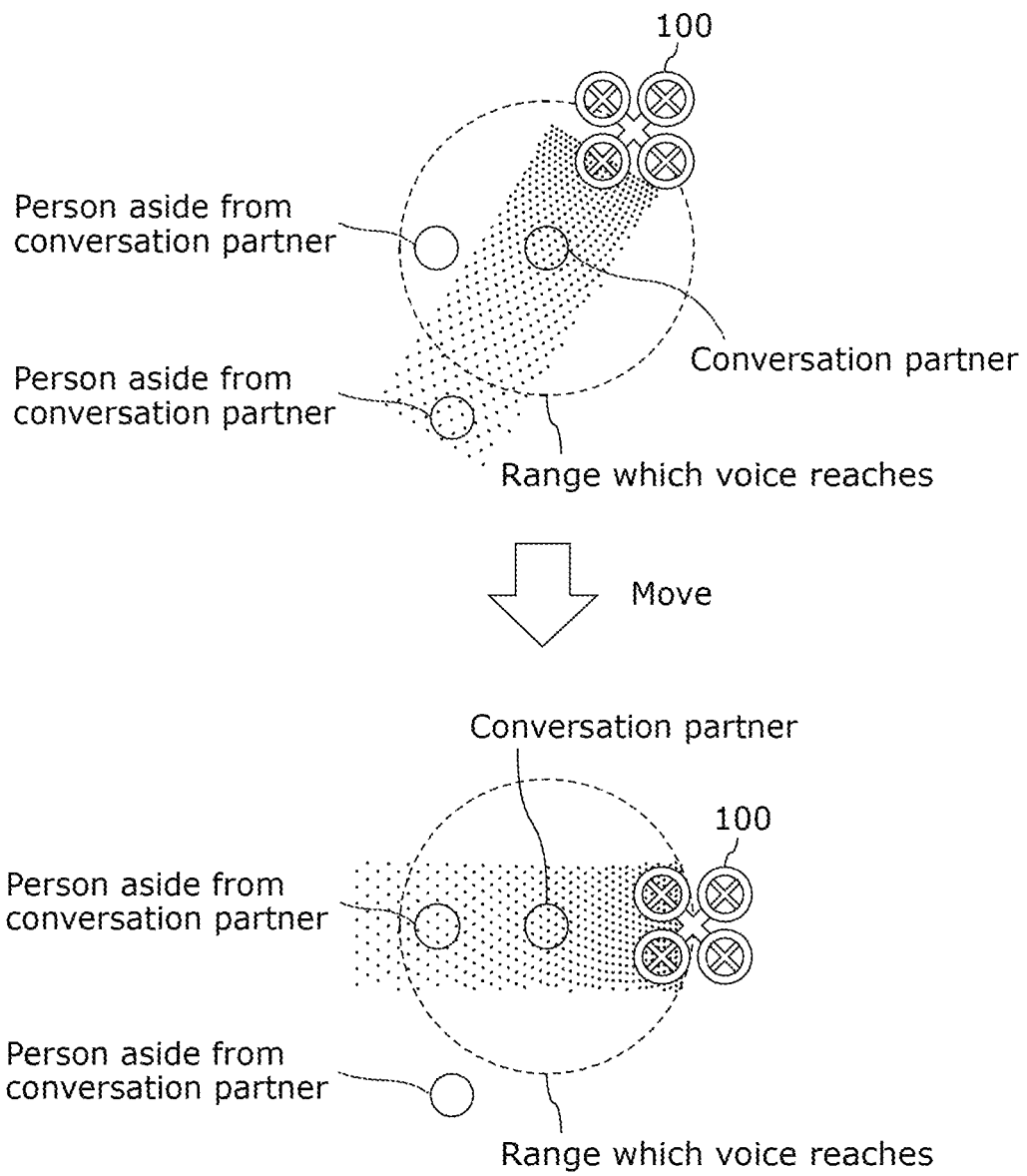
FIG. 21 is a conceptual diagram illustrating an example of movement that includes, in a sound emission range, a related person present in a range which a conversation partner's voice reaches, according to Embodiment 1.

FIG. 21 is a conceptual diagram illustrating an example of movement that includes, in a sound emission range, a related person present in a range which a conversation partner's voice reaches.

When conversing with the conversation partner, unmanned moving body 100 responds to a question from the conversation partner. For a person aside from the conversation partner, even if the person hears the response made by unmanned moving body 100, it is difficult for the person to understand the meaning of the response without hearing the question from the conversation partner. Accordingly, unmanned moving body 100 determines that a person present within a range which the conversation partner's voice reaches is a related person, and moves so that the person present within the range which the conversation partner's voice reaches is within the sound emission range.

This makes it possible to suppress a situation in which the person aside from the conversation partner can hear only one of questions and responses and becomes confused as a result.

Figure 22:
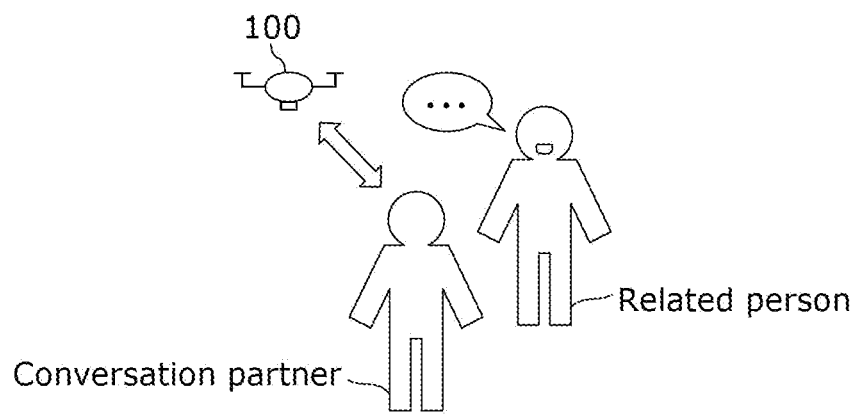
FIG. 22 is a conceptual diagram illustrating an example of a related person who is conversing with someone aside from a conversation partner, according to Embodiment 1.

FIG. 22 is a conceptual diagram illustrating an example of a related person, aside from a conversation partner, who is conversing with unmanned moving body 100. When, while conversing with a conversation partner, a person aside from the conversation partner talks to unmanned moving body 100, unmanned moving body 100 may determine that the person who has talked to unmanned moving body 100 is a related person. For example, when sound or voice is detected from a different direction from the conversation partner while conversing with the conversation partner using directional microphone 108, unmanned moving body 100 determines that a person present in the stated direction is a related person.

Additionally, for example, when a voice different from the conversation partner's voice is detected while conversing with the conversation partner, unmanned moving body 100 may determine that the person who emitted the different voice is a related person. An omnidirectional microphone may be used in this case. Additionally, because the related person is assumed to be near the conversation partner, when a voice different from the conversation partner's voice is detected, using directional microphone 108, from the same direction as the conversation partner while conversing with the conversation partner, unmanned moving body 100 may determine that the person who emitted the different voice is a related person.

Additionally, for example, when, while conversing with a conversation partner, a person aside from the conversation partner talks to unmanned moving body 100 regarding content which matches the context of the content of the conversation, unmanned moving body 100 may determine that the person who has talked to unmanned moving body 100 is a related person. In other words, when, while conversing with a conversation partner, a person aside from the conversation partner talks to unmanned moving body 100 regarding content which does not match the context of the content of the conversation, unmanned moving body 100 may determine that the person who has talked to unmanned moving body 100 is an unrelated person.

Only one of the plurality of determination criteria described with reference to FIGS. 13 to 22 may be used, or a desired combination of two or more of the determination criteria may be used. Additionally, when determining whether each of a plurality of persons are related persons, unmanned moving body 100 may narrow down the related persons from among the plurality of persons determined to be related persons. In other words, unmanned moving body 100 may select a final related person to whom sound is to be delivered from among a plurality of related persons.

For example, unmanned moving body 100 may select the related person closest to the conversation partner, from among the plurality of related persons, as the final related person.

Additionally, for example, unmanned moving body 100 may select one or more related persons so that the highest number of related persons are within the sound emission range, To be more specific, for example, unmanned moving body 100 may select one or more related persons so that a number of related persons present on a straight line passing through the position of the conversation partner is the highest. This makes it possible for unmanned moving body 100 to emit sound appropriately to a greater number of related persons.

Additionally, for example, unmanned moving body 100 may select a person having a high probability of being a related person, from among a plurality of persons determined to be related persons, as the final related person.

Specifically, for example, unmanned moving body 100 may select the final related person according to a probability level set in advance for each of the determination criteria, Here, the probability level may be set higher for the criteria for determining whether or not there is contact with the conversation partner (FIGS. 13 and 14), the criteria for determining whether or not a conversation is taking place with the conversation partner (FIG. 15), or the like. Additionally, the probability level may be set to a moderate level for the criteria for determining whether or not a person is wearing the same clothing as the conversation partner (FIG. 16), the criteria for determining whether or not a person is present in a predetermined area with the conversation partner (FIG. 18), or the like.

Then, unmanned moving body 100 may select a person determined to be a related person according to the determination criteria having a higher probability, from among a plurality of persons determined to be related persons, as the final related person.

Alternatively, unmanned moving body 100 may select a person satisfying more of a plurality of conditions in the plurality of determination criteria, from among a plurality of persons determined to be related persons, as the final related person. For example, if the condition of being close to the conversation partner (FIG. 16), the condition of being close to the conversation partner for at least a predetermined amount of time (FIG. 16), and the condition of wearing the same clothing as the conversation partner (FIG. 17) are satisfied, the number of satisfied conditions is three. The final related person may be selected in accordance with a number counted in this manner.

Alternatively, unmanned moving body 100 may evaluate the number of conditions that are satisfied by weighting the conditions according to the probability levels set in advance for each of the determination criteria.

Alternatively, unmanned moving body 100 may select, from a plurality of persons determined to be related persons, a person whom sound reaches as a result of movement only within a predetermined range, such as a region on a front side of the conversation partner, as the final related person. This makes it possible for the conversation partner to continue the conversation appropriately. The predetermined range suppresses a situation in which unmanned moving body 100 moves significantly. As such, the conversation partner can continue the conversation as appropriate without any major concern for the movement of unmanned moving body 100.

Alternatively, unmanned moving body 100 may select a person to and from which sound is emitted and collected appropriately, from among a plurality of persons determined to be related persons, as the final related person. In other words, unmanned moving body 100 may select a related person appropriate for sound emission and sound collection. To put this differently, unmanned moving body 100 may select an appropriate related person for conversing with unmanned moving body 100.

Figure 23:
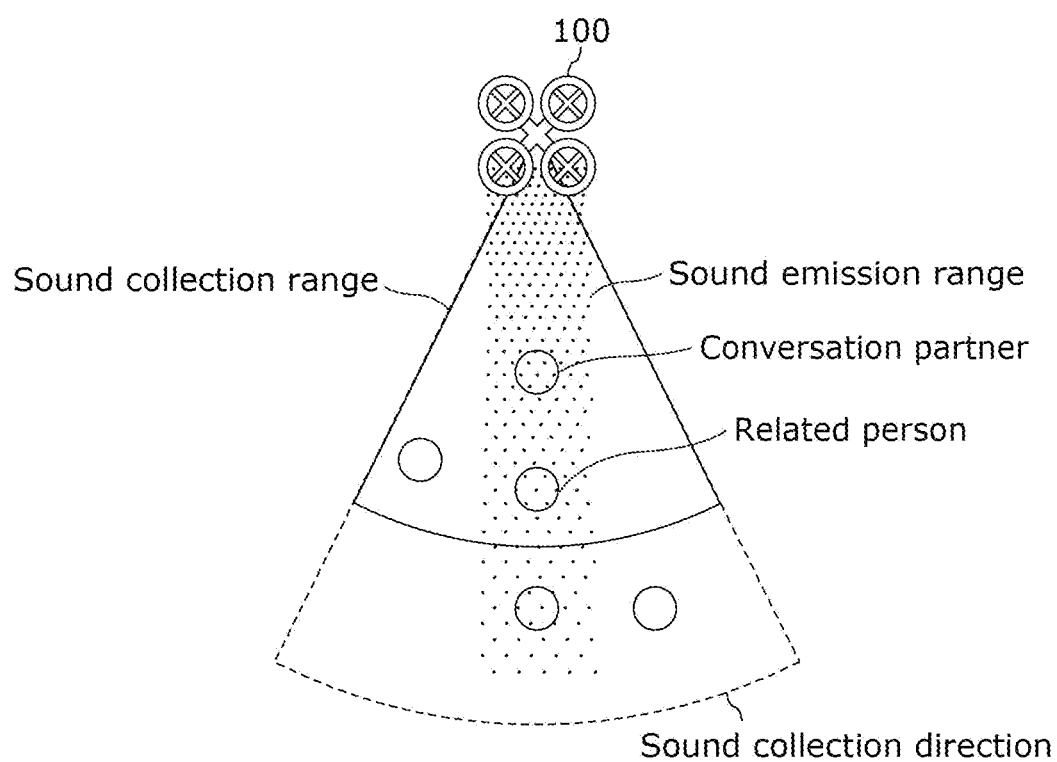
FIG. 23 is a conceptual diagram illustrating an example of a related person appropriate for sound emission and sound collection, according to Embodiment 1.

FIG. 23 is a conceptual diagram illustrating an example of a related person appropriate for sound emission and sound collection. Unmanned moving body 100 selects, as the final related person, a person who is present in the sound emission range over which sound from directional speaker 107 reaches and who is present in a sound collection range from which sound is collected by directional microphone 108, Here, the sound collection range may be determined in accordance with a sound pressure preset as the sound pressure of an average person's voice. The sound collection range can also be expressed as a range in which voice can be collected.

For example, an overlapping range of the sound emission range and the sound collection range is set as a conversation range. Unmanned moving body 100 selects a person within the conversation range as the final related person.

Note that as unmanned moving body 100 moves, the sound emission range and the sound collection range displace, and the conversation range displaces as well. As such, unmanned moving body 100 may simulate movement of unmanned moving body 100, and select, as the final related person, a related person who, among the plurality of related persons, can enter into the conversation range with the conversation partner.

Additionally, the plurality of above-described methods used for narrowing down may be combined as appropriate. Although FIG. 23 illustrates an example of narrowing down the plurality of related persons, the details depicted may be used to determine a related person. In other words, unmanned moving body 100 may determine that a person in an appropriate position for conversation is a related person. Note that another method of narrowing down may be used as a method for determining the final related person among a plurality of related person candidates.

Additionally, although not illustrated in FIGS. 13 to 23, unmanned moving body 100 may determine whether or not a person aside from the conversation partner is a related person related to the conversation partner through facial recognition. For example, the conversation partner and faces of related persons related to the conversation partner may be managed in association with each other. Then, when the face of a person aside from the conversation partner matches a face associated with the conversation partner as the face of a related person related to the conversation partner, unmanned moving body 100 may determine that the person is a related person. Unmanned moving body 100 may use another feature such as body shape instead of a face.

Additionally, when, during a conversation between unmanned moving body 100 and the conversation partner, a person aside from the conversation partner is facing unmanned moving body 100, it is presumed that the person aside from the conversation partner is showing interest in the conversation between unmanned moving body 100 and the conversation partner. Thus in this case, unmanned moving body 100 may determine that the stated person is a related person.

Unmanned moving body 100 determines the position of unmanned moving body 100 as the sound emission position in such a manner that the conversation partner and the related person are within the sound emission range. For example, sound emission position determiner 124 of unmanned moving body 100 determines the sound emission position, More specific methods for determining the sound emission position will be described hereinafter with reference to FIGS. 24 to 38.

Figure 24:
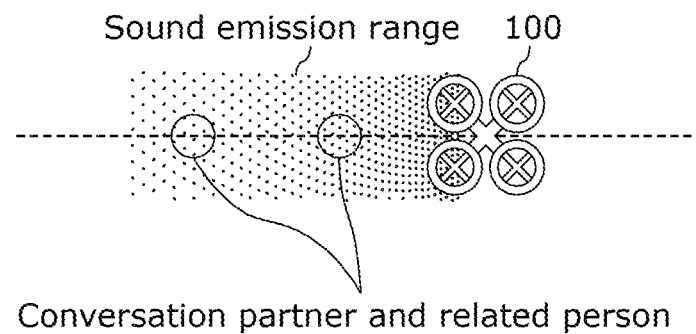
FIG. 24 is a conceptual diagram illustrating an example of a sound emission position on a straight line passing through the position of a conversation partner and the position of a related person, according to Embodiment 1.

FIG. 24 is a conceptual diagram illustrating an example of a sound emission position on a straight line passing through the position of a conversation partner and the position of a related person. In this example, unmanned moving body 100 determines, as the sound emission position, a position which is on a straight line passing through the position of the conversation partner and the position of the related person and at which the conversation partner and the related person are within the sound emission range determined relatively according to the stated position. This makes it possible for unmanned moving body 100 to emit sound appropriately to the conversation partner and the related person along the sound emission direction.

Figure 25:
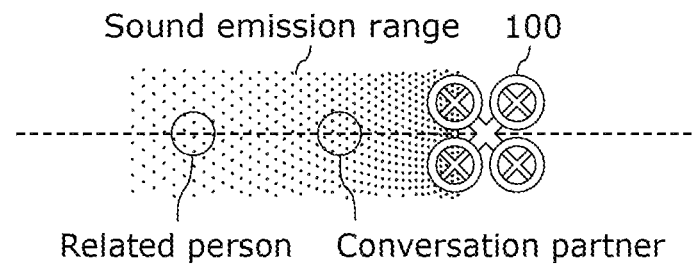
FIG. 25 is a conceptual diagram illustrating an example of a sound emission position close to a conversation partner, according to Embodiment 1.

FIG. 25 is a conceptual diagram illustrating an example of a sound emission position close to a conversation partner. For example, unmanned moving body 100 emits sound from a sound emission position on an outer side of the conversation partner and the related person, toward the conversation partner and the related person in the orientation direction, on a straight line passing through the position of the conversation partner and the position of the related person. In the example illustrated in FIG. 25, unmanned moving body 100 emits sound at a sound emission position on the conversation partner's side. In other words, unmanned moving body 100 determines a position close to the conversation partner as the sound emission position.

A predetermined conversation partner is presumed to converse with unmanned moving body 100 more than with a related person. Additionally, when a related person is present between unmanned moving body 100 and the conversation partner, the related person may interfere with the conversation between unmanned moving body 100 and the conversation partner. As such, determining a position close to the conversation partner as the sound emission position makes it possible to carry out more conversations smoothly.

Figure 26:
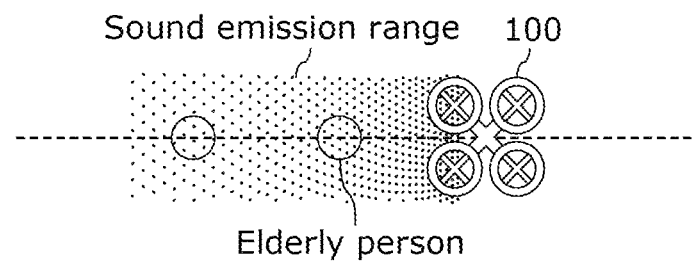
FIG. 26 is a conceptual diagram illustrating an example of a sound emission position close to an elderly person, according to Embodiment 1.

FIG. 26 is a conceptual diagram illustrating an example of a sound emission position close to an elderly person. Unmanned moving body 100 may determine a position close to an elderly person as the sound emission position instead of a position close to the conversation partner. For example, when the conversation partner is not determined in advance, unmanned moving body 100 may determine a position close to an elderly person as the sound emission position, Unmanned moving body 100 may estimate a person's age using facial recognition.

Hearing ability is assumed to decline with age. By determining a position close to an elderly person as the sound emission position, unmanned moving body 100 can deliver sound to the elderly person at a higher sound pressure. This enables unmanned moving body 100 to compensate for decreased hearing ability.

In the case of a parent and a child, a position close to the older person, i.e., a position close to the parent, is determined as the sound emission position. This makes it possible to keep the child away from unmanned moving body 100.

Additionally, unmanned moving body 100 may determine that a person whose age is estimated to be at least a predetermined age is an elderly person. Then, when it is determined that one of the conversation partner and the related person is an elderly person, unmanned moving body 100 may determine a position close to the elderly person as the sound emission position. When it is determined that both the conversation partner and the related person are elderly persons, unmanned moving body 100 may determine a position distanced from both as the sound emission position, or may determine the sound emission position according to another condition.

Figure 27:
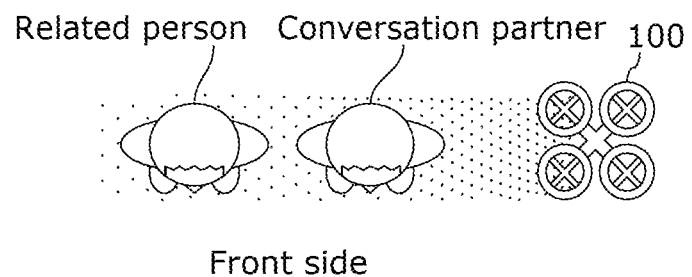
FIG. 27 is a conceptual diagram illustrating an example of a sound emission position that has been corrected to a front side centered on a related person, according to Embodiment 1.
Figure 27:
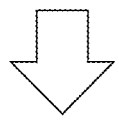
Figure 27:
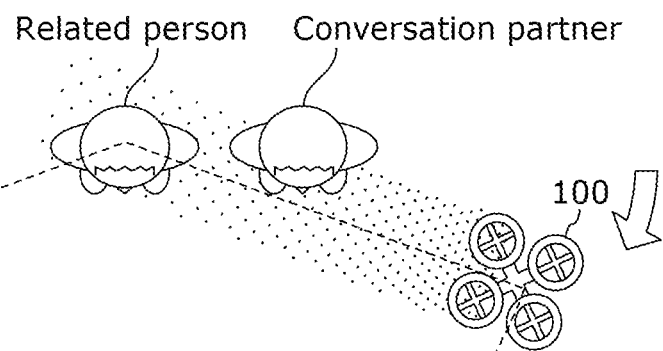

FIG. 27 is a conceptual diagram illustrating an example of a sound emission position that has been corrected to a front side centered on a related person. As illustrated in the top part of FIG. 27, even when unmanned moving body 100 is present to the side of the conversation partner and a related person, unmanned moving body 100 can deliver sound to the conversation partner and the related person. On the other hand, it is easier for the conversation partner and the related person to converse with unmanned moving body 100 when unmanned moving body 100 is present further on the front side of the conversation partner and the related person than to the side.

In other words, by being present on the front side of the conversation partner and the related person, unmanned moving body 100 can provide a smooth conversation for the conversation partner and the related person, Unmanned moving body 100 may therefore correct the sound emission position to the front side of the conversation partner and the related person.

Specifically, as illustrated in the bottom part of FIG. 27, unmanned moving body 100 may correct the sound emission position to the front side of the conversation partner and the related person along a circle presumed to be centered on the related person. This makes it possible for unmanned moving body 100 to correct the sound emission position without changing the distance from the related person.

Note that unmanned moving body 100 may correct the sound emission position along a circle presumed to be centered on the conversation partner. This makes it possible for unmanned moving body 100 to correct the sound emission position without changing the distance from the conversation partner. However, by using a circle presumed to be centered on the one of the conversation partner and the related person further from unmanned moving body 100, unmanned moving body 100 can suppress fluctuations in the distance from each of the conversation partner and the related person to unmanned moving body 100.

Additionally, unmanned moving body 100 is not limited to correcting the sound emission position along a circle, and may move to the forward direction of at least one of the conversation partner or the related person and direct the sound emission direction toward at least one of the conversation partner or the related person. Unmanned moving body 100 may correct the sound emission position to a position in the forward direction for performing such operations.

Figure 28:
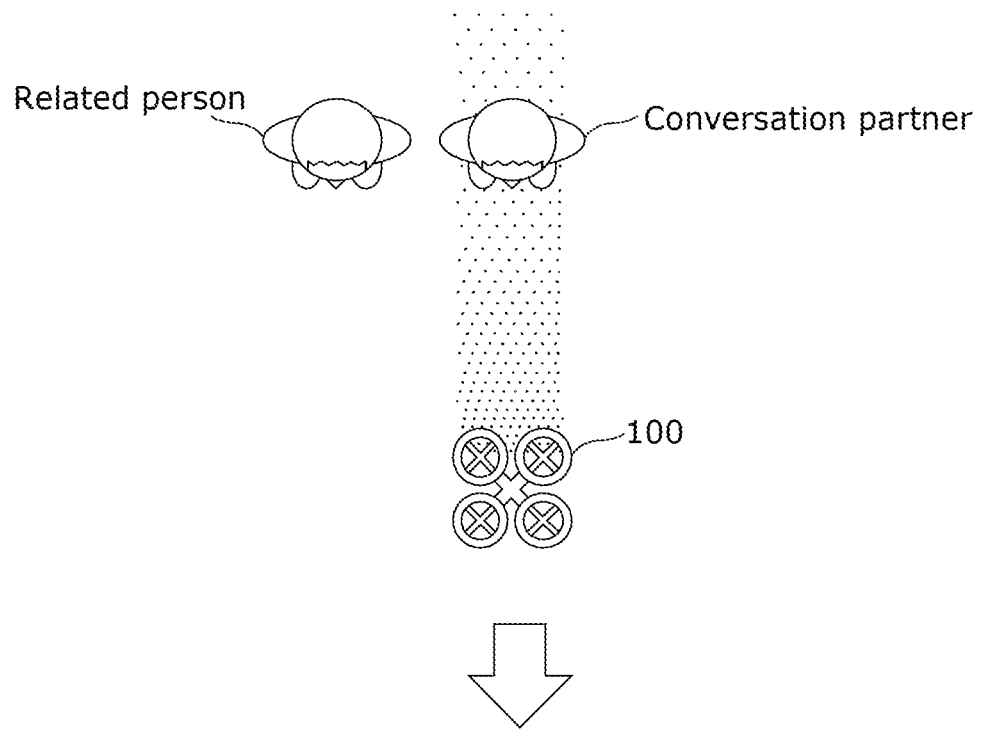
FIG. 28 is a conceptual diagram illustrating an example of a sound emission position determined central to a conversation partner so that a related person is within a sound emission range, according to Embodiment 1.
Figure 28:
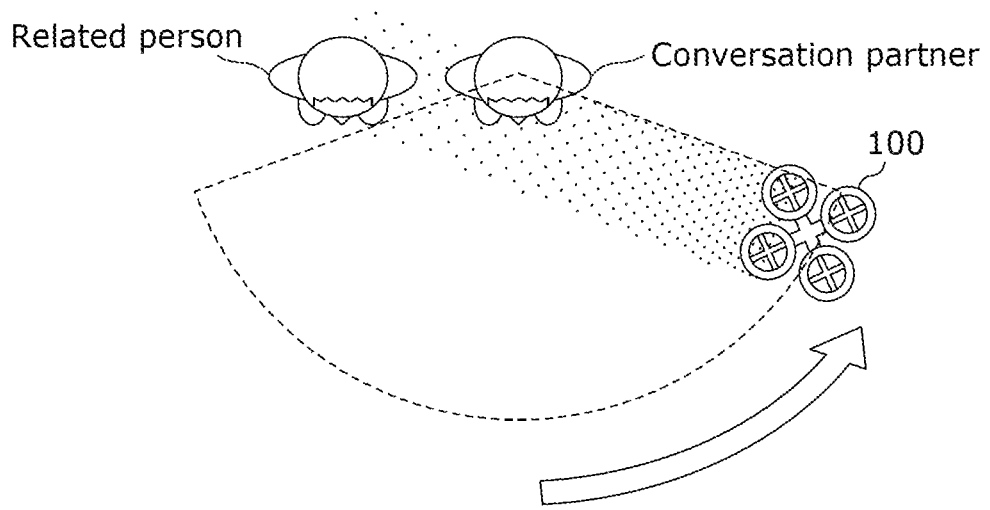

FIG. 28 is a conceptual diagram illustrating an example of a sound emission position determined central to a conversation partner so that a related person is within a sound emission range. As illustrated in the top part of FIG. 28, unmanned moving body 100 is present on the front side of the conversation partner while conversing with the conversation partner. Then, as illustrated in the bottom part of FIG. 28, unmanned moving body 100 may move along a circle presumed to be centered on the conversation partner so that the related person is within the sound emission range. In this case, unmanned moving body 100 may determine the sound emission position along the circle presumed to be centered on the conversation partner.

This makes it possible for unmanned moving body 100 to move to a position where sound can be delivered to the conversation partner and the related person without changing the distance from the conversation partner.

Figure 29:
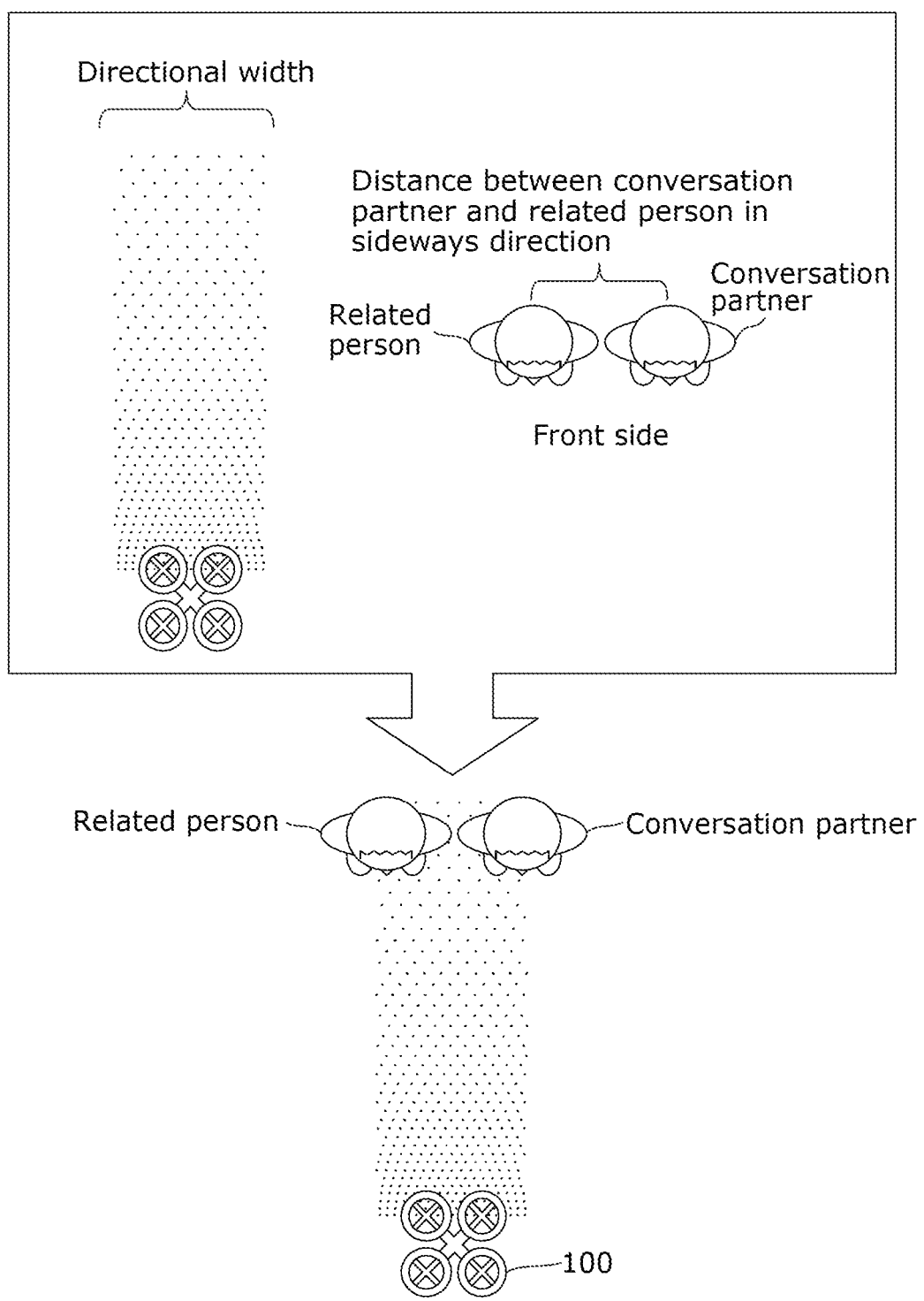
FIG. 29 is a conceptual diagram illustrating an example of a sound emission position on a front side of a conversation partner and a related person, according to Embodiment 1.

FIG. 29 is a conceptual diagram illustrating an example of a sound emission position on a front side of a conversation partner and a related person. When the distance between the conversation partner and the related person in a sideways direction perpendicular to the forward direction of the conversation partner and the related person is no greater than the directional width, unmanned moving body 100 may determine a position on the front side of the conversation partner and the related person as the sound emission position.

This makes it possible for unmanned moving body 100 to emit sound to the conversation partner and the related person from a position on the front side of the conversation partner and the related person. In other words, unmanned moving body 100 can carry out a conversation from a position on the front side of the conversation partner and the related person. Unmanned moving body 100 can therefore provide a smooth conversation to the conversation partner and the related person.

It is assumed that the position on the front side of the conversation partner and the related person is more suitable for conversation than a position to the side of the conversation partner and the related person. Accordingly, unmanned moving body 100 may preferentially determine the front side of the conversation partner and the related person as the sound emission position.

Figure 30:
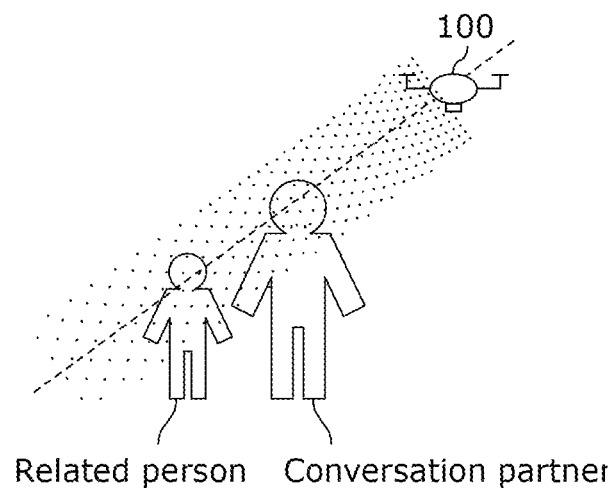
FIG. 30 is a conceptual diagram illustrating an example of a sound emission position on a straight line in a direction diagonal with respect to a horizontal plane, according to Embodiment 1.

FIG. 30 is a conceptual diagram illustrating an example of a sound emission position on a straight line in a direction diagonal with respect to a horizontal plane. For example, unmanned moving body 100 may obtain body information of the conversation partner and body information of the related person through image recognition processing, facial recognition processing, or the like. Unmanned moving body 100 may then determine the sound emission position in accordance with the body information of the conversation partner and the body information of the related person. The body information may be a height, or may be a face height.

Specifically, when there is a discrepancy between the height of the conversation partner's face and the height of the related person's face, unmanned moving body 100 determines, as the sound emission position, a position which is on a straight line passing through the position of the conversation partner's face and the position of the related person's face and at which the conversation partner and the related person are within the sound emission range. In this case, unmanned moving body 100 emits sound along a sound emission direction that is oblique relative to the horizontal plane.

This makes it possible for unmanned moving body 100 to emit sound appropriately to the conversation partner and the related person along the sound emission direction.

A case where the conversation partner and the related person are a parent and child, or a case where the conversation partner and the related person are a person sitting in a wheelchair and a person pushing the wheelchair, can be given as examples of cases where there is a discrepancy between the height of the conversation partner's face and the height of the related person's face. Additionally, although FIG. 30 illustrates an example in which the parent is the conversation partner and the child is the related person, the conversation partner and the related person may be reversed.

Also, as sound emission in an oblique direction, the sound emission may be from a higher position toward a lower position, or from a lower position toward a higher position. When sound is emitted from a lower position toward a higher position, the flight altitude is low, which makes flight difficult and increases the chance of contact with a person. Unmanned moving body 100 will also approach small children. As such, the sound may be emitted from a higher position toward a lower position. This makes it possible to suppress the likelihood of collisions and the like, for example.

Figure 31:
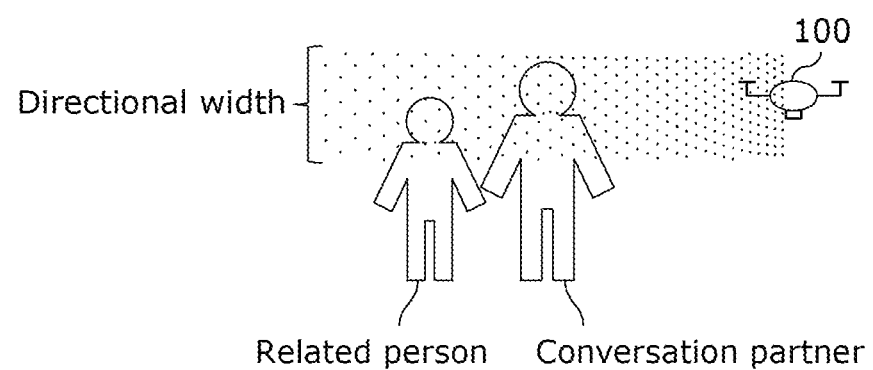
FIG. 31 is a conceptual diagram illustrating an example of a sound emission position on a straight line in a horizontal direction, according to Embodiment 1.

FIG. 31 is a conceptual diagram illustrating an example of a sound emission position on a straight line in a horizontal direction. When the conversation partner's face and the related person's face are within the directional width of the sound emission, unmanned moving body 100 may determine, as the sound emission position, a position at which the conversation partner's face and the related person's face are within the sound emission range and which is a position for emitting sound in a horizontal direction. In other words, when the height of the conversation partner's face and the height of the related person's face deviate beyond a predetermined range, unmanned moving body 100 may determine a position for emitting sound in an oblique direction as the sound emission position, as illustrated in FIG. 30.

In other words, unmanned moving body 100 need not change altitude as long as a difference between the height of the conversation partner's face and the height of the related person's face is within a predetermined range. This simplifies the processing. However, increasing the altitude of unmanned moving body 100 makes it possible to suppress the likelihood of collisions and the like, which in turn makes it possible to provide smooth conversations.

Figure 32:
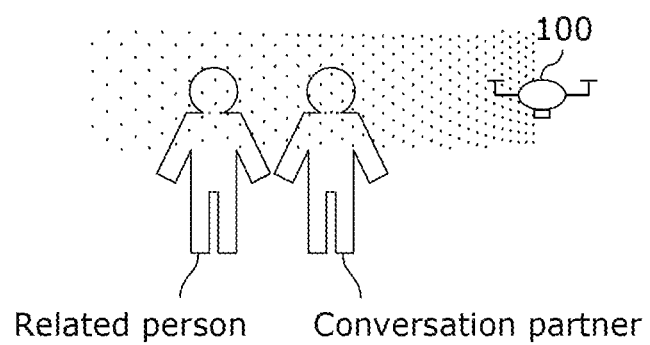
FIG. 32 is a conceptual diagram illustrating an example of a sound emission position at the same height as a conversation partner and a related person, according to Embodiment 1.

FIG. 32 is a conceptual diagram illustrating an example of a sound emission position at the same height as a conversation partner and a related person. As described above, unmanned moving body 100 may determine a position for emitting sound in the horizontal direction as the sound emission position. This simplifies the processing.

However, in this case, unmanned moving body 100 may come into contact with a person. Furthermore, it is difficult for a person far from unmanned moving body 100 and unmanned moving body 100 to have a conversation because the conversation takes place over a person close to unmanned moving body 100. Specifically, in the example illustrated in FIG. 32, the related person and unmanned moving body 100 carry out a conversation over the conversation partner, which makes it difficult to carry out the conversation.

Figure 33:
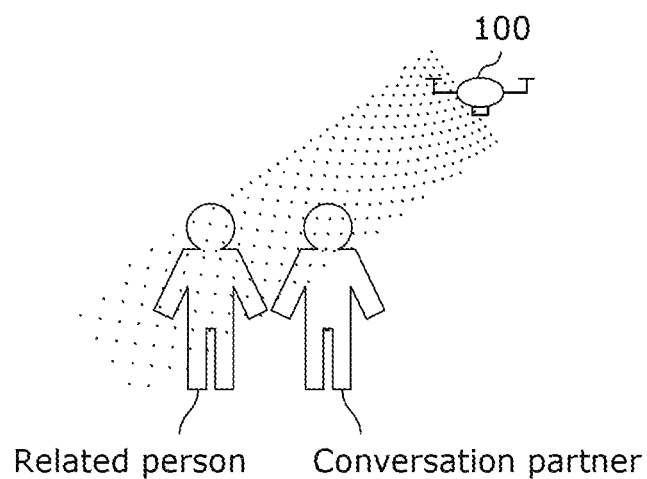
FIG. 33 is a conceptual diagram illustrating an example of a sound emission position higher than a conversation partner and a related person, according to Embodiment 1.

FIG. 33 is a conceptual diagram illustrating an example of a sound emission position higher than a conversation partner and a related person. Unmanned moving body 100 may preferentially determine a position higher than the conversation partner and the related person as the sound emission position. This makes it possible for unmanned moving body 100 to suppress the likelihood of collisions and the like, Unmanned moving body 100 can also provide smooth conversations both to a person close to unmanned moving body 100 and to a person far from unmanned moving body 100.

Figure 34:
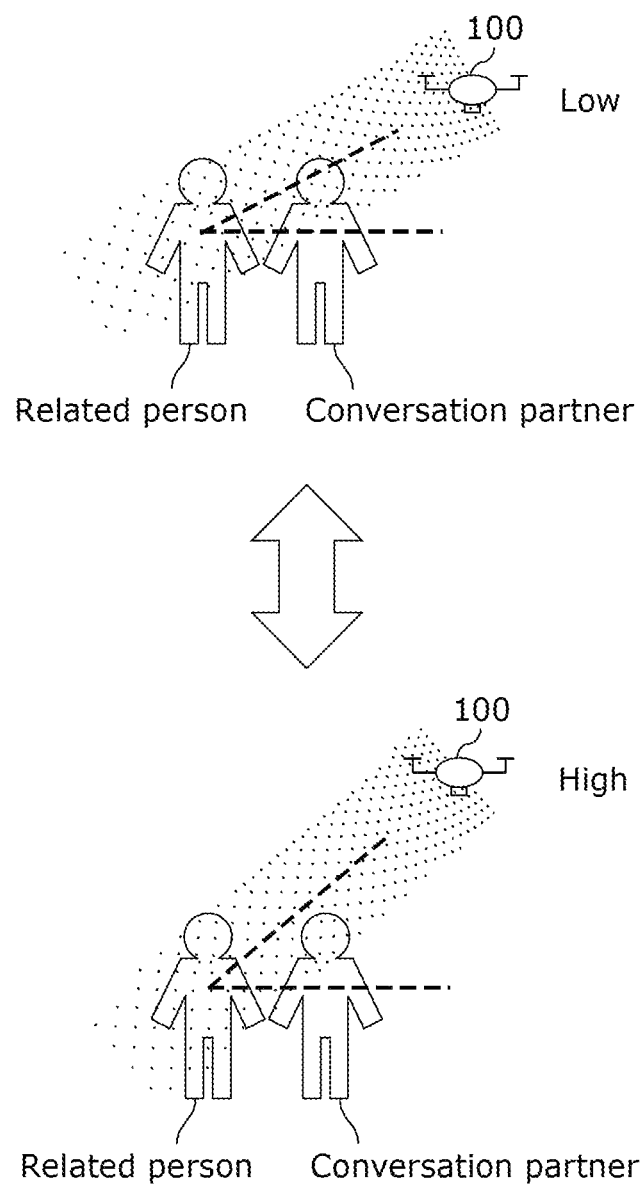
FIG. 34 is a conceptual diagram illustrating an example of the height of a sound emission position, according to Embodiment 1.

FIG. 34 is a conceptual diagram illustrating an example of the height of a sound emission position. If the sound emission position is too high, the angle at which the conversation partner and the related person look up at unmanned moving body 100 will be too large. This means the conversation partner and the related person will converse while looking up at unmanned moving body 100, which makes it difficult to have a smooth conversation.

Accordingly, an upper limit may be set for the height of the sound emission position or the angle between the sound emission direction and a horizontal plane. For example, the upper limit for the height of the sound emission position may be set in accordance with the separation distance between unmanned moving body 100 and the one of the conversation partner and the related person who is closest to unmanned moving body 100. For example, the upper limit on the height of the sound emission position may be set lower the closer the position is to the conversation partner and the related person. This keeps the angle at which the conversation partner and the related person look up at unmanned moving body 100 low.

Figure 35:
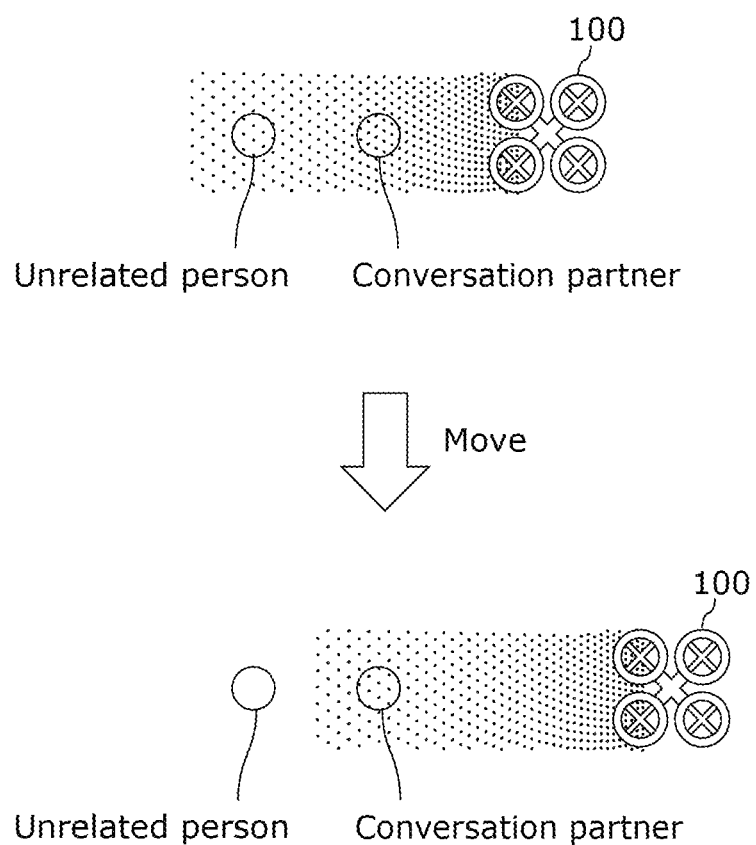
FIG. 35 is a conceptual diagram illustrating an example of a sound emission position for excluding an unrelated person from a sound emission range, according to Embodiment 1.

FIG. 35 is a conceptual diagram illustrating an example of a sound emission position for excluding an unrelated person from a sound emission range. When a person aside from the conversation partner is determined to not be a related person, unmanned moving body 100 may determine the sound emission position so that the person determined to not be a related person is not included in the sound emission range. In other words, when a person aside from the conversation partner is determined to be an unrelated person, unmanned moving body 100 may determine the sound emission position so that the unrelated person is not included in the sound emission range.

For example, unmanned moving body 100 determines the sound emission position so as to increase the separation distance between unmanned moving body 100 and the unrelated person, and moves to the sound emission position. This makes it possible for unmanned moving body 100 to make it harder for sound to reach the unrelated person.

Additionally, for example, unmanned moving body 100 determines the sound emission position within a range in which sound does not reach the unrelated person but reaches the conversation partner. In other words, unmanned moving body 100 determines the sound emission position in such a manner that the unrelated person is not within the sound emission range and the conversation partner is within the sound emission range. This makes it possible for unmanned moving body 100 to emit sound to the conversation partner without emitting sound to the unrelated person.

Note that unmanned moving body 100 may determine the sound emission position in such a manner that the unrelated person is not within the sound emission range and the conversation partner and the related person are within the sound emission range. This makes it possible for unmanned moving body 100 to emit sound to the conversation partner and the related person without emitting sound to the unrelated person.

Figure 36:
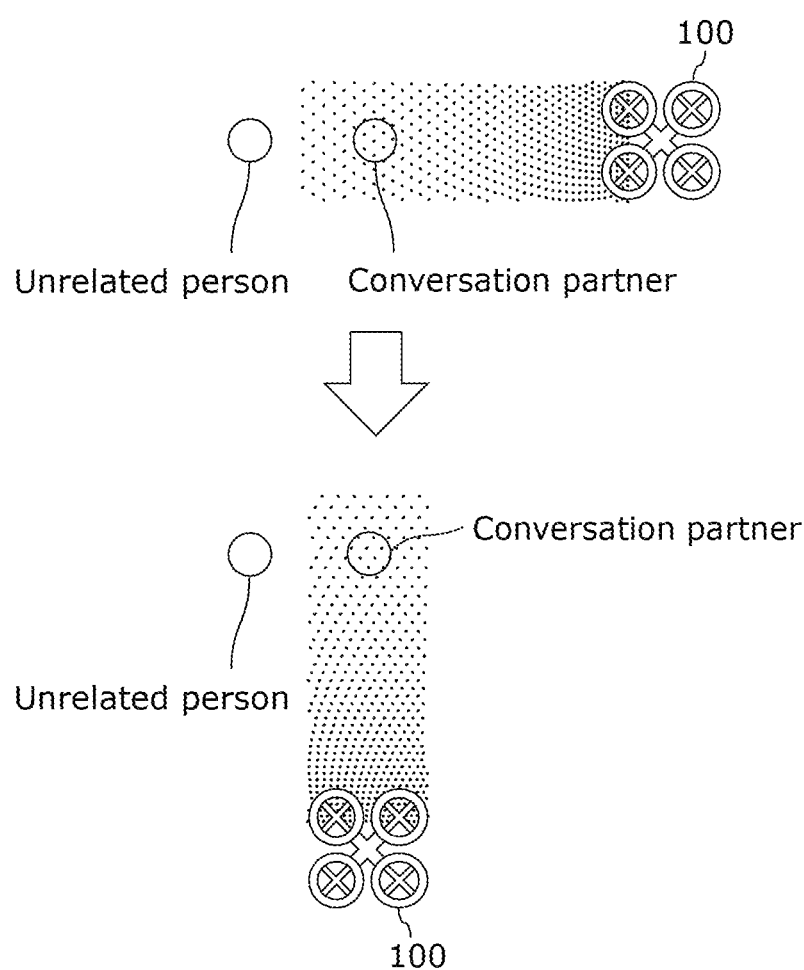
FIG. 36 is a conceptual diagram illustrating an example of a positional relationship, on a horizontal plane, between an unrelated person, a conversation partner, and the unmanned moving body, according to Embodiment 1.

FIG. 36 is a conceptual diagram illustrating an example of a positional relationship, on a horizontal plane, between an unrelated person, a conversation partner, and unmanned moving body 100. For example, as indicated by the example in the top part of FIG. 36, unmanned moving body 100 may determine a position far from an unrelated person as the sound emission position. However, in the example in the top part of FIG. 36, the unrelated person is present in the sound emission direction, and sound may therefore reach the unrelated person.

Accordingly, as illustrated in the example in the bottom part of FIG. 36, unmanned moving body 100 may determine the sound emission position in such a manner that the unrelated person is outside the sound emission direction. Specifically, unmanned moving body 100 may determine, as the sound emission position, a position not present on a straight line passing through the position of the conversation partner and the position of the related person. This makes it possible for unmanned moving body 100 to suppress the likelihood of sound reaching the unrelated person.

Note that in the example in the bottom part of FIG. 36 as well, unmanned moving body 100 may determine the sound emission position in such a manner that the unrelated person is not within the sound emission range and the conversation partner and the related person are within the sound emission range.

Figure 37:
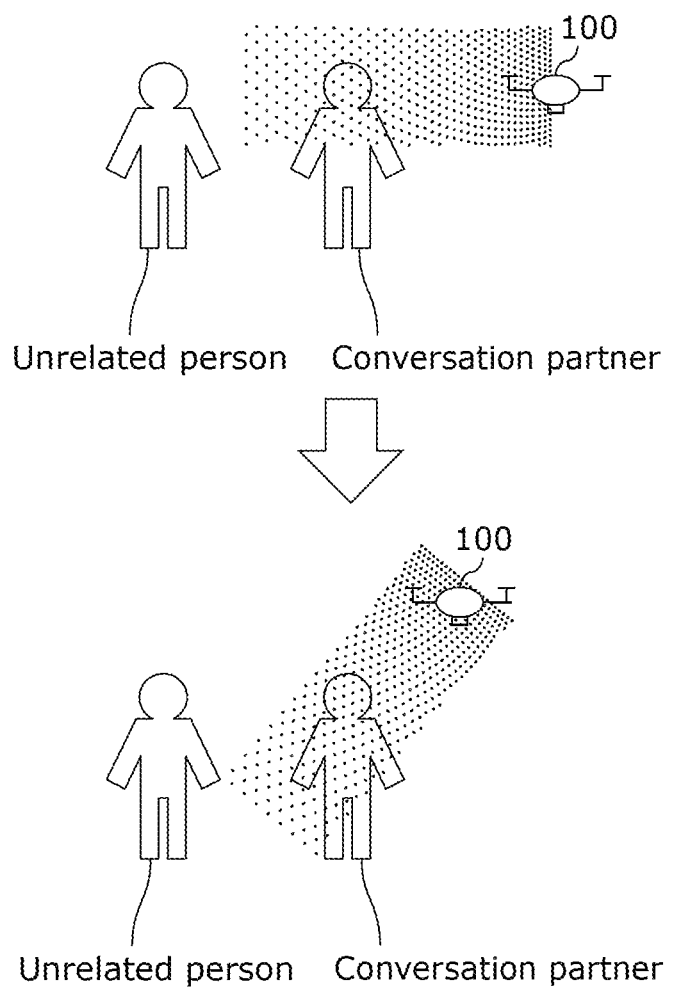
FIG. 37 is a conceptual diagram illustrating an example of a positional relationship, on a vertical plane, between an unrelated person, a conversation partner, and the unmanned moving body, according to Embodiment 1.

FIG. 37 is a conceptual diagram illustrating an example of a positional relationship, on a vertical plane, between an unrelated person, a conversation partner, and unmanned moving body 100, When sound is emitted from unmanned moving body 100 in the horizontal direction, there is a relatively high likelihood that the unrelated person will be within the sound emission range or the sound emission direction, and it is therefore possible that sound will reach the unrelated person. Accordingly, unmanned moving body 100 may emit sound to the conversation partner from above the conversation partner. This makes it possible for unmanned moving body 100 to suppress the likelihood of the unrelated person entering the sound emission range or the sound emission direction, which in turn makes it possible to suppress the likelihood that sound will reach the unrelated person.

Note that unmanned moving body 100 may determine the height of the sound emission position in such a manner that the unrelated person is not within the sound emission range and the conversation partner and the related person are within the sound emission range.

Figure 38:
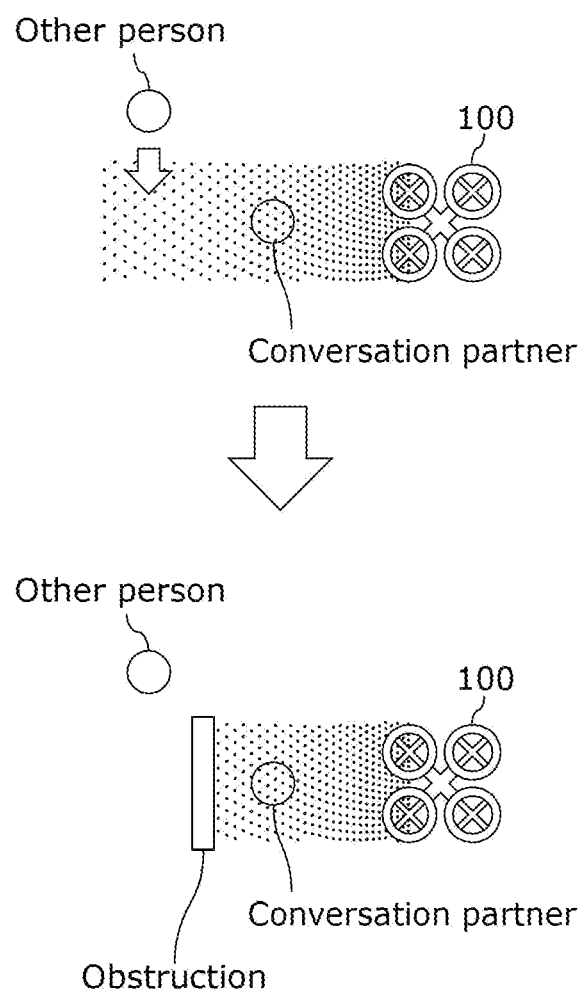
FIG. 38 is a conceptual diagram illustrating an example of a sound emission position for excluding another person from a sound emission range according to Embodiment 1.

FIG. 38 is a conceptual diagram illustrating an example of a sound emission position for excluding another person from a sound emission range. In order to exclude another person from the sound emission range, unmanned moving body 100 may determine, as the sound emission position, a position of unmanned moving body 100 at which the conversation partner is between unmanned moving body 100 and an obstruction. Unmanned moving body 100 may then move to the sound emission position and emit sound to the conversation partner. This makes it possible for unmanned moving body 100 to suppress the likelihood of sound reaching the other person.

Here, the obstruction is, for example, a physical environment that prevents the other person from entering the sound emission range. The obstruction may be a physical environment that prevents the sound emission range from broadening, or may be a physical environment through which a person cannot pass. Specifically, the obstruction may be a wall, a budding, or a cliff.

Additionally, unmanned moving body 100 may detect the position of the obstruction through image recognition processing, or may detect the position of the obstruction using an obstruction detection sensor (not shown).

Additionally, unmanned moving body 100 may specify the position of the obstruction from map information including the position of the obstruction. The map information may be stored in advance in storage 130 of unmanned moving body 100, or may be input from an external device to unmanned moving body 100 using communicator 110 of unmanned moving body 100. Then, by detecting the position of unmanned moving body 100, unmanned moving body 100 may detect the position of the obstruction in accordance with the map information.

For example, according to the top part of FIG. 38, there is no obstruction on the opposite side of the conversation partner from unmanned moving body 100, and it is therefore possible that another person will enter the sound emission range. As opposed to this, according to the bottom part of FIG. 38, there is an obstruction such as a wall on the opposite side of the conversation partner from unmanned moving body 100, which suppresses the possibility that another person will enter the sound emission range.

Note that a related person may be taken into account along with the conversation partner. Specifically, unmanned moving body 100 may determine, as the sound emission position, a position of unmanned moving body 100 at which the conversation partner and the related person are between unmanned moving body 100 and an obstruction. This makes it possible for unmanned moving body 100 to emit sound to the conversation partner and the related person without emitting sound to the other person.

With respect to the method for determining the sound emission position, one of the plurality of determination methods described with reference to FIGS. 24 to 38 may be used, or a desired combination of two or more of the determination methods may be used. A plurality of examples pertaining to movement and the like of unmanned moving body 100 will be described next.

Figure 39:
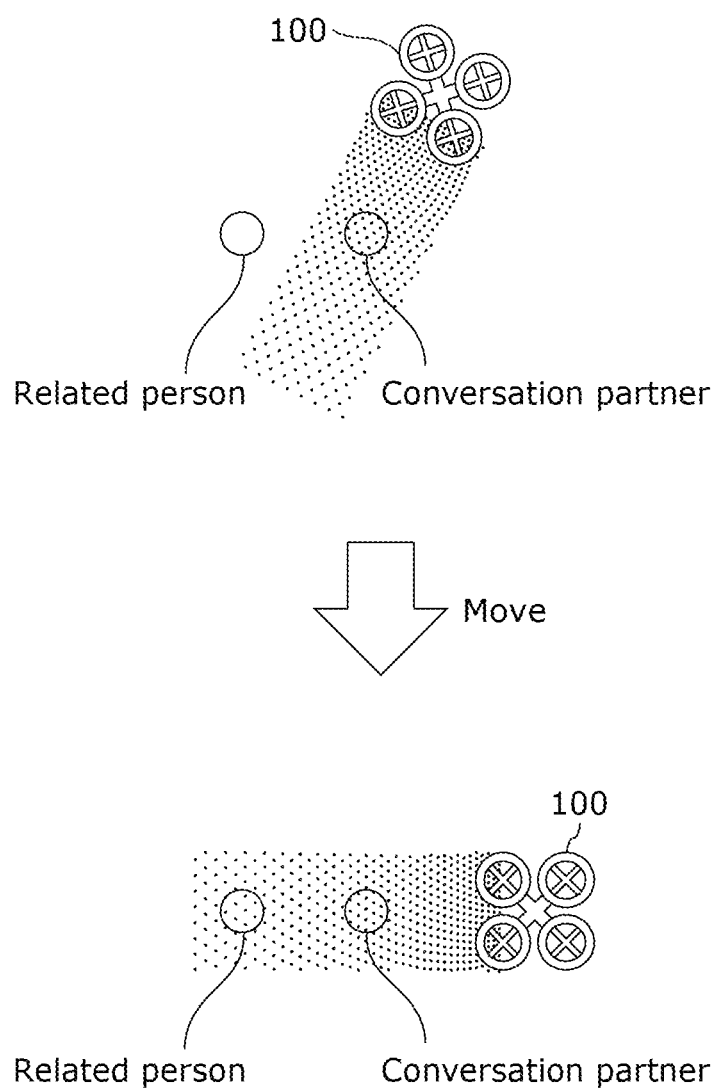
FIG. 39 is a conceptual diagram illustrating an example of the unmanned moving body moving to a sound emission position, according to Embodiment 1.

FIG. 39 is a conceptual diagram illustrating an example of unmanned moving body 100 moving to a sound emission position. For example, when moving to a sound emission position while emitting sound to the conversation partner, unmanned moving body 100 moves to the sound emission position in such a manner that the conversation partner does not exit the sound emission range during the movement. This makes it possible for unmanned moving body 100 to continuously deliver sound to the conversation partner.

Specifically, in this case, unmanned moving body 100 moves to the sound emission position while directing the orientation direction of directional speaker 107 toward the conversation partner. Unmanned moving body 100 moves within a predetermined distance from the conversation partner. This predetermined distance corresponds to the length of the sound emission range in the sound emission direction. Unmanned moving body 100 may create a movement path within the predetermined distance from the conversation partner and move to the sound emission position along the created movement path. This makes it possible for unmanned moving body 100 to move to the sound emission position in such a manner that the conversation partner does not exit the sound emission range during the movement.

Additionally, unmanned moving body 100 may change the sound pressure at which unmanned moving body 100 emits sound in accordance with the distance between unmanned moving body 100 and the conversation partner such that the sound pressure at which the sound reaches the conversation partner remains constant during the movement. For example, when moving away from the conversation partner, unmanned moving body 100 may move while increasing the sound pressure at which unmanned moving body 100 emits sound. Conversely, when moving toward the conversation partner, unmanned moving body 100 may move while reducing the sound pressure at which unmanned moving body 100 emits sound.

Figure 40:
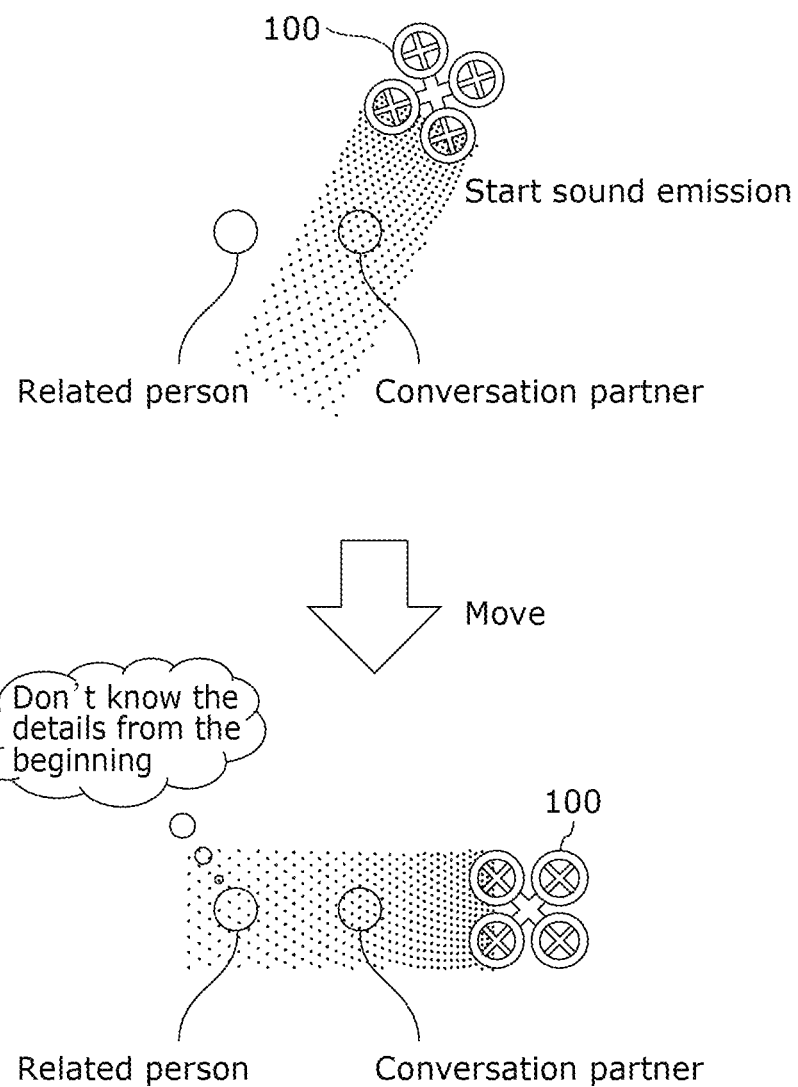
FIG. 40 is a conceptual diagram illustrating an example of the unmanned moving body moving to a sound emission position after starting sound emission, according to Embodiment 1.

FIG. 40 is a conceptual diagram illustrating an example of unmanned moving body 100 moving to a sound emission position after starting sound emission. For example, unmanned moving body 100 moves to the sound emission position while emitting sound to the conversation partner. In other words, unmanned moving body 100 moves to the sound emission position after starting to emit sound. In this case, a related person enters the sound emission range during the sound emission. It is therefore difficult for the related person to understand the details in the beginning of the sound emission.

Accordingly, unmanned moving body 100 may control the timing of the movement of unmanned moving body 100 in accordance with the conversation between the conversation partner and unmanned moving body 100.

Specifically, unmanned moving body 100 may move toward the sound emission position while the conversation partner is talking to unmanned moving body 100. It is presumed that unmanned moving body 100 will not emit sound while the conversation partner is talking to unmanned moving body 100. Unmanned moving body 100 can therefore suppress movement to the sound emission position while emitting sound, and can suppress a situation in which the related person enters the sound emission range while sound is being emitted.

For example, unmanned moving body 100 may determine whether or not the conversation partner is talking to unmanned moving body 100 using image recognition processing, or may determine whether or not the conversation partner is talking to unmanned moving body 100 using directional microphone 108.

Additionally, unmanned moving body 100 may move toward the sound emission position during a period in which sound is collected from the conversation partner. During the period in which sound is collected from the conversation partner, it is presumed that the conversation partner is talking to unmanned moving body 100 and that unmanned moving body 100 is not emitting sound. Accordingly, during the period in which sound is collected from the conversation partner, unmanned moving body 100 can suppress a situation in which the related person enters the sound emission range during sound emission by moving toward the sound emission position.

Additionally, unmanned moving body 100 may control whether or not to move depending on a status of sound collected by directional microphone 108. Specifically, unmanned moving body 100 does not move when the status of the sound collected by directional microphone 108 is poor. This makes it possible for unmanned moving body 100 to suppress further worsening in the status of the collected sound caused by the movement.

Additionally, if, for example, the conversation partner finishes talking to unmanned moving body 100 after unmanned moving body 100 has started moving toward the sound emission position but before unmanned moving body 100 has reached the sound emission position, unmanned moving body 100 continues to move toward the sound emission position. Unmanned moving body 100 then emits sound after reaching the sound emission position. This makes it possible for unmanned moving body 100 to suppress a situation in which the related person enters the sound emission range while sound is being emitted.

Additionally, for example, when the movement distance is long, unmanned moving body 100 may move to the sound emission position in stages. Specifically, unmanned moving body 100 may repeatedly move toward the sound emission position and stop, and emit sound when stopped. This makes it possible for unmanned moving body 100 to suppress a situation in which the related person enters the sound emission range during a single instance of sound emission. Additionally, unmanned moving body 100 can suppress delays in responses to the conversation partner.

Additionally, for example, unmanned moving body 100 may move toward the sound emission position when the conversation between unmanned moving body 100 and the conversation partner is temporarily interrupted. This makes it possible for unmanned moving body 100 to suppress a situation in which the related person enters the sound emission range while sound is being emitted, and suppress a worsening of the sound emission and sound collection to and from the conversation partner.

Additionally, unmanned moving body 100 may move toward the sound emission position during a period in which no sound is emitted to and collected from the conversation partner. This makes it possible for unmanned moving body 100 to suppress a situation in which the related person enters the sound emission range while sound is being emitted, and suppress a worsening of the sound emission and sound collection.

Additionally, when, for example, the conversation between unmanned moving body 100 and the conversation partner has ended, unmanned moving body 100 will not emit sound or collect sound, and may therefore stop moving. By recognizing the content of the conversation, unmanned moving body 100 may recognize whether the conversation between unmanned moving body 100 and the conversation partner has been temporarily interrupted or whether the conversation between unmanned moving body 100 and the conversation partner has ended.

Figure 41:
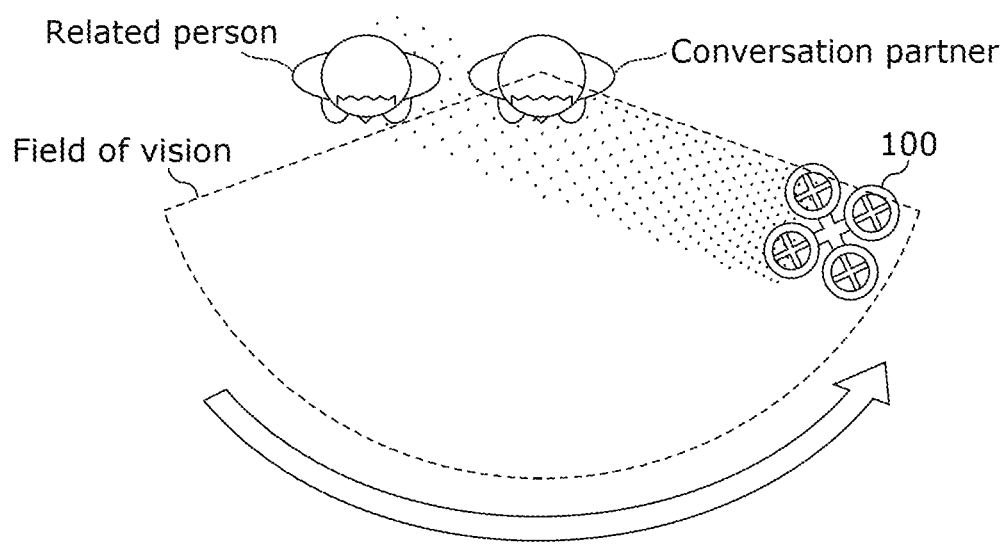
FIG. 41 is a conceptual diagram illustrating an example of the unmanned moving body moving to a sound emission position by passing on a front side, according to Embodiment 1.

FIG. 41 is a conceptual diagram illustrating an example of unmanned moving body 100 moving to a sound emission position by passing on a front side. For example, unmanned moving body 100 moves to the sound emission position through the front side of the conversation partner. The front side of the conversation partner corresponds to the field of vision of the conversation partner. When unmanned moving body 100 has exited the field of vision of the conversation partner, it is difficult for the conversation partner to converse with unmanned moving body 100, By moving to the sound emission position through the front side of the conversation partner, unmanned moving body 100 can provide a smooth conversation to the conversation partner during the movement.

Specifically, unmanned moving body 100 may specify the field of vision of the conversation partner by using image recognition processing to detect the front side of the conversation partner. Unmanned moving body 100 may then create a movement path within the specified field of vision and move to the sound emission position along the created movement path.

Additionally, although unmanned moving body 100 moves to the sound emission position through the front side of the conversation partner in the foregoing descriptions, unmanned moving body 100 may move to the sound emission position through the front side of the conversation partner and the related person. This makes it possible for unmanned moving body 100 to provide a smooth conversation to the related person as well.

Figure 42:
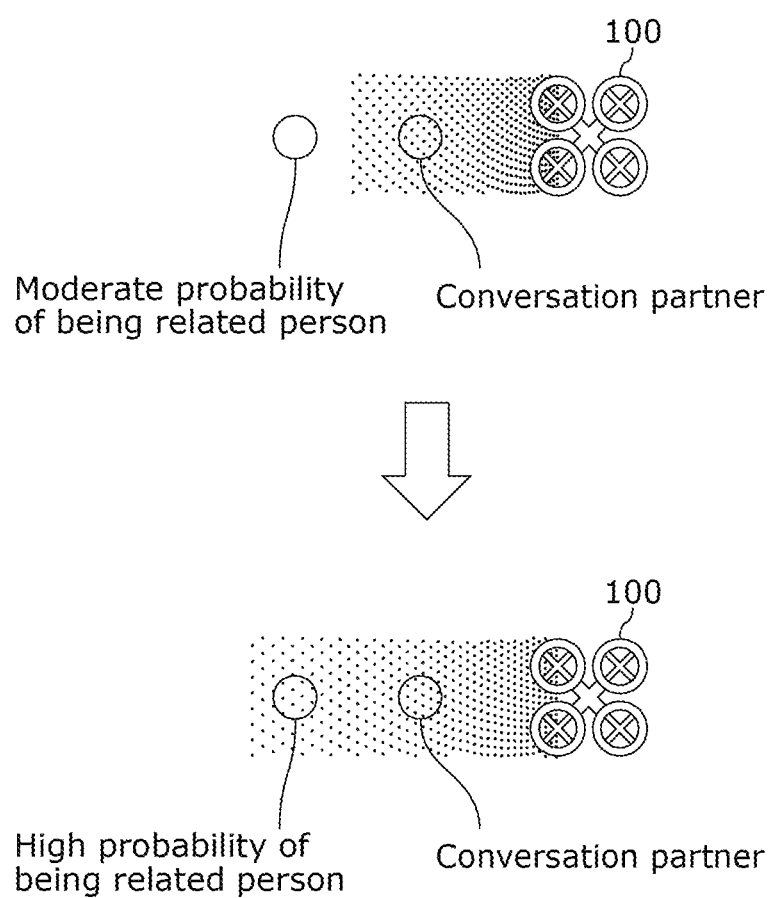
FIG. 42 is a conceptual diagram illustrating an example of the unmanned moving body changing a sound emission range, according to Embodiment 1.

FIG. 42 is a conceptual diagram illustrating an example of unmanned moving body 100 changing a sound emission range. Unmanned moving body 100 may adjust the sound emission position in such a manner that the conversation partner and the related person are within the sound emission range. Specifically, unmanned moving body 100 may adjust the sound emission range by adjusting the sound pressure of the sound emitted by directional speaker 107.

Additionally, as illustrated in the example in the top part of FIG. 42, when it is determined that there is a moderate probability that a person aside from the conversation partner is a related person, unmanned moving body 100 moves to a sound emission position at which the conversation partner and the person aside from the conversation partner are in the sound emission direction. Unmanned moving body 100 then adjusts the sound pressure of the sound emitted by directional speaker 107 such that the sound reaches the conversation partner but the sound does not reach the person aside from the conversation partner. In other words, unmanned moving body 100 reduces the sound pressure of the sound emitted by directional speaker 107.

Then, as illustrated in the example in the bottom part of FIG. 42, when it is determined that there is a high probability that the person aside from the conversation partner is a related person, unmanned moving body 100 adjusts the sound pressure of the sound emitted by directional speaker 107 such that the sound reaches the person aside from the conversation partner. In other words, unmanned moving body 100 increases the sound pressure of the sound emitted by directional speaker 107.

Accordingly, when the probability that the person aside from the conversation partner is a related person has increased, unmanned moving body 100 can immediately emit sound to the person aside from the conversation partner without moving. Note, however, that unmanned moving body 100 may move in the sound emission direction without increasing the sound pressure. This makes it possible for unmanned moving body 100 to suppress an increase in power consumption caused by the increase in the sound pressure.

Figure 43:
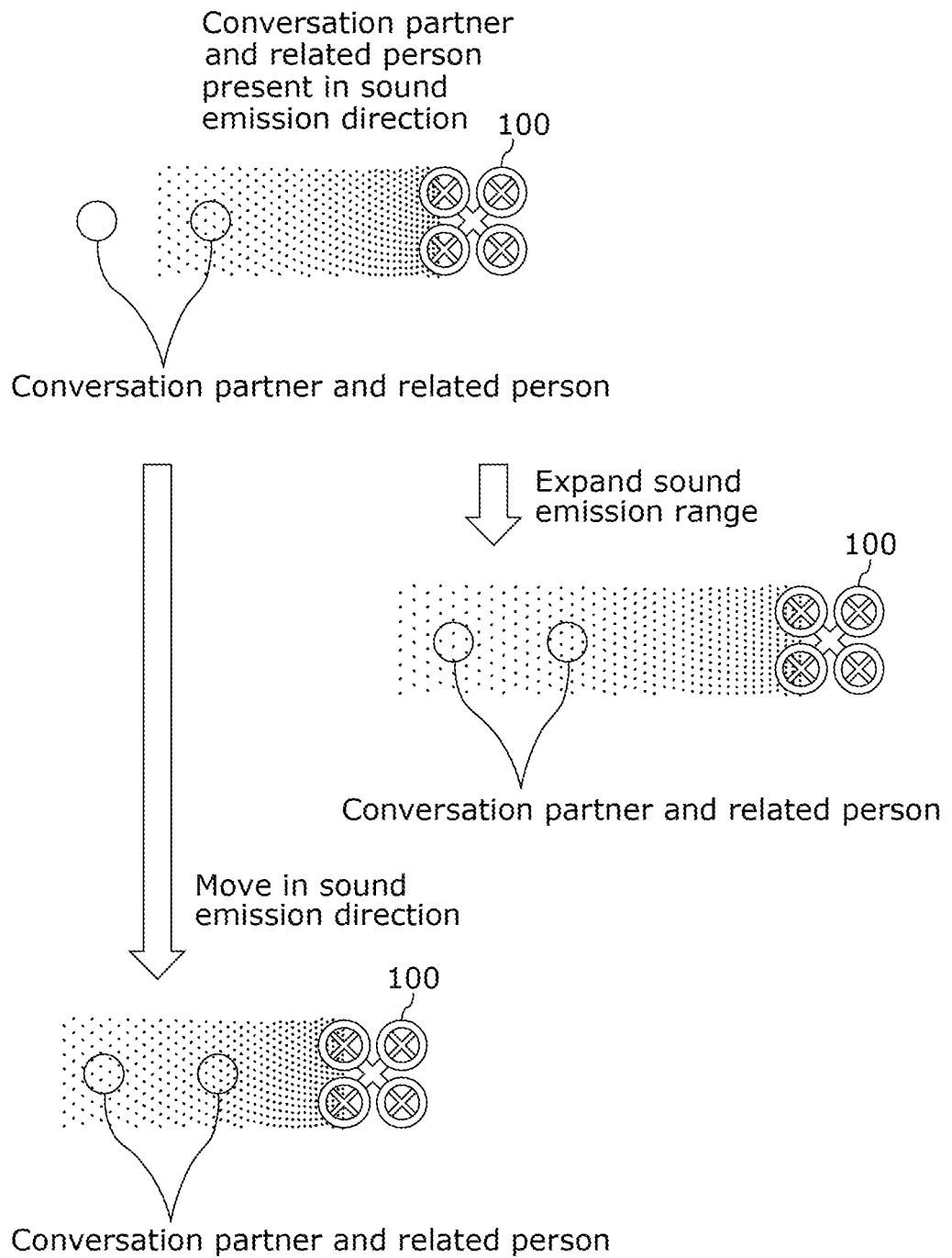
FIG. 43 is a conceptual diagram illustrating an example of movement, changing a sound emission range, and selective operations, according to Embodiment 1.

FIG. 43 is a conceptual diagram illustrating an example of movement, changing a sound emission range, and selective operations. When both the conversation partner and a related person are present in the sound emission direction, unmanned moving body 100 can select whether to expand the sound emission range or move in the sound emission direction. In other words, unmanned moving body 100 can include the conversation partner and the related person in the sound emission range by expanding the sound emission range, and can also include the conversation partner and the related person in the sound emission range by moving in the sound emission direction.

However, when expanding the sound emission range, unmanned moving body 100 increases the sound pressure of the sound emitted by unmanned moving body 100. It is assumed that the power consumption will also increase as a result. Accordingly, unmanned moving body 100 may prioritize moving in the sound emission direction over expanding the sound emission range.

Additionally, when unmanned moving body 100 is too close to the conversation partner, there is a possibility that unmanned moving body 100 will come into contact with the conversation partner. Additionally, when unmanned moving body 100 is too close to the conversation partner, there are cases where the sound from unmanned moving body 100 is too loud. As such, unmanned moving body 100 may move in the sound emission direction until unmanned moving body 100 is as close as possible to the conversation partner. If the related person is not within the sound emission range even in this state, unmanned moving body 100 may expand the sound emission range. This makes it possible for unmanned moving body 100 to emit sound appropriately to the conversation partner and the related person.

Figure 44:
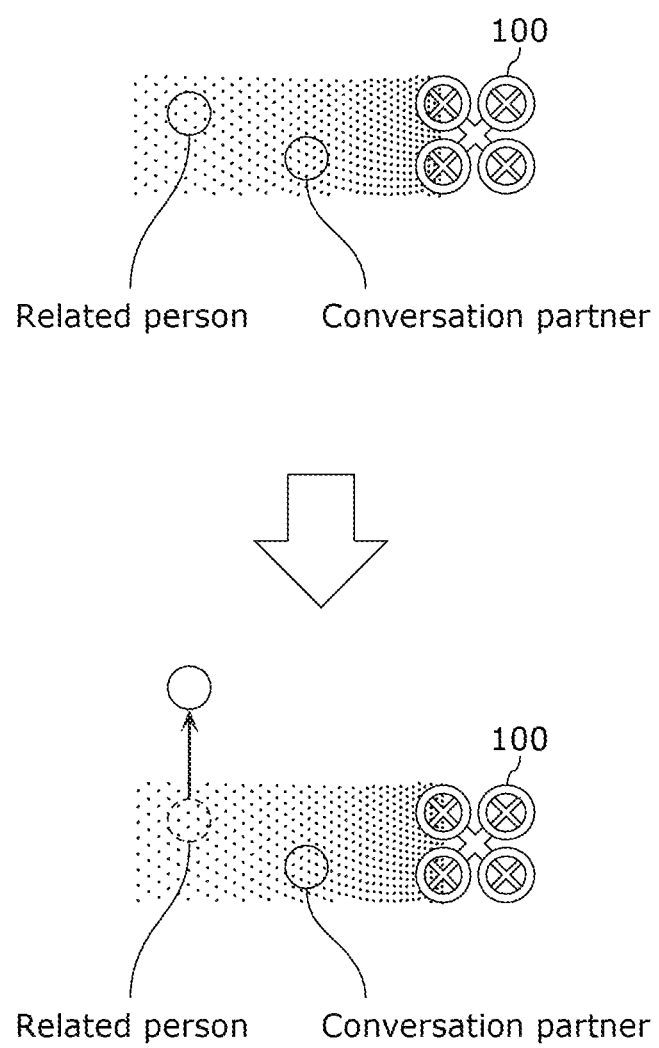
FIG. 44 is a conceptual diagram illustrating an example of a case where a related person has left a sound emission range, according to Embodiment 1.

FIG. 44 is a conceptual diagram illustrating an example of a case where a related person has left a sound emission range. For example, when the related person has left the sound emission range, and more specifically, when the related person has left the sound emission range him or herself, it is assumed that the related person does not intend to have a conversation with unmanned moving body 100.

Accordingly, for example, in the foregoing case, unmanned moving body 100 does not move to a sound emission position for including the related person in the sound emission range. This makes it possible for unmanned moving body 100 to suppress power consumption resulting from wasteful movement, and suppress the unnecessary emission of sound to the related person.

Additionally, for example, when the related person has left the sound emission range while unmanned moving body 100 is emitting sound, it is more likely that the related person does not intend to listen to the sound emitted from unmanned moving body 100. Accordingly, for example, in this case, unmanned moving body 100 may skip the movement for including the related person in the sound emission range.

However, it is also possible that the related person is moving while still intending to converse with unmanned moving body 100. For example, when a state in which the related person is not very far from the sound emission range continues for at least a predetermined amount of time, it is possible that the related person intends to converse with unmanned moving body 100, Accordingly, when a state in which the related person is not very far from the sound emission range continues for at least a predetermined amount of time, unmanned moving body 100 may move so as to include the related person in the sound emission range.

Note that the state in which the related person is not very far from the sound emission range is a state in which, for example, the related person is not present within the sound emission range but is present within a predetermined range around the sound emission range.

Figure 45:
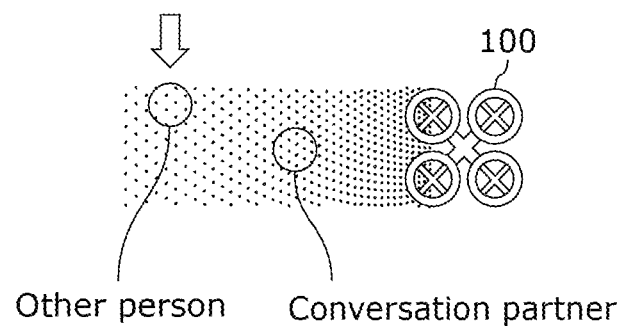
FIG. 45 is a conceptual diagram illustrating an example of a case where another person has entered a sound emission range, according to Embodiment 1.
Figure 45:
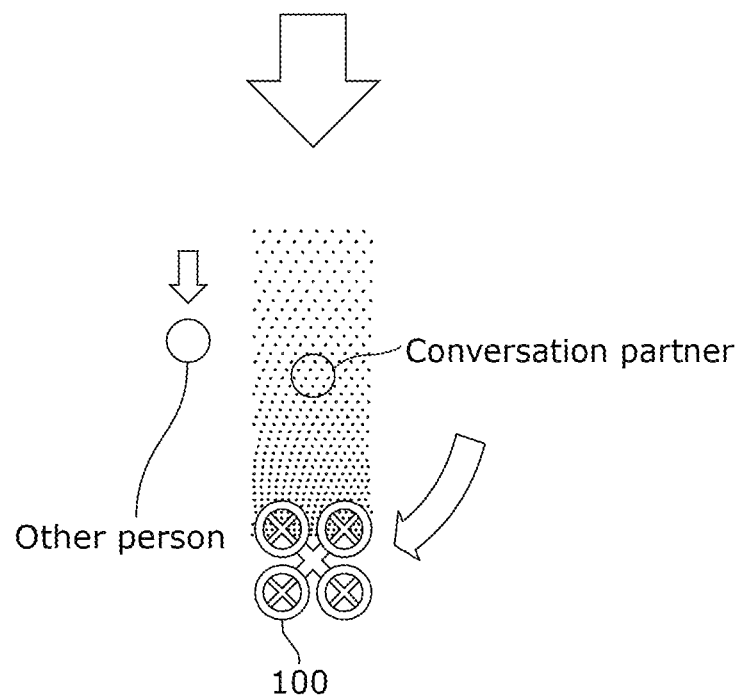

FIG. 45 is a conceptual diagram illustrating an example of a case where another person has entered a sound emission range. When another person aside from the conversation partner has entered the sound emission range or the sound emission direction while sound is being emitted to the conversation partner, unmanned moving body 100 may move so that the other person is outside of the sound emission range or the sound emission direction. For example, when, using image recognition processing, it is detected that another person has entered the sound emission range or the sound emission direction, unmanned moving body 100 may change the sound emission position so that the other person is outside of the sound emission range or the sound emission direction, and may then move to the changed sound emission position.

Additionally, unmanned moving body 100 may determine whether or not the other person is a related person, and when it is determined that the other person is not a related person, unmanned moving body 100 may change the sound emission position so that the other person is outside the sound emission range or the sound emission direction.

Additionally, when another person aside from the conversation partner and a related person has entered the sound emission range or the sound emission direction while sound is being emitted to the conversation partner and the related person, unmanned moving body 100 may move so that the other person is outside of the sound emission range or the sound emission direction.

As described above, unmanned moving body 100 according to the present embodiment includes directional speaker 107 and processor 150, Directional speaker 107 outputs sound in an orientation direction. Processor 150 obtains one or more instances of sensing data.

Then, processor 150 determines whether or not a second target is present in a vicinity of a first target in accordance with at least one of the one or more instances of sensing data. Processor 150 calculates a positional relationship between the first target and the second target from the at least one of the one or more instances of sensing data when it is determined that the second target is present.

Then, processor 150 determines a first position of unmanned moving body 100 in accordance with the positional relationship and causes unmanned moving body 100 to move to the first position, the first position being a position that places the first target and the second target within a range over which sound from directional speaker 107 reaches at at least a predetermined quality.

As a result, unmanned moving body 100 can emit sound appropriately to the first target and the second target. In other words, unmanned moving body 100 can emit sound for a plurality of targets in an integrated manner.

Although a variable sound emission range is used in the foregoing descriptions, a fixed sound emission range may be used. In other words, the sound pressure of the sound emitted by unmanned moving body 100 may be fixed. Additionally, an omnidirectional speaker may be used instead of directional speaker 107. Even with such a configuration, moving to an appropriate sound emission position makes it possible to appropriately emit sound to a plurality of targets.

Embodiment 2

Embodiment 1 relates primarily to sound emission. The present embodiment relates primarily to sound collection. The configuration and operations described in Embodiment 1 can be applied to the present embodiment by replacing the sound emission, speaker, and the like of Embodiment 1 with sound collection, a microphone, and the like. The configuration and operations of the present embodiment will be described in detail hereinafter.

Figure 46:
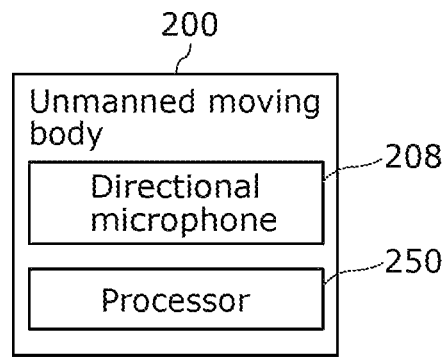
FIG. 46 is a block diagram illustrating an example of the basic configuration of an unmanned moving body according to Embodiment 2.

FIG. 46 is a block diagram illustrating an example of the basic configuration of an unmanned moving body according to the present embodiment. FIG. 46 illustrates unmanned moving body 200, which includes directional microphone 208 and processor 250.

Unmanned moving body 200 is a device that moves. For example, unmanned moving body 200 moves or stops autonomously, Unmanned moving body 200 may move according to an operation upon being subjected to such an operation, Although typically an unmanned aircraft, unmanned moving body 200 is not limited to an unmanned aircraft, and may be a device that travels on a surface, Unmanned moving body 200 may include a movement mechanism, such as a motor, an actuator, and the like, for moving through the air or on a surface.

Additionally, unmanned moving body 200 may include one or more sensors. For example, unmanned moving body 200 may include an image sensor, a range sensor, directional microphone 208 or another microphone serving as a sound sensor, a person detection sensor, a position detector serving as a position sensor, and so on.

Directional microphone 208 is a microphone that collects sound from an orientation direction. The orientation direction of directional microphone 208 may be adjustable, and a sound collection sensitivity of directional microphone 208 may be adjustable. The orientation direction of directional microphone 208 may also be referred to as a "sound collection direction".

Processor 250 is constituted by circuitry that processes information. For example, processor 250 may control the movement of unmanned moving body 200. Specifically, processor 250 may control the movement of unmanned moving body 200 by controlling the operations of a movement mechanism, such as a motor, an actuator, and the like, for moving through the air or on a surface.

Additionally, processor 250 may adjust the orientation direction of directional microphone 208, or may adjust the sound collection sensitivity of directional microphone 208, by sending control signals to directional microphone 208. Additionally, processor 250 may adjust the orientation direction of directional microphone 208 by adjusting an orientation of unmanned moving body 200.

Figure 47:
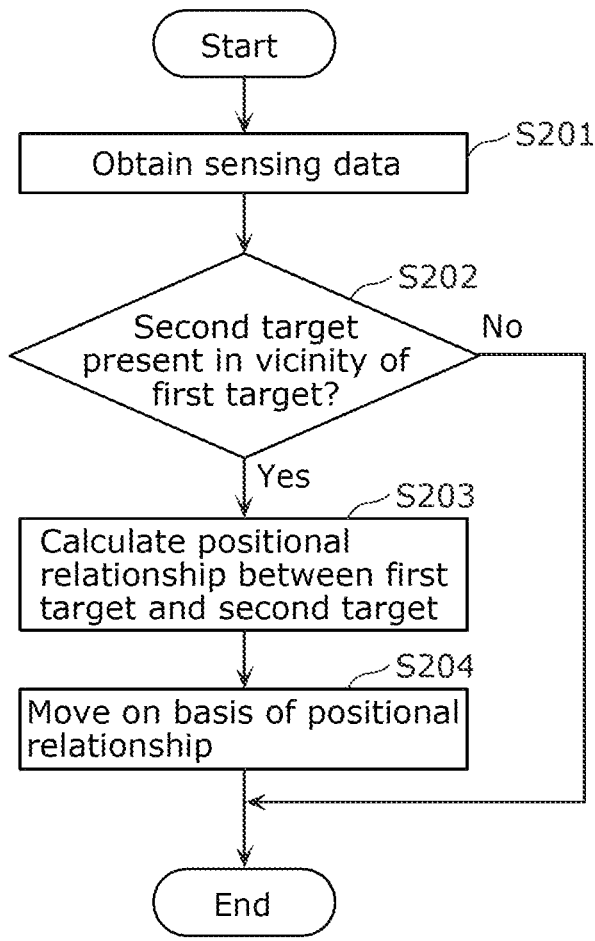
FIG. 47 is a flowchart illustrating an example of the basic operations of the unmanned moving body according to Embodiment 2.

FIG. 47 is a flowchart illustrating an example of the basic operations of unmanned moving body 200 illustrated in FIG. 46. The operations illustrated in FIG. 47 are mainly performed by processor 250 of unmanned moving body 200.

First, processor 250 obtains one or more instances of sensing data (S201). Processor 250 may obtain the one or more instances of sensing data from one or more sensors within unmanned moving body 200, or may obtain the one or more instances of sensing data from one or more sensors outside unmanned moving body 200. Additionally, processor 250 may obtain a plurality of instances of sensing data from one or more sensors within unmanned moving body 200 and one or more sensors outside unmanned moving body 200.

For example, an image sensor, a range sensor, a microphone, a person detection sensor, a position detector, and the like may be used as the one or more sensors outside unmanned moving body 200.

Then, processor 250 determines whether or not a second target is present in a vicinity of a first target in accordance with at least one of the one or more instances of sensing data that have been obtained (S202), For example, the first target is a conversation partner, and the second target is a related person related to the conversation partner. However, the first target and the second target are not limited to people, and may be animals or devices.

Then, processor 250 calculates a positional relationship between the first target and the second target from the at least one of the one or more instances of sensing data when it is determined that the second target is present in the vicinity of the first target (S203). In other words, processor 250 calculates a positional relationship between the first target and the second target from at least one of the one or more instances of sensing data.

For example, the positional relationship includes at least one of a position or a distance related to the first target and the second target. The positional relationship may include the positions of both the first target and the second target, and may include a distance between the first target and the second target.

Specifically, processor 250 may calculate the position of the first target, the position of the second target, the distance between the first target and the second target, and the like using image data obtained from the image sensor, Additionally, processor 250 may calculate a distance between unmanned moving body 200 and the first target, a distance between unmanned moving body 200 and the second target, the distance between the first target and the second target, and the like using range data obtained from the range sensor.

Processor 250 then determines a first position in accordance with the positional relationship that has been calculated. The first position is a position of unmanned moving body 200 at which the first target and the second target are within a range over which sound can be collected by directional microphone 208 at at least a predetermined quality. Processor 250 then causes unmanned moving body 200 to move to the first position that has been determined (S204).

As a result, unmanned moving body 200 can collect sound appropriately from the first target and the second target. In other words, unmanned moving body 200 can collect sound from a plurality of targets in an integrated manner.

For example, the second target is a target related to the first target. Then, processor 250 may determine whether or not a target present in the vicinity of the first target is related to the first target in accordance with at least one of the one or more instances of sensing data. Through this, processor 250 may determine whether or not the second target is present in the vicinity of the first target.

At this time, processor 250 may obtain at least one of information indicating a relationship with the first target or information indicating a relationship with unmanned moving body 200 from at least one of the one or more instances of sensing data, Then, processor 250 may determine whether or not the target present in the vicinity of the first target is related to the first target in accordance with at least one of the information indicating a relationship with the first target or the information indicating a relationship with unmanned moving body 200.

Specifically, processor 250 may determine that the target present in the vicinity of the first target is related to the first target when the target present in the vicinity of the first target satisfies at least one of a plurality of conditions.

The plurality of conditions may include, for example, "is in contact with the first target", "is conversing with the first target", "is present at a distance of no greater than a threshold from the first target", "has the same clothing as the first target", "is present with the first target in a predetermined area", "is associated with the first target", "is approaching the first target", "is present within a range over which the first target's voice reaches", "is talking to unmanned moving body 200 while the first target and unmanned moving body 200 are conversing", "is looking at unmanned moving body 200 while the first target and unmanned moving body 200 are conversing", and the like.

Figure 48:
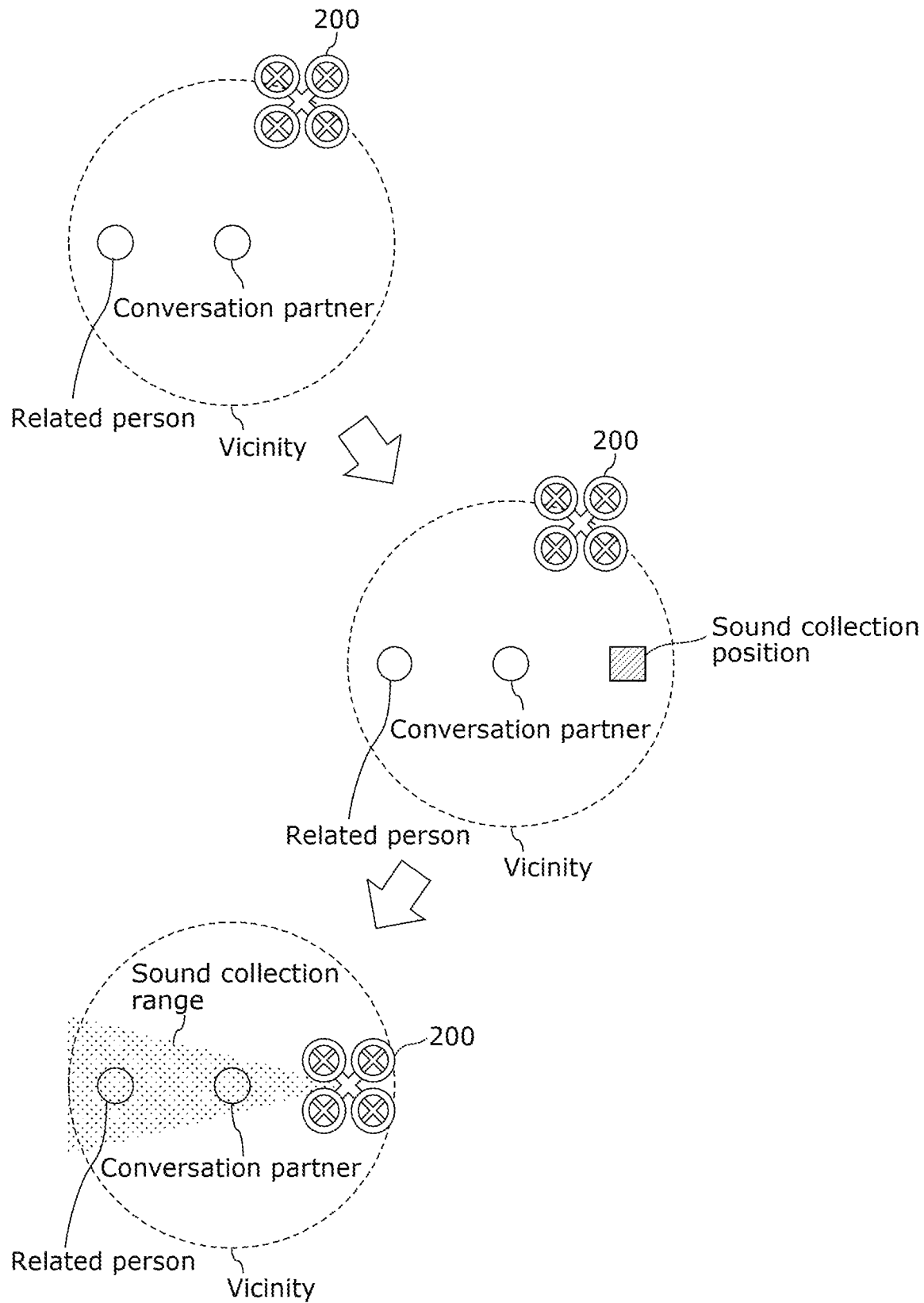
FIG. 48 is a conceptual diagram illustrating an example of specific operations of the unmanned moving body according to Embodiment 2.

FIG. 48 is a conceptual diagram illustrating an example of specific operations of unmanned moving body 200 illustrated in FIG. 46. In this example, unmanned moving body 200 is an unmanned aircraft, also called a "drone", The "conversation partner" corresponds to the first target and the "related person" corresponds to the second target.

For example, unmanned moving body 200 collects sound from the conversation partner while in the vicinity of the conversation partner. Unmanned moving body 200 then determines whether or not the related person is present in the vicinity of the conversation partner.

For example, unmanned moving body 200 senses the vicinity of the conversation partner using a sensor included in unmanned moving body 200, and in accordance with a result thereof, determines whether or not a person is present in the vicinity of the conversation partner. Specifically, an image sensor can be used as the sensor included in unmanned moving body 200. Then, when it is determined that the person present in the vicinity of the conversation partner is a related person related to the conversation partner, unmanned moving body 200 determines that the related person is present in the vicinity of the conversation partner.

When it is determined that the related person is present in the vicinity of the conversation partner, unmanned moving body 200 determines a sound collection position in such a manner that the conversation partner and the related person are within a sound collection range over which sound is collected by unmanned moving body 200. The sound collection range over which sound is collected by unmanned moving body 200 may be determined in accordance with the orientation direction of directional microphone 208.

Then, unmanned moving body 200 moves to the determined sound collection position and collects sound, Through this, unmanned moving body 200 can collect sound from the conversation partner and the related person within the sound collection range.

Figure 49:
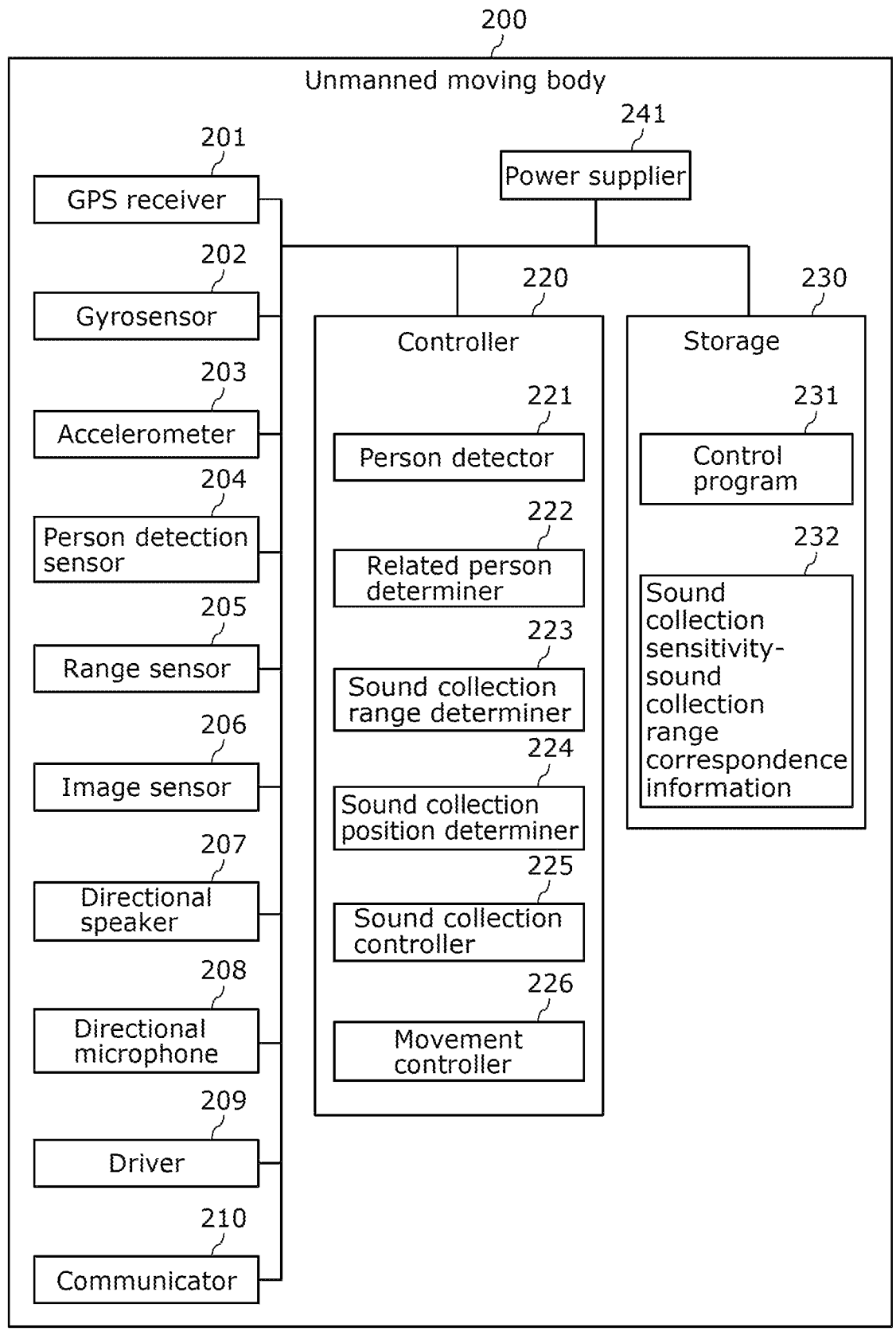
FIG. 49 is a block diagram illustrating an example of the specific configuration of the unmanned moving body according to Embodiment 2.

FIG. 49 is a block diagram illustrating an example of the specific configuration of unmanned moving body 200 illustrated in FIG. 48. Unmanned moving body 200 illustrated in FIG. 49 includes GPS receiver 201, gyrosensor 202, accelerometer 203, person detection sensor 204, range sensor 205, image sensor 206, directional speaker 207, directional microphone 208, driver 209, communicator 210, controller 220, storage 230, and power supplier 241.

GPS receiver 201 is a receiver that constitutes a GPS (Global Positioning System) for measuring a position and obtains a position by receiving a signal. For example, GPS receiver 201 obtains the position of unmanned moving body 200. In other words, GPS receiver 201 functions as a sensor that detects the position of unmanned moving body 200.

Gyrosensor 202 is a sensor that detects an attitude of unmanned moving body 200, i.e., an angle or a tilt of unmanned moving body 200. Accelerometer 203 is a sensor that detects an acceleration of unmanned moving body 200. Person detection sensor 204 is a sensor that detects a person in the vicinity of unmanned moving body 200. Person detection sensor 204 may be an infrared sensor.

Range sensor 205 is a sensor that measures a distance between unmanned moving body 200 and a target, and generates range data. Image sensor 206 is a sensor that captures an image, and generates an image through the capturing. Image sensor 206 may be a camera.

Directional speaker 207 is a speaker that emits sound in an orientation direction. The orientation direction of directional speaker 207 may be adjustable, and the sound pressure of the sound emitted by directional speaker 207 may be adjustable. The orientation direction of directional speaker 207 may also be referred to as a "sound emission direction". Directional microphone 208 is, as described above, a microphone that collects sound from an orientation direction. The orientation direction of directional microphone 208 may be adjustable, and a sound collection sensitivity of directional microphone 208 may be adjustable.

Driver 209 is a motor, an actuator, and the like that cause unmanned moving body 200 to move. Communicator 210 is a communication device that communicates with a device outside unmanned moving body 200. Communicator 210 may receive operation signals for moving unmanned moving body 200, Additionally, communicator 210 may send and receive content of conversations.

Controller 220 corresponds to processor 250 illustrated in FIG. 46, and is constituted by circuitry that processes information. Specifically, in this example, controller 220 includes person detector 221, related person determiner 222, sound collection range determiner 223, sound collection position determiner 224, sound collection controller 225, and movement controller 226. In other words, processor 250 may realize these roles.

Person detector 221 detects a person present in the vicinity of unmanned moving body 200. Person detector 221 detects the person present in the vicinity of unmanned moving body 200 in accordance with sensing data obtained from person detection sensor 204 or another sensor.

Related person determiner 222 determines whether or not the person detected by person detector 221 is a related person related to the conversation partner. Sound collection range determiner 223 determines a sound collection range in accordance with a positional relationship between the conversation partner and the related person. Sound collection position determiner 224 determines a sound collection position in accordance with the determined sound collection range. Sound collection controller 225 controls the sound collection by directional microphone 208 by sending control signals to directional microphone 208.

Movement controller 226 controls movement of unmanned moving body 200 by sending control signals to driver 209, In this example, movement controller 226 controls flight of unmanned moving body 200, which is an unmanned aircraft.

Storage 230 is memory for storing information, and stores control program 231 and sound collection sensitivity-sound collection range correspondence information 232. Control program 231 is a program with which controller 220 processes information. Sound collection sensitivity-sound collection range correspondence information 232 is information indicating a correspondence relationship between the sound collection sensitivity of directional microphone 208 and the sound collection range over which sound can be collected at at least a predetermined quality.

Power supplier 241 is a circuit that supplies power to a plurality of constituent elements included in unmanned moving body 200. For example, power supplier 241 includes a power source.

Figure 50:
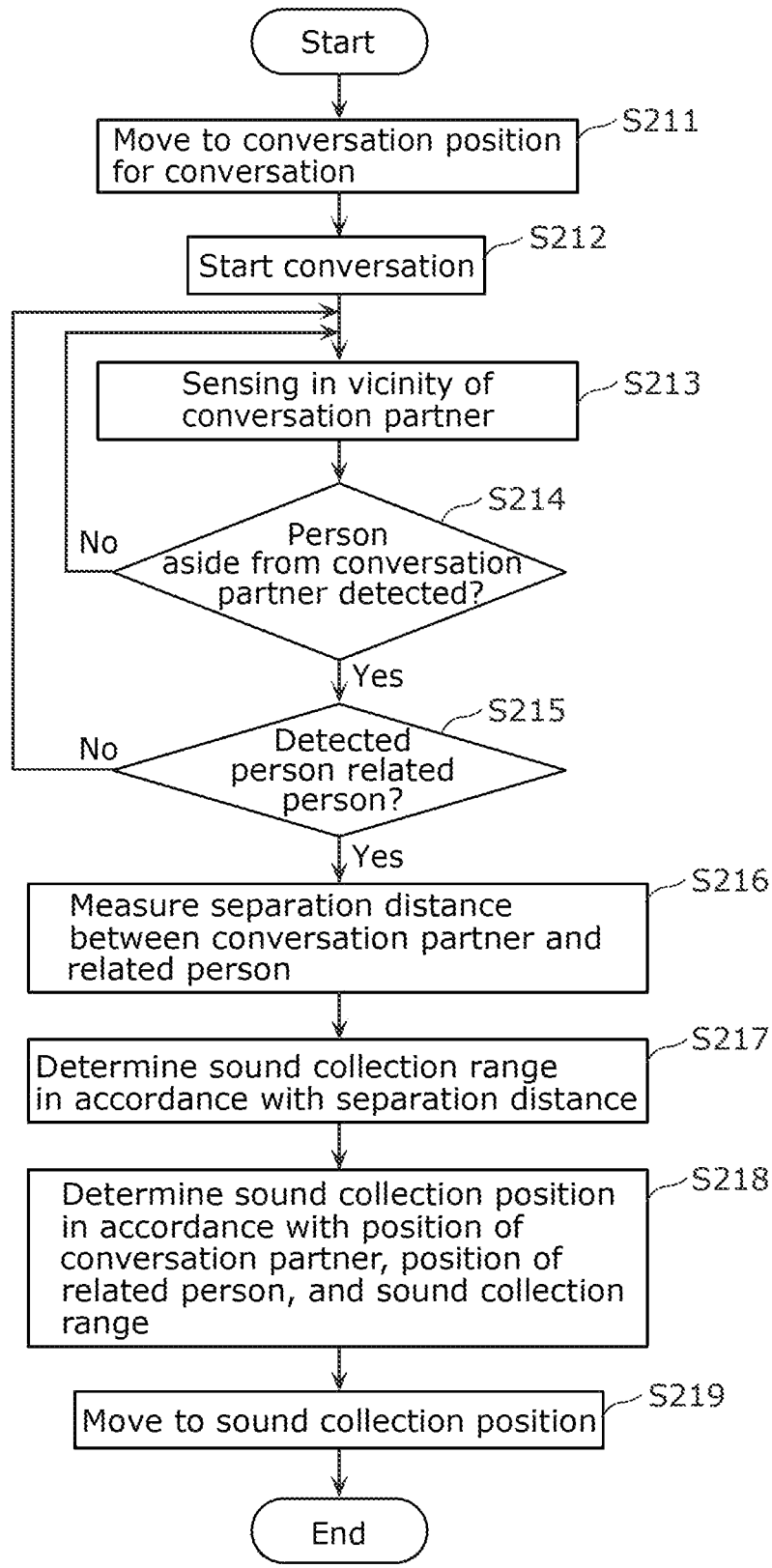
FIG. 50 is a flowchart illustrating an example of specific operations of the unmanned moving body according to Embodiment 2.

FIG. 50 is a flowchart illustrating an example of the specific operations of unmanned moving body 200 illustrated in FIG. 48, For example, a plurality of constituent elements of unmanned moving body 200, illustrated in FIG. 49, perform the operations illustrated in FIG. 50 by operating in tandem.

First, unmanned moving body 200 moves to the conversation position for conversing with the conversation partner (S211). The conversation position can be, for example, a position which voice emitted by the conversation partner reaches from the conversation partner's position and a position which sound from unmanned moving body 200 reaches. The conversation partner may be determined in advance. Unmanned moving body 200 may determine the conversation partner during flight.

For example, in unmanned moving body 200, person detector 221 detects the conversation partner in accordance with sensing data obtained from person detection sensor 204, image sensor 206, or the like. Then, using driver 209, movement controller 226 causes unmanned moving body 200 to move to a conversation position within a predetermined range from the conversation partner.

Then, unmanned moving body 200 starts a conversation (S212). In other words, unmanned moving body 200 starts at least one of emitting sound or collecting sound. For example, sound collection controller 225 causes directional microphone 208 to start collecting sound. Additionally, controller 220 may cause directional speaker 207 to start emitting sound.

Then, unmanned moving body 200 senses the vicinity of the conversation partner (S213). For example, person detector 221 detects a person in the vicinity of the conversation partner by causing person detection sensor 204, image sensor 206, or the like to sense the vicinity of the conversation partner. Any sensor for detecting a person can be used for this detection. Additionally, the vicinity of the conversation partner corresponds to, for example, a region in a predetermined range from the conversation partner.

Then, unmanned moving body 200 determines whether or not a person aside from the conversation partner has been detected (S214). For example, person detector 221 determines whether or not a person aside from the conversation partner has been detected in the vicinity of the conversation partner. When a person aside from the conversation partner has not been detected (No in S214), unmanned moving body 200 repeats the sensing of the vicinity of the conversation partner (S213).

When a person aside from the conversation partner has been detected (Yes in S214), unmanned moving body 200 determines whether or not the detected person is a related person related to the conversation partner (S215), For example, related person determiner 222 may determine whether or not the detected person is the related person in accordance with whether or not the distance between the conversation partner and the related person is within a threshold, or may determine whether or not the detected person is the related person in accordance with another determination standard pertaining to grouping or the like. This determination is the same as the determination described in Embodiment 1.

When the detected person is not the related person (No in S215), unmanned moving body 200 repeats the sensing of the vicinity of the conversation partner (S213).

When the detected person is the related person (Yes in S215), unmanned moving body 200 measures a separation distance between the conversation partner and the related person (S216). For example, the separation distance between the conversation partner and the related person may be measured by sound collection range determiner 223 calculating a distance between the position of the conversation partner detected in accordance with the sensing data and the position of the related person detected in accordance with the sensing data.

Then, unmanned moving body 200 determines the sound collection range in accordance with the separation distance between the conversation partner and the related person (S217). For example, sound collection range determiner 223 determines the sound collection range in accordance with the measured separation distance. At this time, sound collection range determiner 223 makes the sound collection range larger the larger the measured separation distance is.

The sound collection range is, for example, a range defined relatively using unmanned moving body 200 as a reference, and is a range over which sound is collected by directional microphone 208 at at least a predetermined quality. "At least a predetermined quality" may correspond to a sound pressure within a predetermined range, or may correspond to an SN ratio (signal-to-noise ratio) within a predetermined range.

Then, unmanned moving body 200 determines the sound collection position in accordance with the position of the conversation partner, the position of the related person, and the sound collection range (S218). For example, sound collection position determiner 224 determines the sound collection position in such a manner that the position of the detected conversation partner and the position of the detected related person are within the determined sound collection range. The determination of the sound collection position will be described later.

Then, unmanned moving body 200 moves to the sound collection position (S219). For example, movement controller 226 causes unmanned moving body 200 to move to the sound collection position by controlling operations of driver 209. Additionally, sound collection controller 225 may control the sound collection by directional microphone 208 so that sound is collected from the sound collection range at at least the predetermined quality.

This makes it possible for unmanned moving body 200 to collect sound appropriately from the conversation partner and the related person.

Although the foregoing example describes unmanned moving body 200 as performing the processing for moving to the sound collection position (S213 to S219) after starting the conversation with the conversation partner (after S212), the processing for moving to the sound collection position may be performed before starting a conversation with the conversation partner.

Additionally, in the foregoing example, when the detected person is not the related person (No in S215), unmanned moving body 200 repeats the sensing of the vicinity of the conversation partner (S213), However, unmanned moving body 200 may modify the sound collection position such that sound is not collected from a person who is not a related person (a third target). In other words, sound collection position determiner 224 in unmanned moving body 200 may modify the sound collection position such that a person who is not a related person is not included in the sound collection range.

Additionally, sound collection position determiner 224 may modify the sound collection position such that a person who is not a related person is excluded from the sound collection direction. Through this, the likelihood that a person who is not a related person will enter the sound collection range upon moving is reduced.

The sound collection range is also expressed as a range in which voice can be collected, and is, for example, a range in which the voice of a person can be collected at at least a predetermined sound pressure. Specifically, the sound collection range is a range which extends from directional microphone 208 in the sound collection direction and which is within a predetermined distance (e.g., 5 m) from directional microphone 208. This predetermined distance depends on the sound collection sensitivity of directional microphone 208. The predetermined distance is longer and the sound collection range is larger the higher the sound collection sensitivity is.

Accordingly, for example, sound collection controller 225 can increase the sound collection range by increasing the sound collection sensitivity of directional microphone 208. Additionally, sound collection controller 225 can reduce the sound collection range by reducing the sound collection sensitivity of directional microphone 208. Additionally, sound collection controller 225 may use a noise removal filter to remove noise which has increased due to the sound collection sensitivity being increased.

The range over which a person's voice can be collected at at least a predetermined sound pressure also depends on the sound pressure of the person's voice. The sound pressure of a person's voice also varies from person to person. The sound collection range may therefore be defined in accordance with the sound pressure of the voice of an average person. Accordingly, the sound collection range is a range serving as a guide, and does not absolutely mean that the voice of a person within the sound collection range will be collected at at least the predetermined sound pressure.

Additionally, unmanned moving body 200 may identify attributes of the conversation partner or the related person and determine the sound collection range in accordance with the identified attributes. For example, unmanned moving body 200 may determine the sound collection range in accordance with gender, age, or the like.

Alternatively, unmanned moving body 200 may authenticate the conversation partner or the related person, and determine the sound collection range in accordance with a sound pressure registered in advance for the authenticated conversation partner or related person. Alternatively, unmanned moving body 200 may store information on the conversation partner or the related person and the sound pressure as a history, estimate the sound pressure of the conversation partner or the related person in accordance with a past history, and determine the sound collection range in accordance with the estimated sound pressure. As the information on the conversation partner or the related person, information on the face may be stored and used for the authentication.

Additionally, the sound pressure of a person's voice may be measured, and the sound collection range may be determined in accordance with a result thereof. At this time, the sound collection range may be determined for each of sound collection sensitivities. The sound collection range may be determined according to the properties of the point sound source, as illustrated in FIG. 6.

There are cases where the sound pressure of the conversation partner's voice is different from the sound pressure of the related person's voice. In this case, the sound collection range may be determined in accordance with the lower of the sound pressures, the higher of the sound pressures, or the average of the sound pressures. Additionally, the sound collection range may be determined in accordance with the sound pressure of the conversation partner's voice, or the sound collection range may be determined in accordance with the sound pressure of the related person's voice.

Additionally, if the sound collection range is fixed, i.e., if the sound collection sensitivity of directional microphone 208 is fixed, unmanned moving body 200 may determine whether or not the separation distance between the conversation partner and the related person is within the sound collection range. Then, unmanned moving body 200 may determine the sound collection position such that the separation distance is within the sound collection range, and move to the determined sound collection position. Unmanned moving body 200 need not move if the separation distance is not within the sound collection range.

To simplify the descriptions, the following assumes that the sound collection range is defined according to the sound pressure of the voice produced by an average person without considering individual differences, and that the sound collection range can be adjusted by adjusting the sound collection sensitivity. However, the sound collection range may be adjusted having taken individual differences into account.

Additionally, the relationship between the sound collection sensitivity and the sound collection range, such as that described above, may be stored in storage 230 as sound collection sensitivity-sound collection range correspondence information 232.

Sound collection range determiner 223 determines the sound collection sensitivity and the sound collection range in accordance with the separation distance between the conversation partner and the related person such that the conversation partner and the related person are within the sound collection range. For example, these operations are performed in the same manner as the operations in Embodiment 1 in which sound emission range determiner 123 determines the sound pressure and the sound emission range in accordance with the separation distance between the conversation partner and the related person such that the conversation partner and the related person are within the sound emission range.

In the present embodiment, the criteria for determining whether or not a person aside from the conversation partner is a related person are the same as the criteria described in Embodiment 1 with reference to FIGS. 13 to 23, and will therefore not be described here.

Unmanned moving body 200 determines the position of unmanned moving body 200 as the sound collection position in such a manner that the conversation partner and the related person are within the sound collection range. For example, sound collection position determiner 224 of unmanned moving body 200 determines the sound collection position. More specific methods for determining the sound collection position will be described hereinafter with reference to FIGS. 51 to 66.

Figure 51:
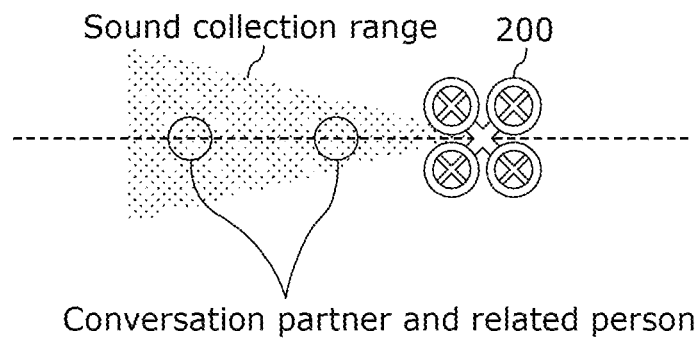
FIG. 51 is a conceptual diagram illustrating an example of a sound collection position on a straight line passing through the position of a conversation partner and the position of a related person, according to Embodiment 2.

FIG. 51 is a conceptual diagram illustrating an example of a sound collection position on a straight line passing through the position of a conversation partner and the position of a related person. In this example, unmanned moving body 200 determines, as the sound collection position, a position which is on a straight line passing through the position of the conversation partner and the position of the related person and at which the conversation partner and the related person are within the sound collection range determined relatively according to the stated position. This makes it possible for unmanned moving body 200 to collect sound appropriately from the conversation partner and the related person along the sound collection direction.

Figure 52:
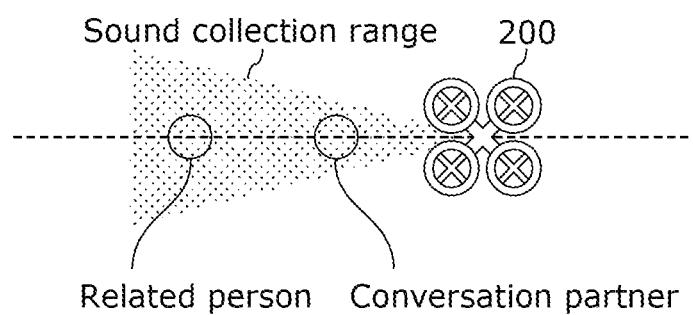
FIG. 52 is a conceptual diagram illustrating an example of a sound collection position close to a conversation partner, according to Embodiment 2.

FIG. 52 is a conceptual diagram illustrating an example of a sound collection position close to a conversation partner. For example, unmanned moving body 200 collects sound from a sound collection position on an outer side of the conversation partner and the related person, toward the conversation partner and the related person in the orientation direction, on a straight line passing through the position of the conversation partner and the position of the related person. In the example illustrated in FIG. 52, unmanned moving body 200 collects sound at a sound collection position on the conversation partner's side. In other words, unmanned moving body 200 determines a position close to the conversation partner as the sound collection position.

A predetermined conversation partner is presumed to converse with unmanned moving body 200 more than with a related person. Additionally, when a related person is present between unmanned moving body 200 and the conversation partner, the related person may interfere with the conversation between unmanned moving body 200 and the conversation partner. As such, determining a position close to the conversation partner as the sound collection position makes it possible to carry out more conversations smoothly.

Figure 53:
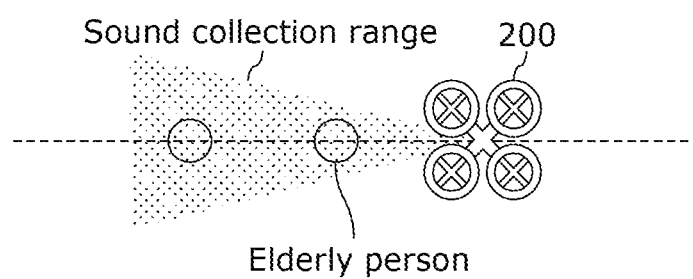
FIG. 53 is a conceptual diagram illustrating an example of a sound collection position close to an elderly person, according to Embodiment 2.

FIG. 53 is a conceptual diagram illustrating an example of a sound collection position close to an elderly person. Unmanned moving body 200 may determine a position close to an elderly person as the sound collection position instead of a position close to the conversation partner. For example, when the conversation partner is not determined in advance, unmanned moving body 200 may determine a position close to an elderly person as the sound collection position. Unmanned moving body 200 may estimate a person's age using facial recognition.

The sound pressure of a person's voice is assumed to decline with age, By determining a position close to an elderly person as the sound collection position, unmanned moving body 200 can collect sound from an elderly person at a low sound pressure. This enables unmanned moving body 200 to compensate for a decrease in sound pressure caused by age.

In the case of a parent and a child, a position close to the older person, i.e., a position close to the parent, is determined as the sound collection position. This makes it possible to keep the child away from unmanned moving body 200.

Additionally, unmanned moving body 200 may determine that a person whose age is estimated to be at least a predetermined age is an elderly person. Then, when it is determined that one of the conversation partner and the related person is an elderly person, unmanned moving body 200 may determine a position close to the elderly person as the sound collection position. When it is determined that both the conversation partner and the related person are elderly persons, unmanned moving body 200 may determine a position distanced from both as the sound collection position, or may determine the sound collection position according to another condition.

Figure 54:
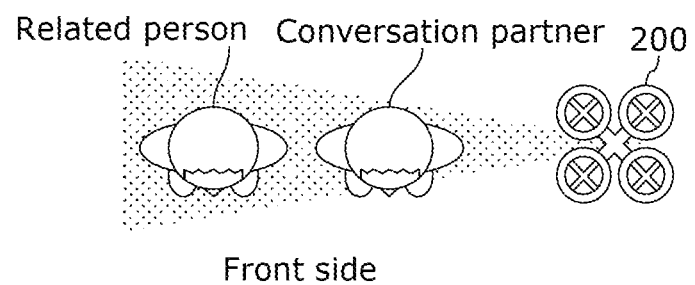
FIG. 54 is a conceptual diagram illustrating an example of a sound collection position that has been corrected to a front side centered on a related person, according to Embodiment 2.
Figure 54:
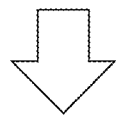
Figure 54:
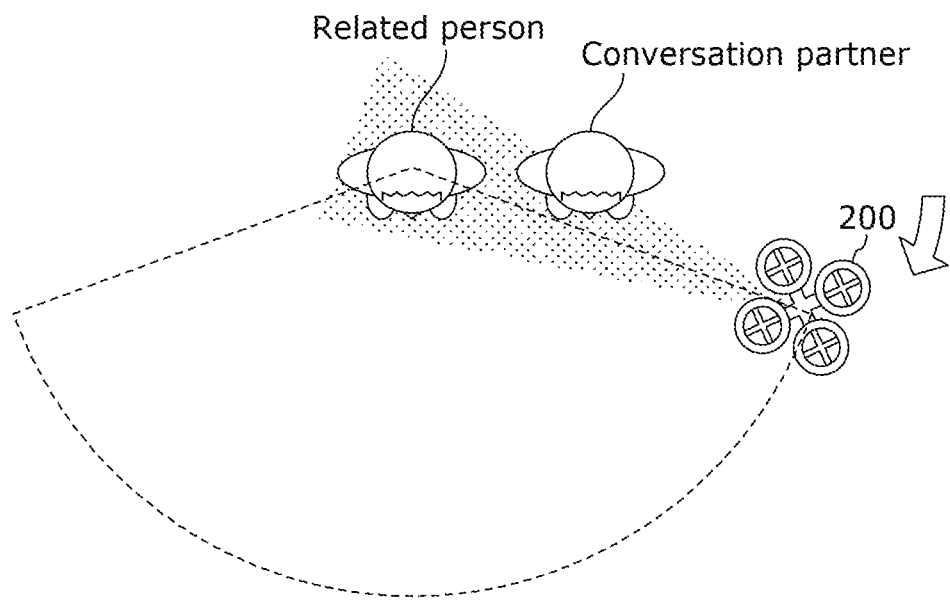

FIG. 54 is a conceptual diagram illustrating an example of a sound collection position that has been corrected to a front side centered on a related person. As illustrated in the top part of FIG. 54, even when unmanned moving body 200 is present to the side of the conversation partner and a related person, unmanned moving body 200 can collect sound from the conversation partner and the related person. On the other hand, it is easier for the conversation partner and the related person to converse with unmanned moving body 200 when unmanned moving body 200 is present further on the front side of the conversation partner and the related person than to the side.

In other words, by being present on the front side of the conversation partner and the related person, unmanned moving body 200 can provide a smooth conversation for the conversation partner and the related person. Unmanned moving body 200 may therefore correct the sound collection position to the front side of the conversation partner and the related person.

Specifically, as illustrated in the bottom part of FIG. 54, unmanned moving body 200 may correct the sound collection position to the front side of the conversation partner and the related person along a circle presumed to be centered on the related person. This makes it possible for unmanned moving body 200 to correct the sound collection position without changing the distance from the related person.

Note that unmanned moving body 200 may correct the sound collection position along a circle presumed to be centered on the conversation partner. This makes it possible for unmanned moving body 200 to correct the sound collection position without changing the distance from the conversation partner. However, by using a circle presumed to be centered on the one of the conversation partner and the related person further from unmanned moving body 200, unmanned moving body 200 can suppress fluctuations in the distance from each of the conversation partner and the related person to unmanned moving body 200.

Additionally, unmanned moving body 200 is not limited to correcting the sound collection position along a circle, and may move to the forward direction of at least one of the conversation partner or the related person and direct the sound collection direction toward at least one of the conversation partner or the related person. Unmanned moving body 100 may correct the sound collection position to a position in the forward direction for performing such operations.

Figure 55:
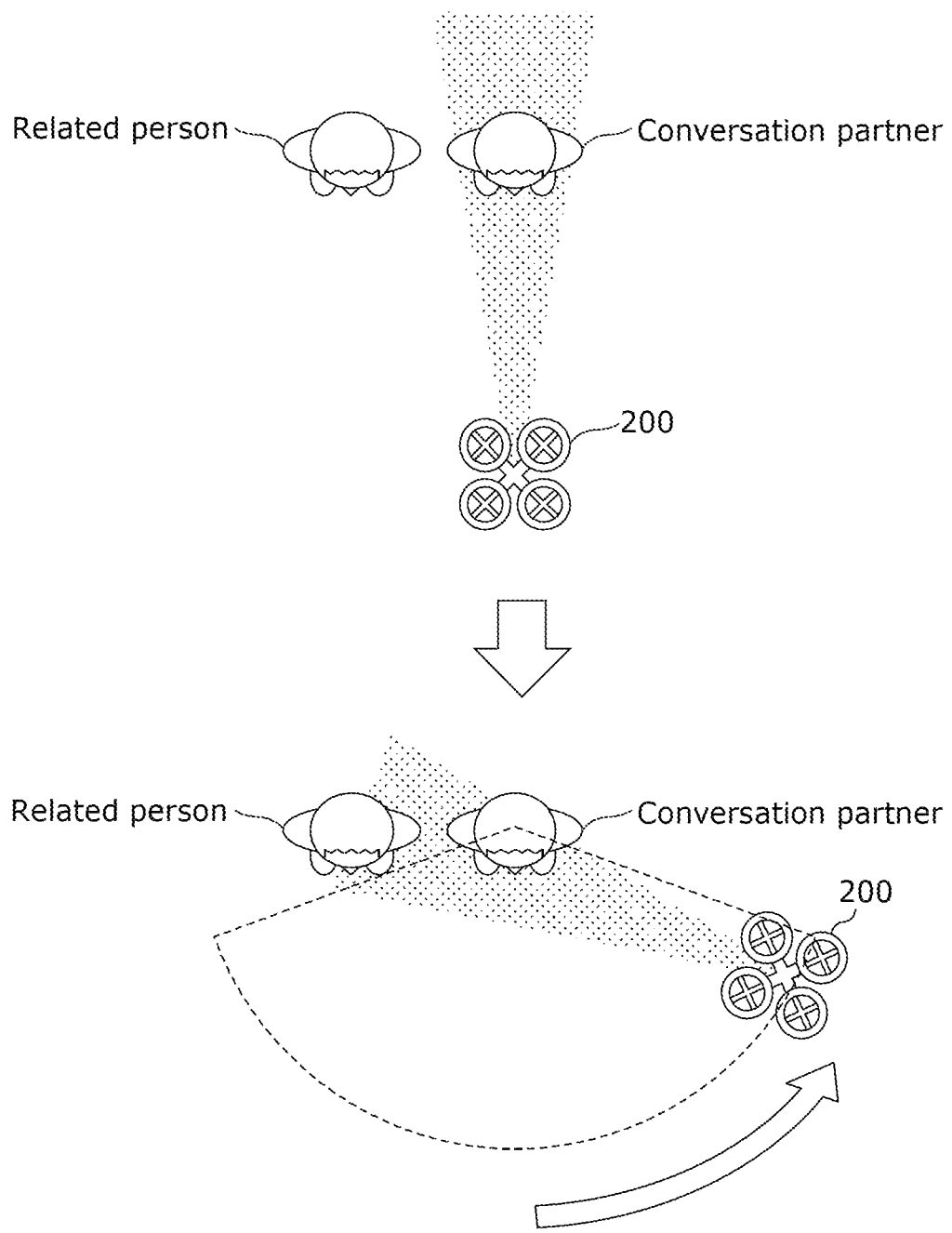
FIG. 55 is a conceptual diagram illustrating an example of a sound collection position determined central to a conversation partner so that a related person is within a sound collection range, according to Embodiment 2.

FIG. 55 is a conceptual diagram illustrating an example of a sound collection position determined central to a conversation partner so that a related person is within a sound collection range. As illustrated in the top part of FIG. 55, unmanned moving body 200 is present on the front side of the conversation partner while conversing with the conversation partner. Then, as illustrated in the bottom part of FIG. 55, unmanned moving body 200 may move along a circle presumed to be centered on the conversation partner so that the related person is within the sound collection range. In this case, unmanned moving body 200 may determine the sound collection position along the circle presumed to be centered on the conversation partner.

This makes it possible for unmanned moving body 200 to move to a position where sound can be collected from the conversation partner and the related person without changing the distance from the conversation partner.

Figure 56:
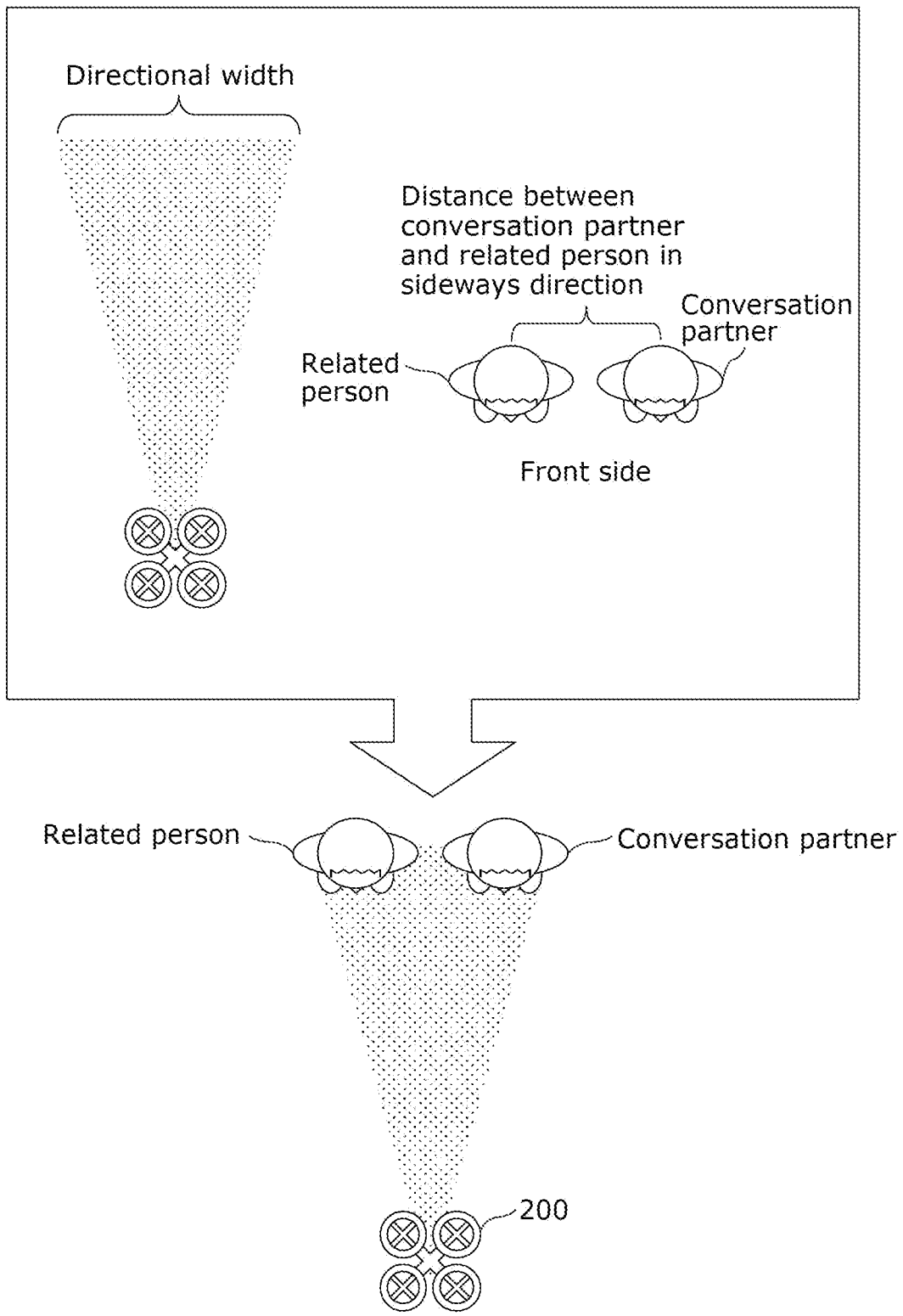
FIG. 56 is a conceptual diagram illustrating an example of a sound collection position on a front side of a conversation partner and a related person, according to Embodiment 2.

FIG. 56 is a conceptual diagram illustrating an example of a sound collection position on a front side of a conversation partner and a related person. When the distance between the conversation partner and the related person in a sideways direction perpendicular to the forward direction of the conversation partner and the related person is no greater than the directional width, unmanned moving body 200 may determine a position on the front side of the conversation partner and the related person as the sound collection position.

This makes it possible for unmanned moving body 200 to collect sound from the conversation partner and the related person at a position on the front side of the conversation partner and the related person. In other words, unmanned moving body 200 can carry out a conversation from a position on the front side of the conversation partner and the related person. Unmanned moving body 200 can therefore provide a smooth conversation to the conversation partner and the related person.

It is assumed that the position on the front side of the conversation partner and the related person is more suitable for conversation than a position to the side of the conversation partner and the related person. Accordingly, unmanned moving body 200 may preferentially determine the front side of the conversation partner and the related person as the sound collection position.

Figure 57:
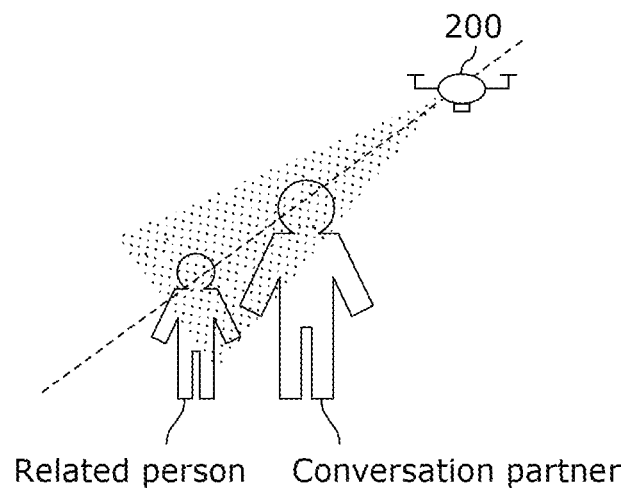
FIG. 57 is a conceptual diagram illustrating an example of a sound collection position on a straight line in a direction diagonal with respect to a horizontal plane, according to Embodiment 2.

FIG. 57 is a conceptual diagram illustrating an example of a sound collection position on a straight line in a direction diagonal with respect to a horizontal plane. For example, unmanned moving body 200 may obtain body information of the conversation partner and body information of the related person through image recognition processing, facial recognition processing, or the like. Unmanned moving body 200 may then determine the sound collection position in accordance with the body information of the conversation partner and the body information of the related person. The body information may be a height, or may be a face height.

Specifically, when there is a discrepancy between the height of the conversation partner's face and the height of the related person's face, unmanned moving body 200 determines, as the sound collection position, a position which is on a straight line passing through the position of the conversation partner's face and the position of the related person's face and at which the conversation partner and the related person are within the sound collection range. In this case, unmanned moving body 200 collects sound along a sound collection direction that is oblique relative to the horizontal plane.

This makes it possible for unmanned moving body 200 to collect sound appropriately from the conversation partner and the related person along the sound collection direction.

A case where the conversation partner and the related person are a parent and child, or a case where the conversation partner and the related person are a person sitting in a wheelchair and a person pushing the wheelchair, can be given as examples of cases where there is a discrepancy between the height of the conversation partner's face and the height of the related person's face. Additionally, although FIG. 57 illustrates an example in which the parent is the conversation partner and the child is the related person, the conversation partner and the related person may be reversed.

Also, as sound collection in an oblique direction, the sound collection may be from a higher position toward a lower position, or from a lower position toward a higher position. When sound is collected at a lower position toward a higher position, the flight altitude is low, which makes flight difficult and increases the chance of contact with a person. Unmanned moving body 200 will also approach small children. As such, the sound may be collected at a higher position toward a lower position. This makes it possible to suppress the likelihood of collisions and the like, for example.

On the other hand, when collecting sound from a higher position toward a lower position, the conversation partner and the related person will talk upwards, toward where unmanned moving body 200 is present. The voices will therefore diverge and it will be difficult to collect sound. As such, the sound may be collected at a lower position toward a higher position.

Also, it may be possible to switch between sound collection from a higher position toward a lower position and sound collection from a lower position toward a higher position. Sound may be collected from a lower position toward a higher position in areas where there are fewer people, and from a higher position toward a lower position in areas where there are more people.

Figure 58:
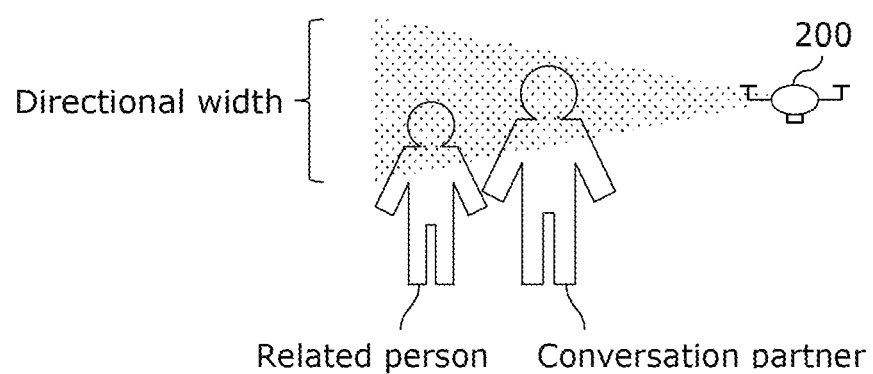
FIG. 58 is a conceptual diagram illustrating an example of a sound collection position on a straight line in a horizontal direction, according to Embodiment 2.

FIG. 58 is a conceptual diagram illustrating an example of a sound collection position on a straight line in a horizontal direction. When the conversation partner's face and the related person's face are within the directional width of the sound collection, unmanned moving body 200 may determine, as the sound collection position, a position at which the conversation partner's face and the related person's face are within the sound collection range and which is a position for collecting sound in a horizontal direction. In other words, when the height of the conversation partner's face and the height of the related person's face deviate beyond a predetermined range, unmanned moving body 200 may determine a position for collecting sound in an oblique direction as the sound collection position, as illustrated in FIG. 57.

In other words, unmanned moving body 200 need not change altitude as long as a difference between the height of the conversation partner's face and the height of the related person's face is within a predetermined range. This simplifies the processing. However, increasing the altitude of unmanned moving body 200 makes it possible to suppress the likelihood of collisions and the like, which in turn makes it possible to provide smooth conversations.

Figure 59:
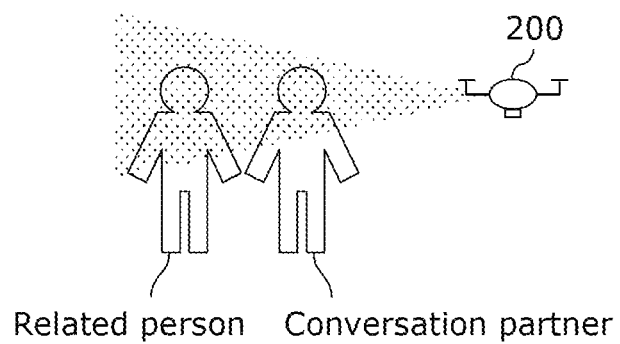
FIG. 59 is a conceptual diagram illustrating an example of a sound collection position at the same height as a conversation partner and a related person, according to Embodiment 2.

FIG. 59 is a conceptual diagram illustrating an example of a sound collection position at the same height as a conversation partner and a related person. As described above, unmanned moving body 200 may determine a position for collecting sound in the horizontal direction as the sound collection position. This simplifies the processing.

Figure 60:
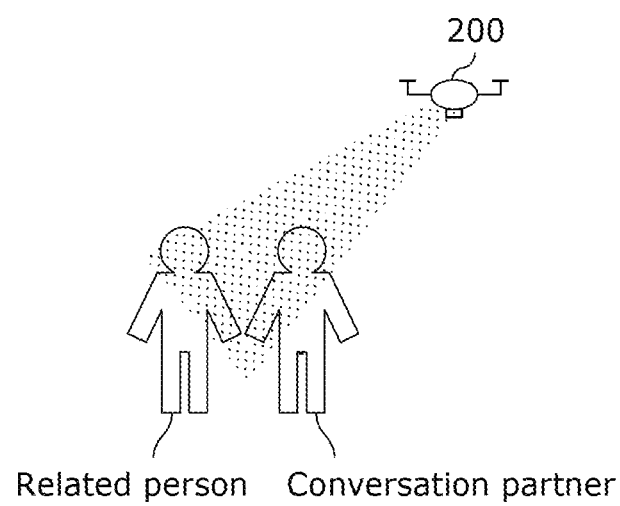
FIG. 60 is a conceptual diagram illustrating an example of a sound collection position higher than a conversation partner and a related person, according to Embodiment 2.

However, in this case, unmanned moving body 200 may come into contact with a person. Furthermore, it is difficult for a person far from unmanned moving body 200 and unmanned moving body 200 to have a conversation because the conversation takes place over a person close to unmanned moving body 200. Specifically, in the example illustrated in FIG. 59, the related person and unmanned moving body 200 carried out a conversation over the conversation partner, which makes it difficult to carry out the conversation, FIG. 60 is a conceptual diagram illustrating an example of a sound collection position higher than a conversation partner and a related person. Unmanned moving body 200 may preferentially determine a position higher than the conversation partner and the related person as the sound collection position. This makes it possible for unmanned moving body 200 to suppress the likelihood of collisions and the like, Unmanned moving body 200 can also provide smooth conversations both to a person close to unmanned moving body 200 and to a person far from unmanned moving body 200.

Figure 61:
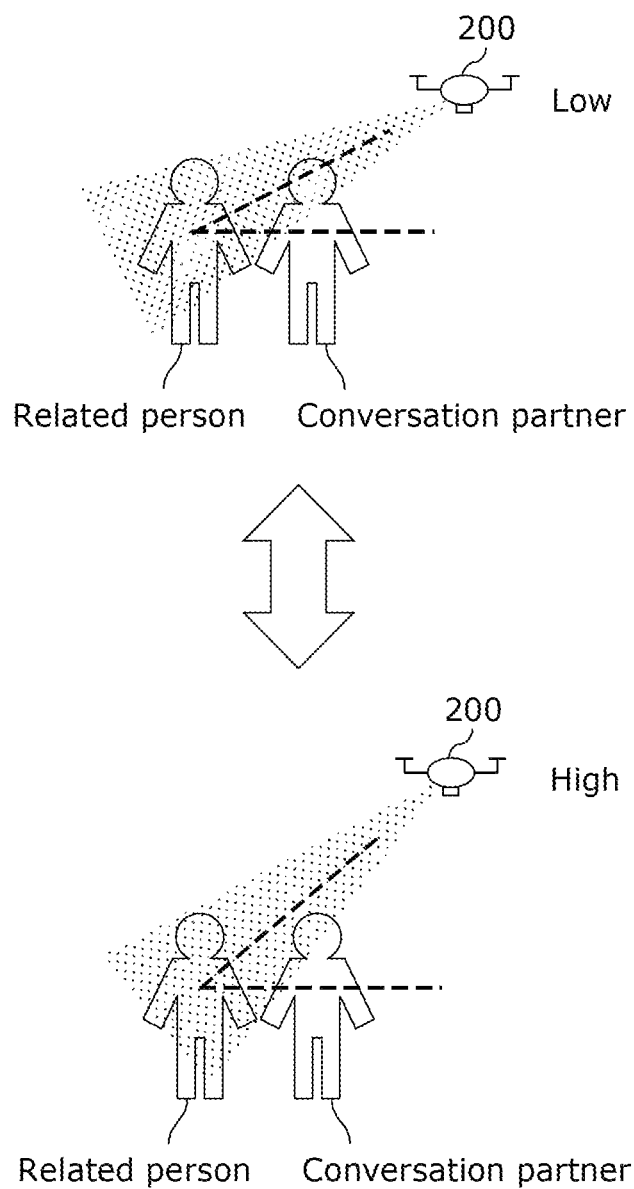
FIG. 61 is a conceptual diagram illustrating an example of the height of a sound collection position, according to Embodiment 2.

FIG. 61 is a conceptual diagram illustrating an example of the height of a sound collection position. If the sound collection position is too high, the angle at which the conversation partner and the related person look up at unmanned moving body 200 will be too large. This means the conversation partner and the related person will converse while looking up at unmanned moving body 200, which makes it difficult to have a smooth conversation.

Accordingly, an upper limit may be set for the height of the sound collection position or the angle between the sound collection direction and a horizontal plane. For example, the upper limit for the height of the sound collection position may be set in accordance with the separation distance between unmanned moving body 200 and the one of the conversation partner and the related person who is closest to unmanned moving body 200. For example, the upper limit on the height of the sound collection position may be set lower the closer the position is to the conversation partner and the related person. This keeps the angle at which the conversation partner and the related person look up at unmanned moving body 200 low.

Figure 62:
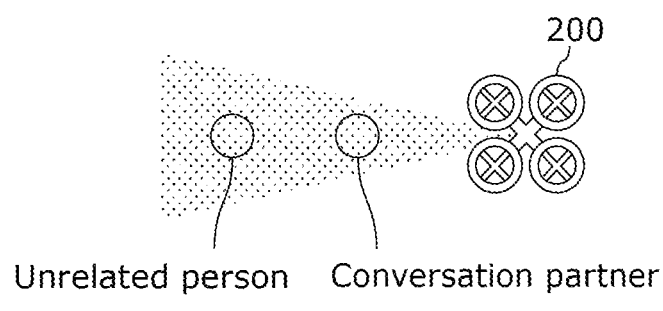
FIG. 62 is a conceptual diagram illustrating an example of a sound collection position for excluding an unrelated person from a sound collection range, according to Embodiment 2.
Figure 62:
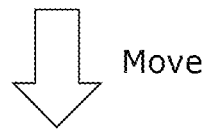
Figure 62:
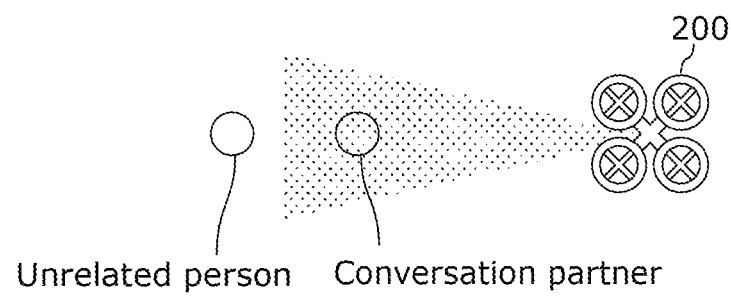

FIG. 62 is a conceptual diagram illustrating an example of a sound collection position for excluding an unrelated person from a sound collection range. When a person aside from the conversation partner is determined to not be a related person, unmanned moving body 200 may determine the sound collection position so that the person determined to not be a related person is not included in the sound collection range. In other words, when a person aside from the conversation partner is determined to be an unrelated person, unmanned moving body 200 may determine the sound collection position so that the unrelated person is not included in the sound collection range.

For example, unmanned moving body 200 determines the sound collection position so as to increase the separation distance between unmanned moving body 200 and the unrelated person, and moves to the sound collection position. This makes it possible for unmanned moving body 200 to make it harder for sound to be collected from the unrelated person.

Additionally, for example, unmanned moving body 200 determines the sound collection position within a range over which sound is not collected from the unrelated person and is collected from the conversation partner. In other words, unmanned moving body 200 determines the sound collection position in such a manner that the unrelated person is not within the sound collection range and the conversation partner is within the sound collection range. This makes it possible for unmanned moving body 200 to collect sound from the conversation partner without collecting sound from the unrelated person.

Additionally, for example, unmanned moving body 200 may move away from the unrelated person within a range over which sound is collected from the conversation partner at at least a predetermined sound pressure. Specifically, unmanned moving body 200 may calculate a range over which sound is collected from the conversation partner at at least a predetermined sound pressure in accordance with the sound pressure of the sound collected from the conversation partner before moving, and may determine the position furthest form the unrelated person within the stated range as the sound collection position. This makes it possible for unmanned moving body 200 to make it harder for sound to be collected from the unrelated person, and makes it possible to keep collecting sound from the conversation partner appropriately.

Note that unmanned moving body 200 may determine the sound collection position in such a manner that the unrelated person is not within the sound collection range and the conversation partner and the related person are within the sound collection range. This makes it possible for unmanned moving body 200 to collect sound from the conversation partner and the related person without collecting sound from the unrelated person.

Figure 63:
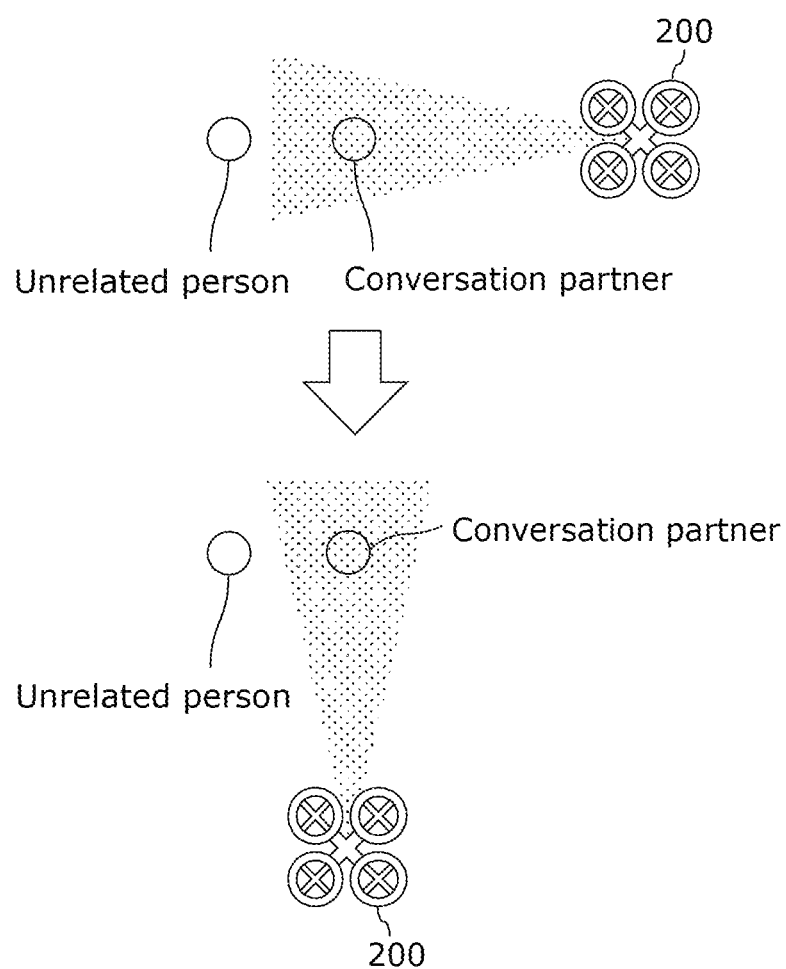
FIG. 63 is a conceptual diagram illustrating an example of a positional relationship, on a horizontal plane, between an unrelated person, a conversation partner, and the unmanned moving body, according to Embodiment 2.

FIG. 63 is a conceptual diagram illustrating an example of a positional relationship, on a horizontal plane, between an unrelated person, a conversation partner and unmanned moving body 200. For example, as indicated by the example in the top part of FIG. 63, unmanned moving body 200 may determine a position far from an unrelated person as the sound collection position. However, in the example in the top part of FIG. 63, the unrelated person is present in the sound collection direction, and sound may therefore be collected from the unrelated person.

Accordingly, as illustrated in the example in the bottom part of FIG. 63, unmanned moving body 200 may determine the sound collection position in such a manner that the unrelated person is outside the sound collection direction. Specifically, unmanned moving body 200 may determine, as the sound collection position, a position not present on a straight line passing through the position of the conversation partner and the position of the related person. This makes it possible for unmanned moving body 200 to suppress the likelihood of sound being collected from the unrelated person.

Note that in the example in the bottom part of FIG. 63 as well, unmanned moving body 200 may determine the sound collection position in such a manner that the unrelated person is not within the sound collection range and the conversation partner and the related person are within the sound collection range.

Figure 64:
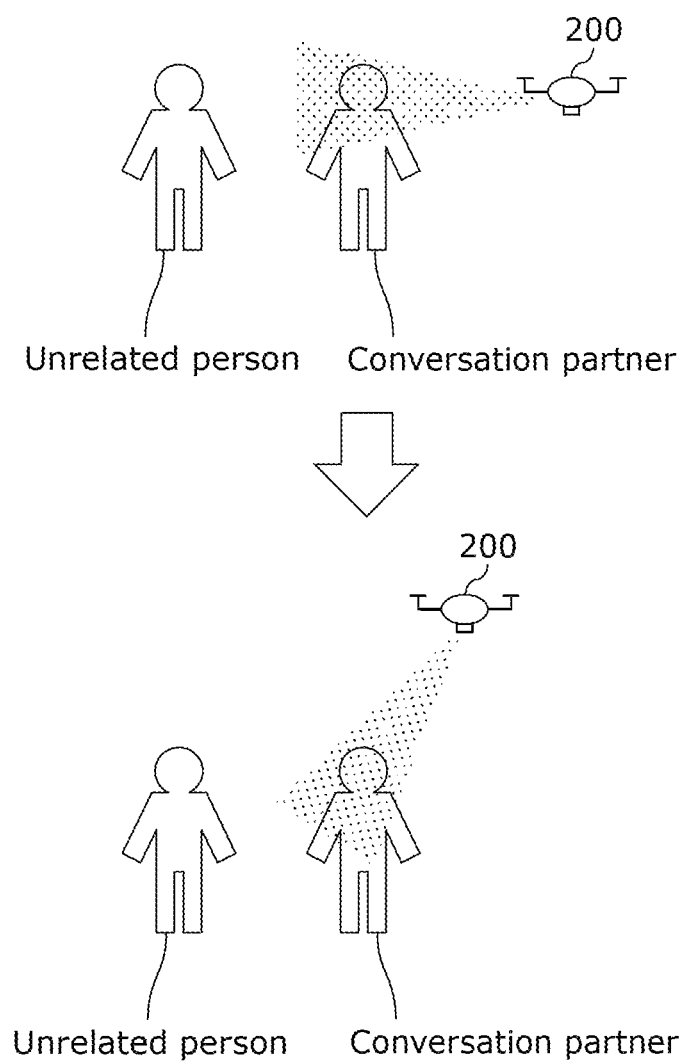
FIG. 64 is a conceptual diagram illustrating an example of a positional relationship, on a vertical plane, between an unrelated person, a conversation partner, and the unmanned moving body, according to Embodiment 2.

FIG. 64 is a conceptual diagram illustrating an example of a positional relationship, on a vertical plane, between an unrelated person, a conversation partner, and unmanned moving body 200. When sound is collected by unmanned moving body 200 in the horizontal direction, there is a relatively high likelihood that the unrelated person will be within the sound collection range or the sound collection direction, and it is therefore possible that sound will be collected from the unrelated person. Accordingly, unmanned moving body 200 may collect sound from the conversation partner from above the conversation partner. This makes it possible for unmanned moving body 200 to suppress the likelihood of the unrelated person entering the sound collection range or the sound collection direction, which in turn makes it possible to suppress the likelihood that sound will be collected from the unrelated person.

Note that unmanned moving body 200 may determine the height of the sound collection position in such a manner that the unrelated person is not within the sound collection range and the conversation partner and the related person are within the sound collection range.

Figure 65:
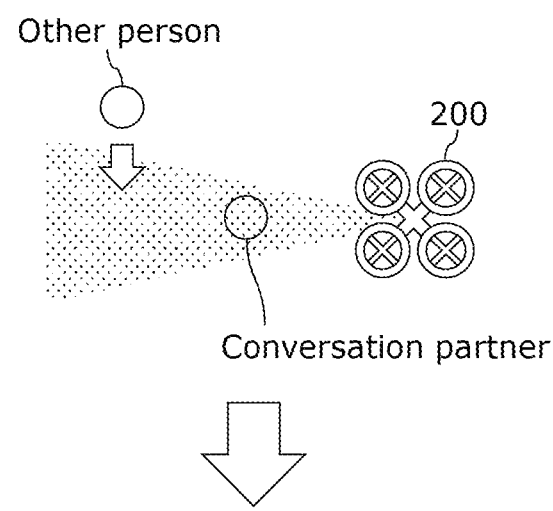
FIG. 65 is a conceptual diagram illustrating an example of a sound collection position for excluding another person from a sound collection range, according to Embodiment 2.
Figure 65:
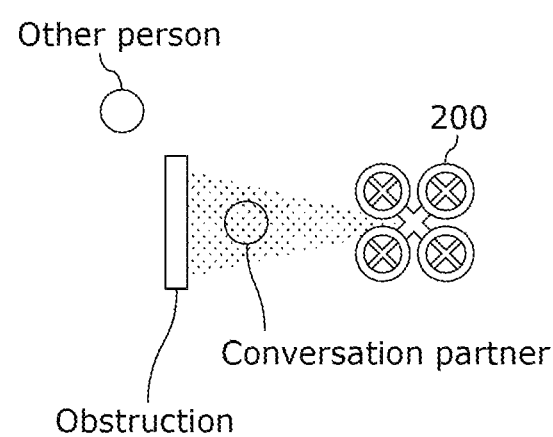

FIG. 65 is a conceptual diagram illustrating an example of a sound collection position for excluding another person from a sound collection range. In order to exclude another person from the sound collection range, unmanned moving body 200 may determine as the sound collection position, a position of unmanned moving body 200 at which the conversation partner is between unmanned moving body 200 and an obstruction. Unmanned moving body 200 may then move to the sound collection position and collect sound from the conversation partner. This makes it possible for unmanned moving body 200 to suppress the likelihood of sound being collected from the other person.

Here, the obstruction is, for example, a physical environment that prevents the other person from entering the sound collection range. The obstruction may be a physical environment that prevents the sound collection range from broadening, or may be a physical environment through which a person cannot pass. Specifically, the obstruction may be a wall, a building, or a cliff.

Additionally, unmanned moving body 200 may detect the position of the obstruction through image recognition processing, or may detect the position of the obstruction using an obstruction detection sensor (not shown).

Additionally, unmanned moving body 200 may specify the position of the obstruction from map information including the position of the obstruction. The map information may be stored in advance in storage 230 of unmanned moving body 200, or may be input from an external device to unmanned moving body 200 using communicator 210 of unmanned moving body 200. Then, by detecting the position of unmanned moving body 200, unmanned moving body 200 may detect the position of the obstruction in accordance with the map information.

For example, according to the top part of FIG. 65, there is no obstruction on the opposite side of the conversation partner from unmanned moving body 200, and it is therefore possible that another person will enter the sound collection range. As opposed to this, according to the bottom part of FIG. 65, there is an obstruction such as a wall on the opposite side of the conversation partner from unmanned moving body 200, which suppresses the possibility that another person will enter the sound collection range.

Note that a related person may be taken into account along with the conversation partner. Specifically, unmanned moving body 200 may determine, as the sound collection position, a position of unmanned moving body 200 at which the conversation partner and the related person are between unmanned moving body 200 and an obstruction. This makes it possible for unmanned moving body 200 to collect sound from the conversation partner and the related person without collecting sound from the other person.

Figure 66:
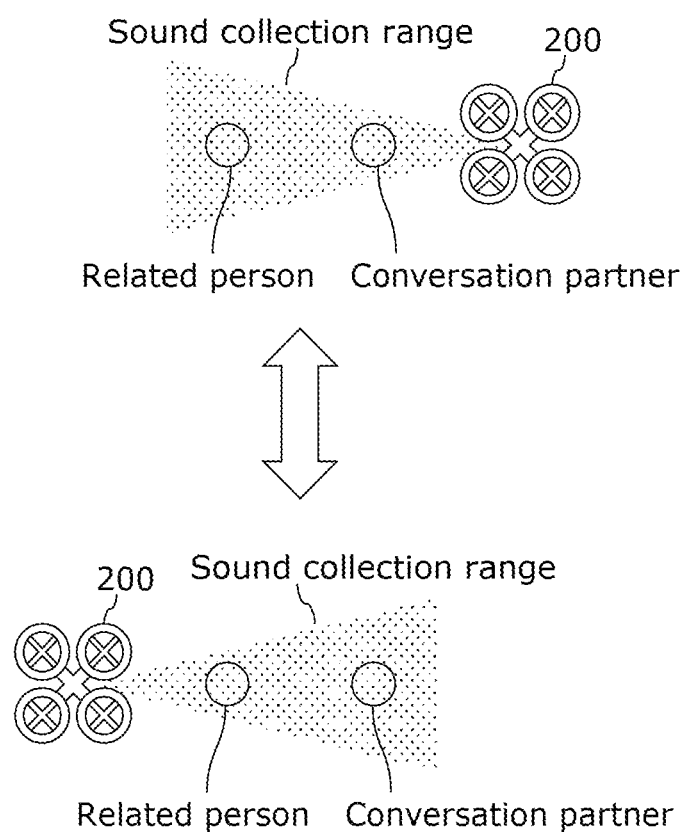
FIG. 66 is a conceptual diagram illustrating an example of a sound collection position determined in accordance with a sound emitted by a conversation partner and a sound emitted by a related person, according to Embodiment 2.

FIG. 66 is a conceptual diagram illustrating an example of a sound collection position determined in accordance with a sound emitted by a conversation partner and a sound emitted by a related person.

Unmanned moving body 200 may determine a position closer to the one of the conversation partner and the related person who speaks more frequently as the sound collection position, Specifically unmanned moving body 200 may obtain a speaking frequency of the conversation partner and a speaking frequency of the related person in accordance with the collected sound, and determine, as the sound collection position, a position closer to the one having the higher speaking frequency. For example, when the number of times the related person speaks to unmanned moving body 200 is higher than the number of times the conversation partner speaks to unmanned moving body 200, a position closer to the related person is determined as the sound collection position.

This makes it possible for unmanned moving body 200 to collect sound appropriately from the one of the conversation partner and the related person having the higher speaking frequency.

Additionally, unmanned moving body 200 may determine a position closer to the one of the conversation partner and the related person having the lower volume as the sound collection position. Specifically, unmanned moving body 200 may obtain a volume of the conversation partner's voice and a volume of the related person's voice in accordance with the collected sound, and determine, as the sound collection position, a position closer to the one having the lower volume. For example, when the volume of the related person is lower than the volume of the conversation partner, a position closer to the related person is determined as the sound collection position.

To be more specific, unmanned moving body 200 estimates each of the sound pressure of the conversation partner's voice and the sound pressure of the related person's voice as a volume in accordance with the collected sound. Then, by comparing the volume estimated for the conversation partner and the volume estimated for the related person, unmanned moving body 200 specifies the lower of the volumes.

Additionally, unmanned moving body 200 may estimate each of the sound pressure of the conversation partner's voice and the sound pressure of the related person's voice as a volume by referring to a table expressing a relationship between the sound pressure of a person's voice, the separation distance between the person and unmanned moving body 200, and the sound pressure of the voice collected by unmanned moving body 200. This table may be stored in storage 230 in advance.

Then, by moving to a sound collection position closer to the one of the conversation partner and the related person who has the lower volume, unmanned moving body 200 can collect sound appropriately from the one of the conversation partner and the related person who has the lower volume.

With respect to the method for determining the sound collection position, one of the plurality of determination methods described with reference to FIGS. 51 to 66 may be used, or a desired combination of two or more of the determination methods may be used. A plurality of examples pertaining to movement and the like of unmanned moving body 200 will be described next.

Figure 67:
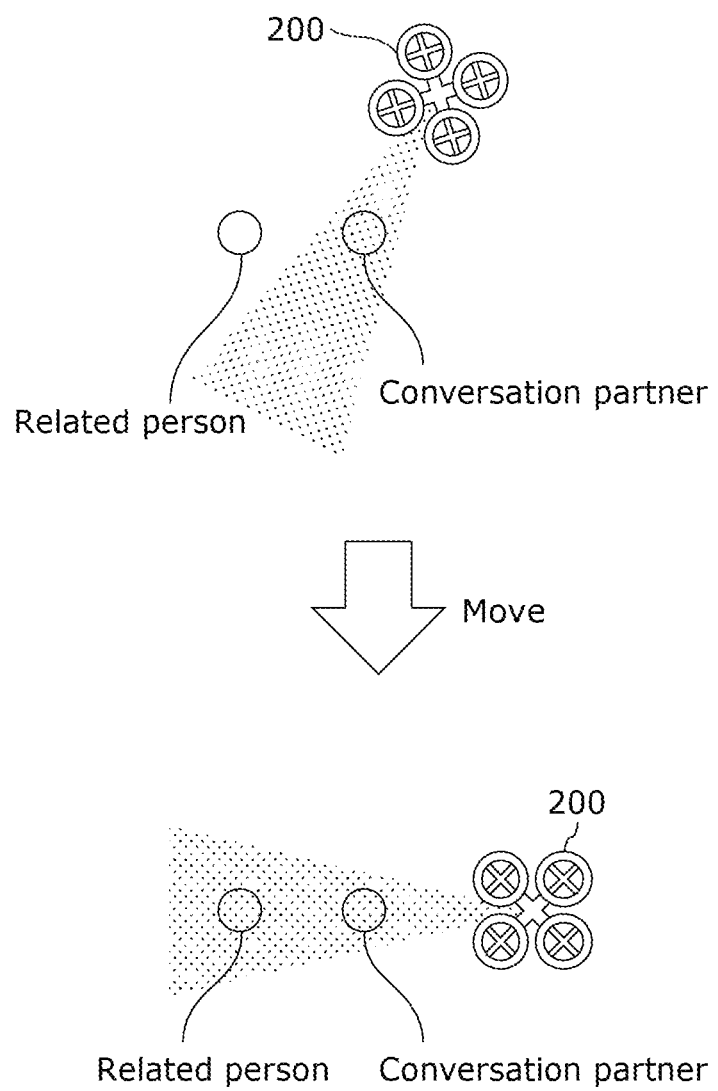
FIG. 67 is a conceptual diagram illustrating an example of the unmanned moving body moving to a sound collection position, according to Embodiment 2.

FIG. 67 is a conceptual diagram illustrating an example of unmanned moving body 200 moving to a sound collection position. For example, when moving to a sound collection position while collecting sound from the conversation partner, unmanned moving body 200 moves to the sound collection position in such a manner that the conversation partner does not exit the sound collection range during the movement. This makes it possible for unmanned moving body 200 to continuously collect sound from the conversation partner.

Specifically, in this case, unmanned moving body 200 moves to the sound collection position while directing the orientation direction of directional microphone 208 toward the conversation partner. Unmanned moving body 200 moves within a predetermined distance from the conversation partner. This predetermined distance corresponds to the length of the sound collection range in the sound collection direction. Unmanned moving body 200 may create a movement path within the predetermined distance from the conversation partner and move to the sound collection position along the created movement path. This makes it possible for unmanned moving body 200 to move to the sound collection position in such a manner that the conversation partner does not exit the sound collection range during the movement.

Additionally, unmanned moving body 200 may change the sound collection sensitivity in accordance with the distance between unmanned moving body 200 and the conversation partner such the sound pressure at which sound is collected from the conversation partner remains constant during the movement. For example, when moving away from the conversation partner, unmanned moving body 200 may move while increasing the sound collection sensitivity. Conversely, when moving toward the conversation partner, unmanned moving body 200 may move while reducing the sound collection sensitivity.

Note that unmanned moving body 200 may move when the conversation is interrupted or the like in order to avoid collecting the sound of the conversation in a fragmented manner due to the related person entering into the sound collection range while talking during sound collection.

Figure 68:
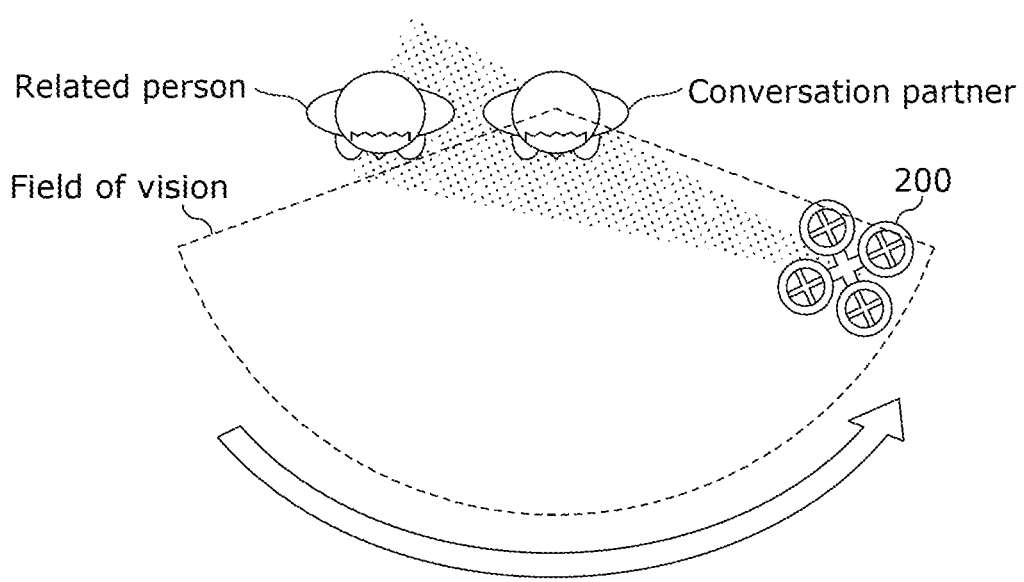
FIG. 68 is a conceptual diagram illustrating an example of the unmanned moving body moving to a sound collection position by passing on a front side, according to Embodiment 2.

FIG. 68 is a conceptual diagram illustrating an example of unmanned moving body 200 moving to a sound collection position by passing on a front side. For example, unmanned moving body 200 moves to the sound collection position through the front side of the conversation partner. The front side of the conversation partner corresponds to the field of vision of the conversation partner. When unmanned moving body 200 has exited the field of vision of the conversation partner, it is difficult for the conversation partner to converse with unmanned moving body 200, By moving to the sound collection position through the front side of the conversation partner, unmanned moving body 200 can provide a smooth conversation to the conversation partner during the movement.

Specifically, unmanned moving body 200 may specify the field of vision of the conversation partner by using image recognition processing to detect the front side of the conversation partner. Unmanned moving body 200 may then create a movement path within the specified field of vision and move to the sound collection position along the created movement path.

Additionally, although unmanned moving body 200 moves to the sound collection position through the front side of the conversation partner in the foregoing descriptions, unmanned moving body 200 may move to the sound collection position through the front side of the conversation partner and the related person. This makes it possible for unmanned moving body 200 to provide a smooth conversation to the related person as well.

Figure 69:
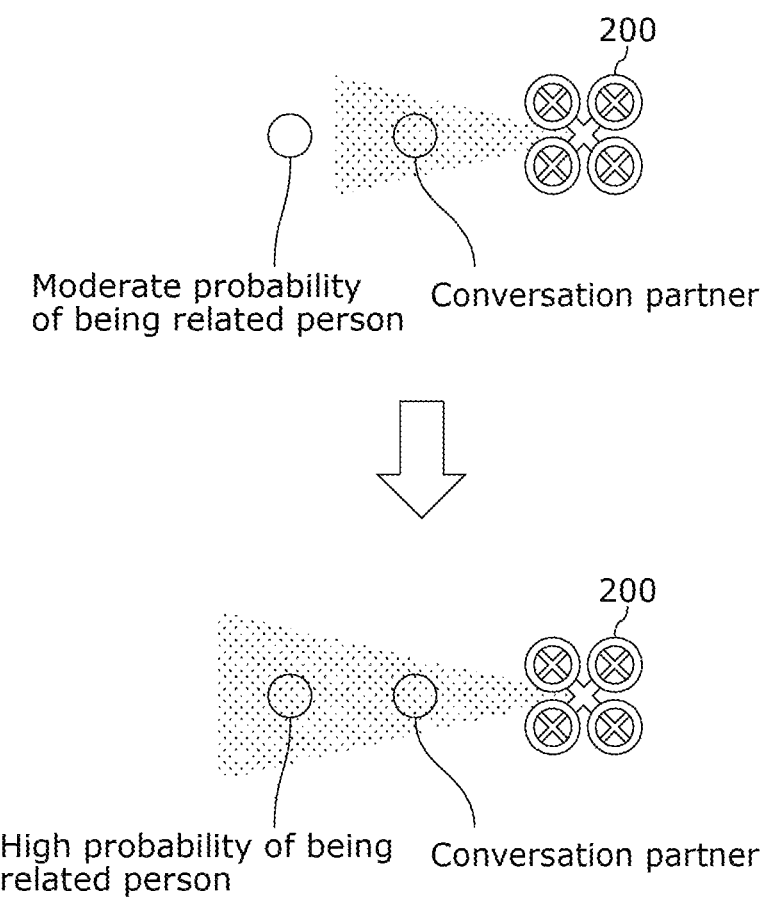
FIG. 69 is a conceptual diagram illustrating an example of the unmanned moving body changing a sound collection range, according to Embodiment 2.

FIG. 69 is a conceptual diagram illustrating an example of unmanned moving body 200 changing a sound collection range. Unmanned moving body 200 may adjust the sound collection position in such a manner that the conversation partner and the related person are within the sound collection range. Specifically, unmanned moving body 200 may adjust the sound collection range by adjusting the sound collection sensitivity of directional microphone 208.

Additionally, as illustrated in the example in the top part of FIG. 69, when it is determined that there is a moderate probability that a person aside from the conversation partner is a related person, unmanned moving body 200 moves to a sound collection position at which the conversation partner and the person aside from the conversation partner are in the sound collection direction. Then, unmanned moving body 200 may adjust the sound collection sensitivity of directional microphone 208 so that sound is collected from the conversation partner and sound is not collected from the person aside from the conversation partner. In other words, unmanned moving body 200 reduces the sound collection sensitivity of directional microphone 208.

Then, as illustrated in the example in the bottom part of FIG. 69, when it is determined that there is a high probability that the person aside from the conversation partner is a related person, unmanned moving body 200 adjusts the sound collection sensitivity of directional microphone 208 such that sound is not collected from the person aside from the conversation partner. In other words, unmanned moving body 200 reduces the sound collection sensitivity of directional microphone 208.

Accordingly, when the probability that the person aside from the conversation partner is a related person has increased, unmanned moving body 200 can immediately collect sound from the person aside from the conversation partner without moving, Note, however, that unmanned moving body 200 may move in the sound collection direction without increasing the sound collection sensitivity. This makes it possible for unmanned moving body 200 to suppress an increase in power consumption caused by the increase in the sound collection sensitivity.

Figure 70:
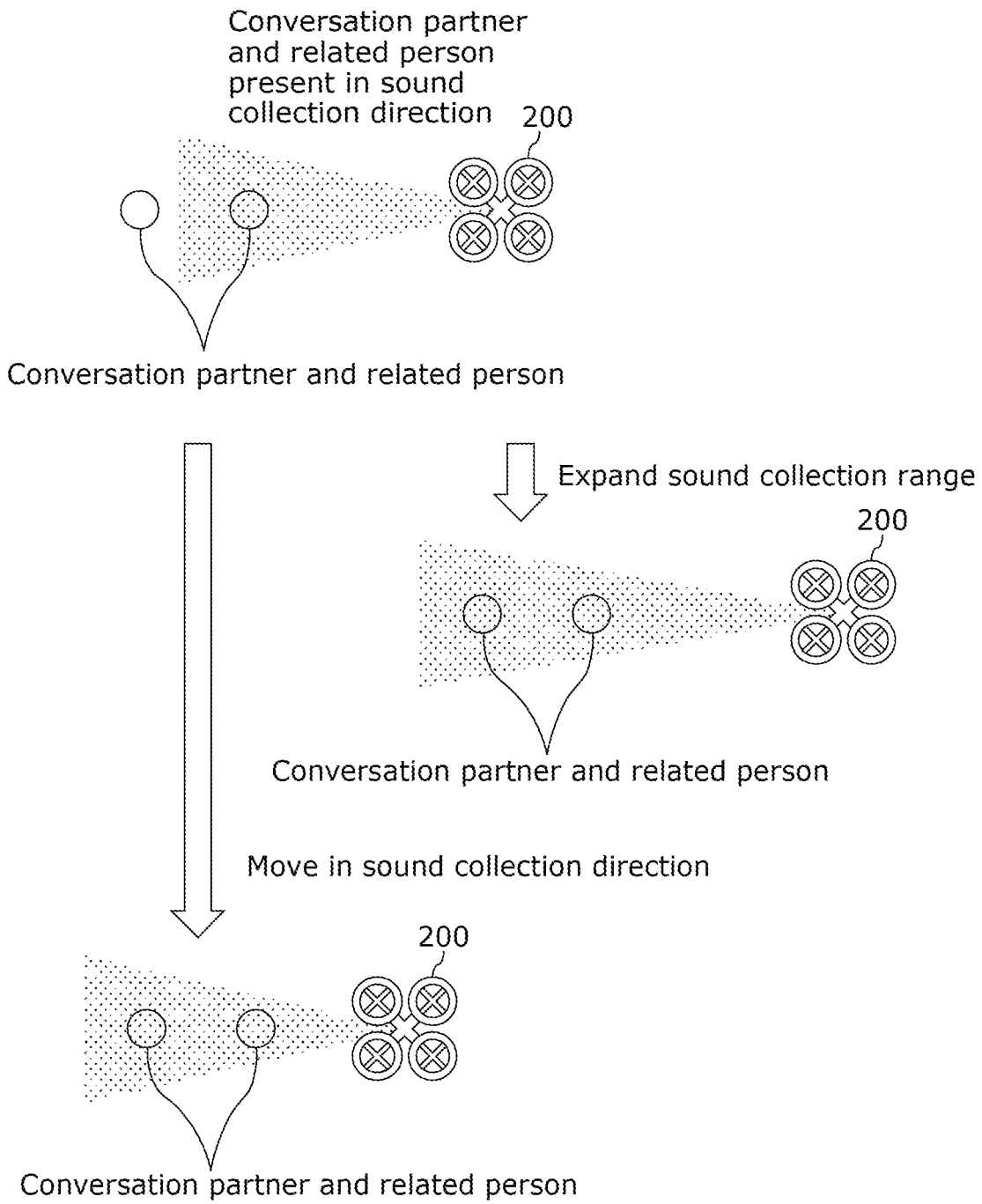
FIG. 70 is a conceptual diagram illustrating an example of movement, changing a sound collection range, and selective operations, according to Embodiment 2.

FIG. 70 is a conceptual diagram illustrating an example of movement, changing a sound collection range, and selective operations. When both the conversation partner and a related person are present in the sound collection direction, unmanned moving body 200 can select whether to expand the sound collection range or move in the sound collection direction. In other words, unmanned moving body 200 can include the conversation partner and the related person in the sound collection range by expanding the sound collection range, and can also include the conversation partner and the related person in the sound collection range by moving in the sound collection direction.

However, when expanding the sound collection range, unmanned moving body 200 also increases the sound collection sensitivity. It is assumed that the power consumption will also increase as a result. Accordingly, unmanned moving body 200 may prioritize moving in the sound collection direction over expanding the sound collection range.

Additionally, when unmanned moving body 200 is too close to the conversation partner, there is a possibility that unmanned moving body 200 will come into contact with the conversation partner. Additionally, when unmanned moving body 200 is too close to the conversation partner, there are cases where the sound collecting from the conversation partner is too loud. As such, unmanned moving body 200 may move in the sound collection direction until unmanned moving body 200 is as close as possible to the conversation partner. If the related person is not within the sound collection range even in this state, unmanned moving body 200 may expand the sound collection range. This makes it possible for unmanned moving body 200 to collect sound appropriately from the conversation partner and the related person.

Figure 71:
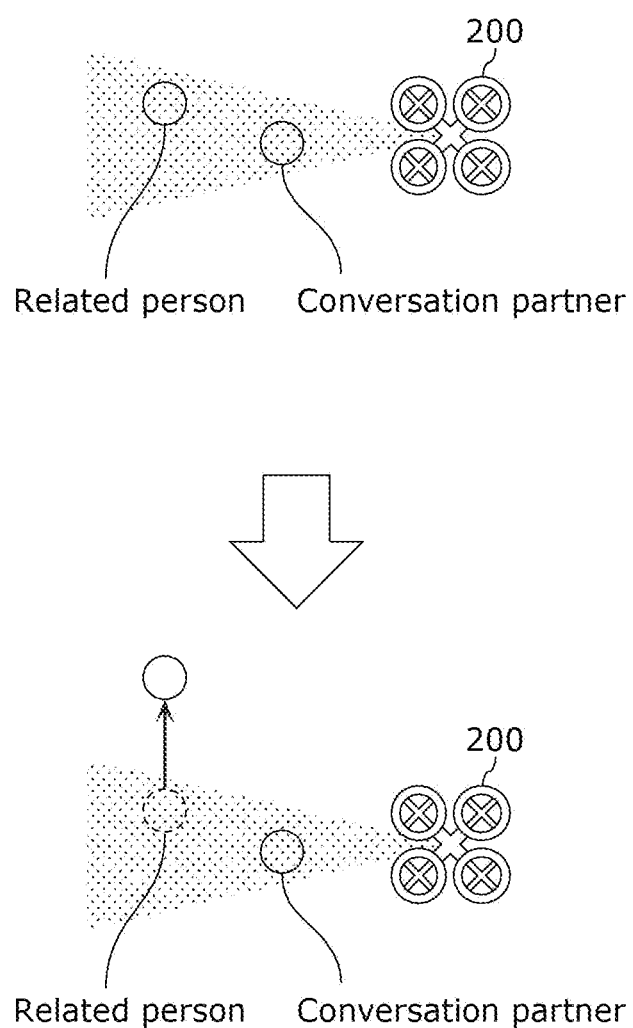
FIG. 71 is a conceptual diagram illustrating an example of a case where a related person has left a sound collection range, according to Embodiment 2.

FIG. 71 is a conceptual diagram illustrating an example of a case where a related person has left a sound collection range. For example, when the related person has left the sound collection range, and more specifically, when the related person has left the sound collection range him or herself, it is assumed that the related person does not intend to have a conversation with unmanned moving body 200.

Accordingly, for example, in the foregoing case, unmanned moving body 200 does not move to a sound collection position for including the related person in the sound collection range. This makes it possible for unmanned moving body 200 to suppress power consumption resulting from wasteful movement, and suppress the unnecessary collection of sound to the related person.

However, it is also possible that the related person is moving while still intending to converse with unmanned moving body 200. For example, when a state in which the related person is not very far from the sound collection range continues for at least a predetermined amount of time, it is possible that the related person intends to converse with unmanned moving body 200. Accordingly, when a state in which the related person is not very far from the sound collection range continues for at least a predetermined amount of time, unmanned moving body 200 may move so as to include the related person in the sound collection range.

Note that the state in which the related person is not very far from the sound collection range is a state in which, for example, the related person is not present within the sound collection range but is present within a predetermined range around the sound collection range.

Figure 72:
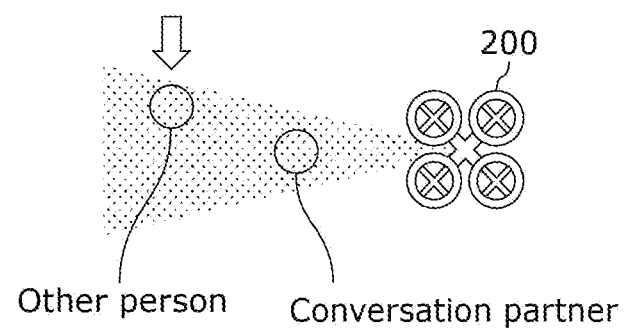
FIG. 72 is a conceptual diagram illustrating an example of a case where another person has entered a sound collection range, according to Embodiment 2.
Figure 72:
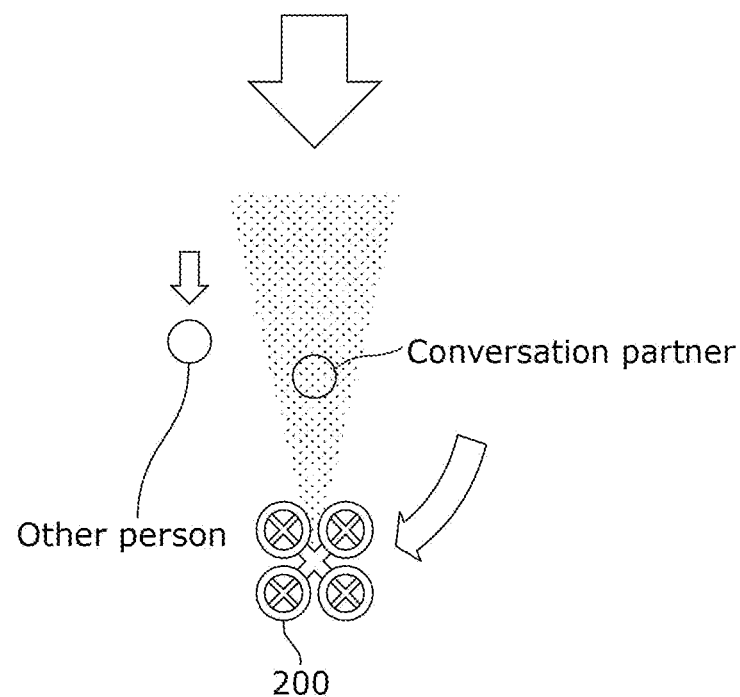

FIG. 72 is a conceptual diagram illustrating an example of a case where another person has entered a sound collection range. When another person aside from the conversation partner has entered the sound collection range or the sound collection direction while sound is being collected from the conversation partner, unmanned moving body 200 may move so that the other person is outside of the sound collection range or the sound collection direction. For example, when, using image recognition processing, it is detected that another person has entered the sound collection range or the sound collection direction, unmanned moving body 200 may change the sound collection position so that the other person is outside of the sound collection range or the sound collection direction, and may then move to the changed sound collection position.

Additionally, unmanned moving body 200 may, at the timing at which it is detected that the voice of another person has been collected by directional microphone 208, change the sound collection position so that the other person is outside the sound collection range or the sound collection direction, and may then move to the changed sound collection position.

For example, when another person present in the sound collection range or the sound collection direction is not speaking, the voice of that other person will not be collected. In such a case, the other person has no effect, and unmanned moving body 200 therefore need not move. Then, when the voice of the other person is collected and the other person has an effect, unmanned moving body 200 may move so that the other person is outside the sound collection range or the sound collection direction.

Additionally, unmanned moving body 200 may determine whether or not the other person is a related person, and when it is determined that the other person is not a related person, unmanned moving body 200 may change the sound collection position so that the other person is outside the sound collection range or the sound collection direction.

Additionally, when another person aside from the conversation partner and the related person has entered the sound collection range or the sound collection direction while sound is being collected from the conversation partner and the related person, unmanned moving body 200 may move so that the other person is outside of the sound collection range or the sound collection direction.

Figure 73:
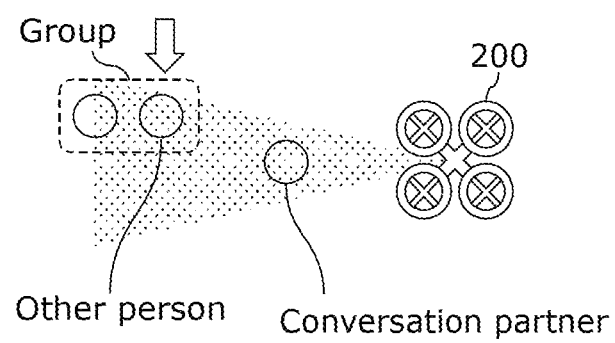
FIG. 73 is a conceptual diagram illustrating an example of a case where a group has entered a sound collection range, according to Embodiment 2.
Figure 73:
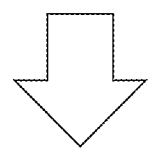
Figure 73:
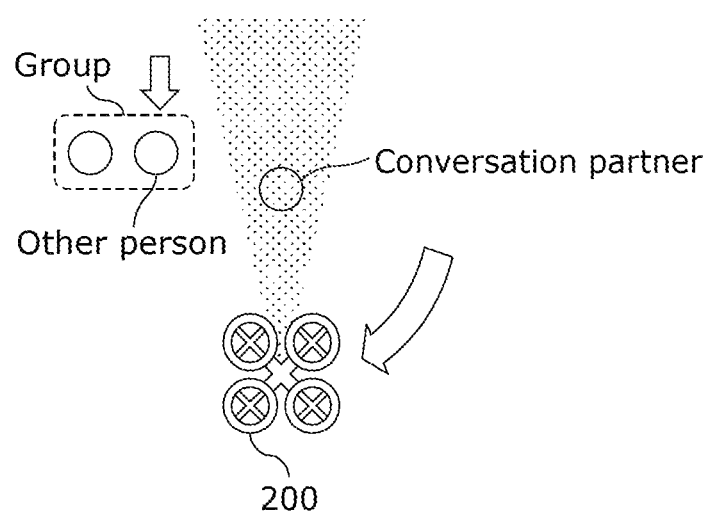

FIG. 73 is a conceptual diagram illustrating an example of a case where a group has entered a sound collection range. A group constituted by a plurality of other people aside from the conversation partner may be having a conversation within the group. Accordingly, when a group has entered the sound collection range or the sound collection direction, unmanned moving body 200 may move so that the conversation in the group is not collected. In other words, in this case, unmanned moving body 200 moves so that the group which has entered the sound collection range or the sound collection direction is outside the sound collection range or the sound collection direction.

For example, when, using image recognition processing, it is detected that a group has entered the sound collection range or the sound collection direction, unmanned moving body 200 may change the sound collection position so that the group is outside of the sound collection range or the sound collection direction, and may then move to the changed sound collection position.

Additionally, unmanned moving body 200 may determine whether or not a plurality of other people aside from the conversation partner constituted group by using whether or not a person aside from the conversation partner is a related person related to the conversation partner as a criterion. In other words, unmanned moving body 200 may determine whether or not a plurality of people constitute a group in which the people are related to each other, using the criteria described in Embodiment 1 with reference to FIGS. 13 to 23.

Additionally, when a group constituted by a plurality of people aside from the conversation partner and the related person has entered the sound collection range or the sound collection direction while sound is being collected from the conversation partner and the related person, unmanned moving body 200 may move so that the group is outside of the sound collection range or the sound collection direction.

Figure 74:
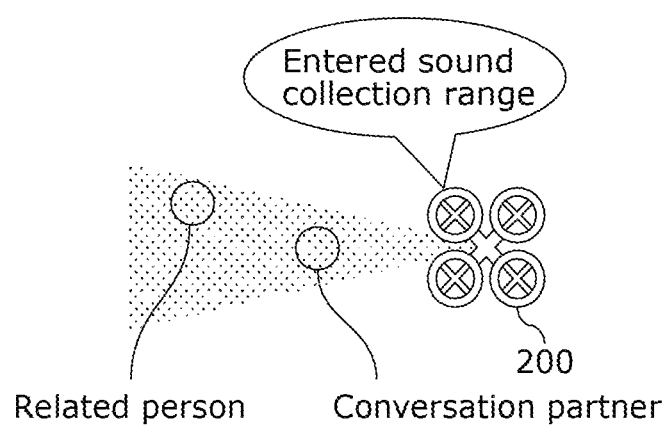
FIG. 74 is a conceptual diagram illustrating an example of a case where a related person has entered a sound collection range, according to Embodiment 2.

FIG. 74 is a conceptual diagram illustrating an example of a case where a related person has entered a sound collection range. For example, in Embodiment 1, when a related person has entered the sound emission range as a result of moving body 100 moving to the sound emission position, sound reaches the related person from unmanned moving body 100 as a result of unmanned moving body 100 emitting sound, and it is therefore easy for the related person to recognize that they have entered the sound emission range. However, in the present embodiment, when a related person has entered the sound collection range as a result of unmanned moving body 200 moving to the sound collection position, it is not easy for the related person to recognize that they have entered the sound collection range.

Accordingly, when a related person has entered the sound collection range as a result of unmanned moving body 200 moving to the sound collection position, unmanned moving body 200 may notify the related person that they have entered the sound collection range.

For example, unmanned moving body 200 may emit a message saying "you have entered the sound collection range" using directional speaker 207. In other words, unmanned moving body 200 may make the notification using sound. Alternatively, unmanned moving body 200 may include an LED for making notifications. Unmanned moving body 200 may then make the notification using the LED. Alternatively, unmanned moving body 200 may make the notification by sending information indicating that the related person has entered the sound collection range to a mobile terminal of the related person using communicator 210.

As described above, unmanned moving body 200 according to the present embodiment includes directional microphone 208 and processor 250. Directional microphone 208 collects sound from an orientation direction. Processor 250 obtains one or more instances of sensing data including data obtained from directional microphone 208.

Then, processor 250 determines whether or not a second target is present in a vicinity of a first target in accordance with at least one of the one or more instances of sensing data, Processor 250 calculates a positional relationship between the first target and the second target from the at least one of the one or more instances of sensing data when it is determined that the second target is present.

Then, processor 250 determines a first position of unmanned moving body 200 in accordance with the positional relationship and causes unmanned moving body 200 to move to the first position, the first position being a position that places the first target and the second target within a range over which sound is collected by directional microphone 208 at at least a predetermined quality.

As a result, unmanned moving body 200 can collect sound appropriately from the first target and the second target. In other words, unmanned moving body 200 can collect sound from a plurality of targets in an integrated manner.

Although a variable sound collection range is used in the foregoing descriptions, a fixed sound collection range may be used. In other words, the sound collection sensitivity may be fixed. Additionally, an omnidirectional microphone may be used instead of directional microphone 208, Even with such a configuration, moving to an appropriate sound collection position makes it possible to appropriately collect sound from a plurality of targets.

Embodiment 3

Embodiment 1 relates primarily to sound emission. Embodiment 2 relates primarily to sound collection. The present embodiment relates to both sound emission and sound collection. The configuration and operations described in Embodiment 1, and the configuration and operations described in Embodiment 2, can also be applied to the present embodiment. A configuration and operations related to both sound emission and sound collection will be described hereinafter.

Figure 75:
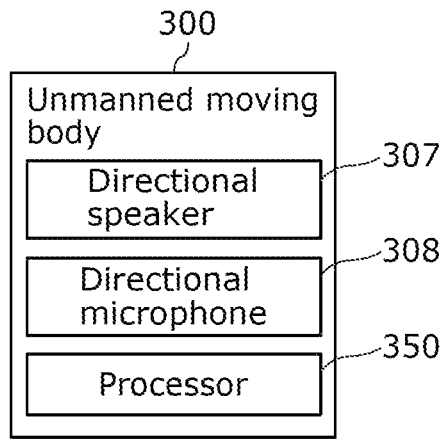
FIG. 75 is a block diagram illustrating an example of the basic configuration of an unmanned moving body according to Embodiment 3.

FIG. 75 is a block diagram illustrating an example of the basic configuration of an unmanned moving body according to the present embodiment. FIG. 75 illustrates unmanned moving body 300, which includes directional speaker 307, directional microphone 308, and processor 350.

Unmanned moving body 300 is a device that moves. For example, unmanned moving body 300 moves or stops autonomously. Unmanned moving body 300 may move according to an operation upon being subjected to such an operation. Although typically an unmanned aircraft, unmanned moving body 300 is not limited to an unmanned aircraft, and may be a device that travels on a surface. Unmanned moving body 300 may include a movement mechanism, such as a motor, an actuator, and the like, for moving through the air or on a surface.

Additionally, unmanned moving body 300 may include one or more sensors. For example, unmanned moving body 300 may include an image sensor, a range sensor, directional microphone 308 or another microphone serving as a sound sensor, a person detection sensor, a position detector serving as a position sensor, and so on.

Directional speaker 307 is a speaker that emits sound in an orientation direction. The orientation direction of directional speaker 307 may be adjustable, and the sound pressure of the sound emitted by directional speaker 307 may be adjustable. The orientation direction of directional speaker 307 may also be referred to as a "sound emission direction".

Directional microphone 308 is a microphone that collects sound from an orientation direction. The orientation direction of directional microphone 308 may be adjustable, and a sound collection sensitivity of directional microphone 308 may be adjustable. The orientation direction of directional microphone 308 may also be referred to as a "sound collection direction".

Processor 350 is constituted by circuitry that processes information. For example, processor 350 may control the movement of unmanned moving body 300. Specifically, processor 350 may control the movement of unmanned moving body 300 by controlling the operations of a movement mechanism, such as a motor, an actuator, and the like, for moving through the air or on a surface.

Additionally, processor 350 may adjust the orientation direction of directional speaker 307, and may adjust the sound pressure of the sound emitted by directional speaker 307, by sending control signals to directional speaker 307. Additionally, processor 350 may adjust the orientation direction of directional speaker 307 by adjusting an orientation of unmanned moving body 300.

Additionally, processor 350 may adjust the orientation direction of directional microphone 308, or may adjust the sound collection sensitivity of directional microphone 308, by sending control signals to directional microphone 308. Additionally, processor 350 may adjust the orientation direction of directional microphone 308 by adjusting an orientation of unmanned moving body 300.

Figure 76:
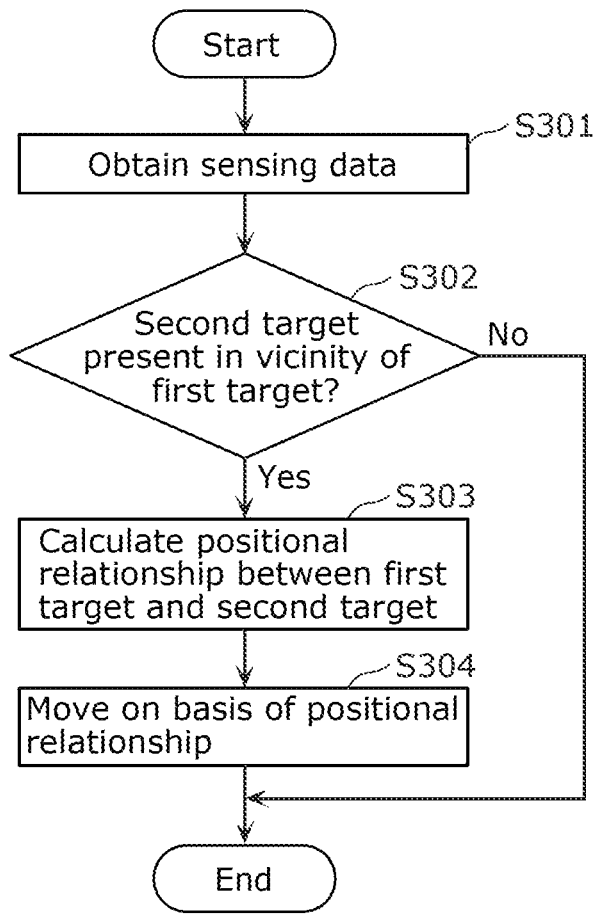
FIG. 76 is a flowchart illustrating an example of the basic operations of the unmanned moving body according to Embodiment 3.

FIG. 76 is a flowchart illustrating an example of the basic operations of unmanned moving body 300 illustrated in FIG. 75. The operations illustrated in FIG. 76 are mainly performed by processor 350 of unmanned moving body 300.

First, processor 350 obtains one or more instances of sensing data (S301). Processor 350 may obtain the one or more instances of sensing data from one or more sensors within unmanned moving body 300, or may obtain the one or more instances of sensing data from one or more sensors outside unmanned moving body 300. Additionally, processor 350 may obtain a plurality of instances of sensing data from one or more sensors within unmanned moving body 300 and one or more sensors outside unmanned moving body 300.

For example, an image sensor, a range sensor, a microphone, a person detection sensor, a position detector, and the like may be used as the one or more sensors outside unmanned moving body 300.

Then, processor 350 determines whether or not a second target is present in a vicinity of a first target in accordance with at least one of the one or more instances of sensing data that have been obtained (S302). For example, the first target is a conversation partner, and the second target is a related person related to the conversation partner. However, the first target and the second target are not limited to people, and may be animals or devices.

Then, processor 350 calculates a positional relationship between the first target and the second target from the at least one of the one or more instances of sensing data when it is determined that the second target is present in the vicinity of the first target (S303). In other words, processor 350 calculates a positional relationship between the first target and the second target from at least one of the one or more instances of sensing data.

For example, the positional relationship includes at least one of a position or a distance related to the first target and the second target. The positional relationship may include the positions of both the first target and the second target, and may include a distance between the first target and the second target.

Specifically, processor 350 may calculate the position of the first target, the position of the second target the distance between the first target and the second target, and the like using image data obtained from the image sensor. Additionally, processor 350 may calculate a distance between unmanned moving body 300 and the first target, a distance between unmanned moving body 300 and the second target, the distance between the first target and the second target, and the like using range data obtained from the range sensor.

Processor 350 then determines a first position in accordance with the positional relationship that has been calculated. The first position is a position of unmanned moving body 300 which is a range over which sound from directional speaker 307 reaches at at least a predetermined quality and at which the first target and the second target are within a range over which sound can be collected by directional microphone 308 at at least a predetermined quality. Processor 350 then causes unmanned moving body 300 to move to the first position that has been determined (S304).

As a result, unmanned moving body 300 can emit and collect sound appropriately to and from the first target and the second target. In other words, unmanned moving body 300 can emit and collect sound for a plurality of targets in an integrated manner.

More specific examples will be described hereinafter with reference to FIGS. 77 to 81, In the following examples, unmanned moving body 300 is an unmanned aircraft, also called a "drone". The first target corresponds to the "conversation partner" and the "related person" corresponds to the second target.

Figure 77:
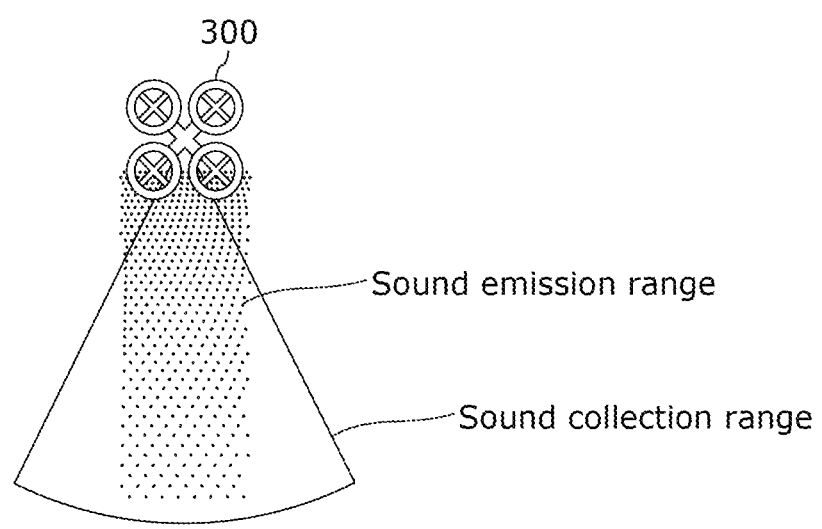
FIG. 77 is a conceptual diagram illustrating an example of a sound emission range and a sound collection range, according to Embodiment 3.

FIG. 77 is a conceptual diagram illustrating an example of a sound emission range and a sound collection range. The sound emission range according to the present embodiment is determined in the same manner as the sound emission range in Embodiment 1, and the sound collection range according to the present embodiment is determined in the same manner as in Embodiment 2.

For unmanned moving body 300 and a person to converse with each other, unmanned moving body 300 moves to a conversation position at which sound from directional speaker 307 reaches the person and at which sound from the person is collected by directional microphone 308. Specifically, unmanned moving body 300 determines the conversation position in accordance with an overlapping range between the sound emission range and the sound collection range.

For example, unmanned moving body 300 determines the conversation position in such a manner that the conversation partner is within the overlapping range between the sound emission range and the sound collection range. Additionally, for example, when a related person related to the conversation partner is present in the vicinity of the conversation partner, unmanned moving body 300 determines the conversation position in such a manner that the conversation partner and the related person are within the overlapping range between the sound emission range and the sound collection range. These operations are performed in the same manner as the operations in Embodiment 1 for determining the sound emission position in such a manner that the conversation partner and the like are within the sound emission range, and the operations in Embodiment 2 for determining the sound collection position in such a manner that the conversation partner and the like are within the sound collection range.

Then, unmanned moving body 300 moves to the conversation position determined in accordance with the overlapping range between the sound emission range and the sound collection range.

Figure 78:
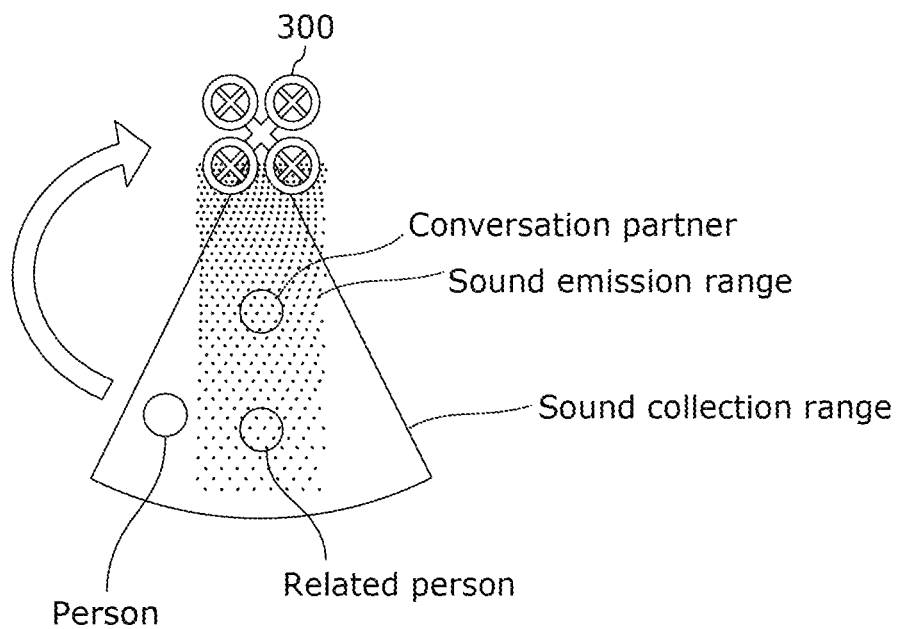
FIG. 78 is a conceptual diagram illustrating an example of sound collected from a range in which a sound emission range and a sound collection range do not overlap, according to Embodiment 3.

FIG. 78 is a conceptual diagram illustrating an example of sound collected from a range in which a sound emission range and a sound collection range do not overlap. The sound emission range and the sound collection range may partially overlap. In other words, there are cases where a part of the sound emission range overlaps with a part of the sound collection range, but other parts of the sound emission range do not overlap with other parts of the sound collection range. There are also cases where a person is present in only one of the sound emission range and the sound collection range. For example, unmanned moving body 300 may operate so as not to converse with a person present in only one of the sound emission range and the sound collection range.

Specifically, as illustrated in FIG. 78, there are cases where a person is present within the sound collection range but outside the sound emission range. In this case, unmanned moving body 300 collects sound from the person, but sound emitted from unmanned moving body 300 does not reach the person. Accordingly, for example, unmanned moving body 300 may ignore collected sound when it is determined that the collected sound is sound that has been collected from a location different from the overlapping range between the sound emission range and the sound collection range. In other words, unmanned moving body 300 may skip the processing of responding to sound collected from the person.

Additionally, for example, unmanned moving body 300 may detect a person present within the sound collection range but outside the sound emission range trough image recognition processing, voice recognition processing, or the like. Then, unmanned moving body 300 may ignore the sound collected from that person.

Note that the foregoing operations may be performed for a person who is different from the conversation partner and who may or may not be a related person. Alternatively, the foregoing operations may be performed for a person who is the conversation partner or a related person.

Figure 79:
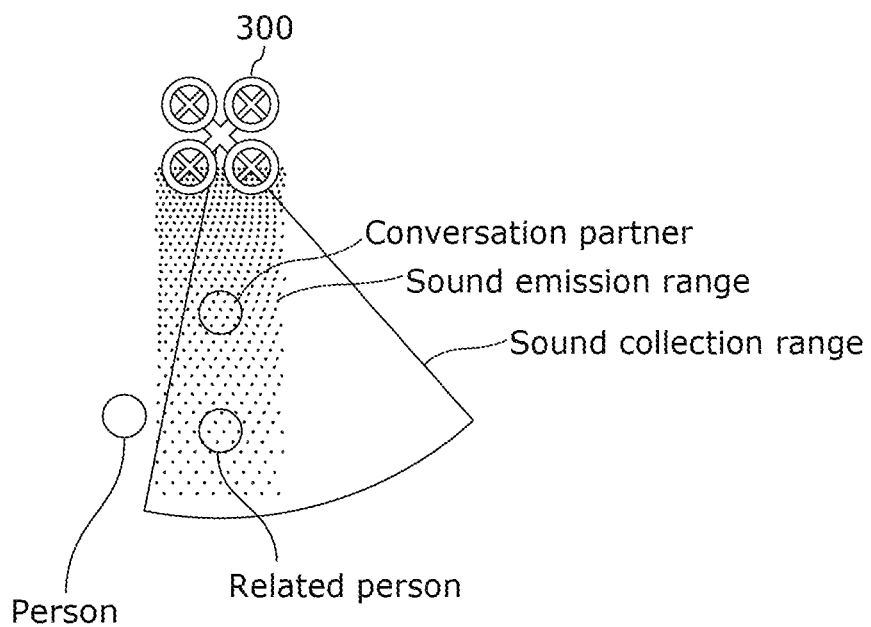
FIG. 79 is a conceptual diagram illustrating an example of adjusting a range in which a sound emission range and a sound collection range do not overlap, according to Embodiment 3.

FIG. 79 is a conceptual diagram illustrating an example of adjusting a range in which a sound emission range and a sound collection range do not overlap. Unmanned moving body 300 may adjust a range over which the sound emission range and the sound collection range do not overlap in order to suppress situations where a person enters only one of the sound emission range and the sound collection range.

Specifically, unmanned moving body 300 may adjust at least one of the orientation of unmanned moving body 300, the orientation direction of directional speaker 307, or the orientation direction of directional microphone 308 so that a person does not enter only one of the sound emission range and the sound collection range. Alternatively, unmanned moving body 300 may narrow at least one of the directional width of directional speaker 307 or the directional width of directional microphone 308 so that a person does not enter only one of the sound emission range and the sound collection range.

Figure 80:
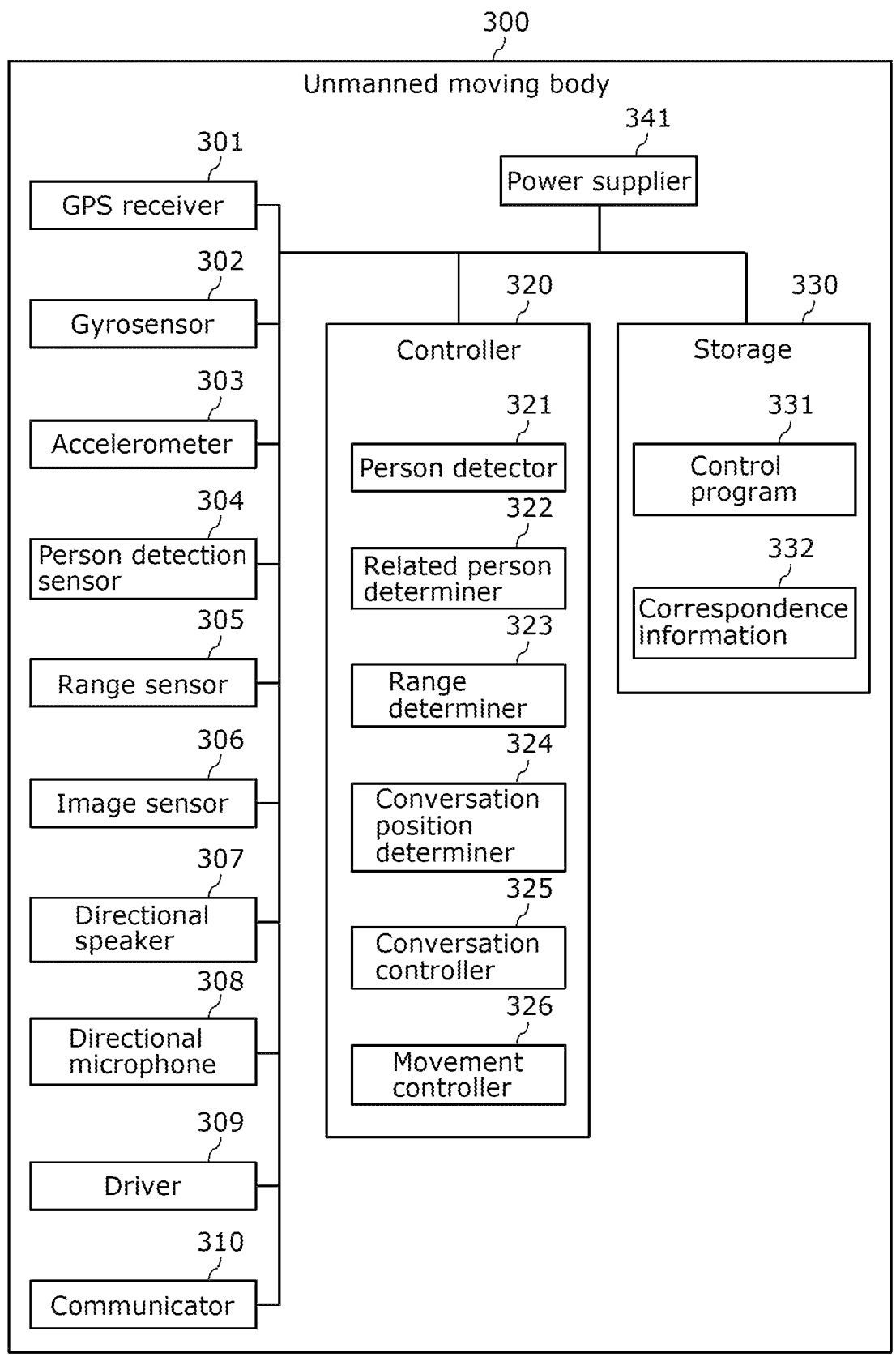
FIG. 80 is a block diagram illustrating an example of the specific configuration of the unmanned moving body according to Embodiment 3.

FIG. 80 is a block diagram illustrating an example of the specific configuration of unmanned moving body 300 illustrated in FIG. 75. Unmanned moving body 300 illustrated in FIG. 80 includes GPS receiver 301, gyrosensor 302, accelerometer 303, person detection sensor 304, range sensor 305, image sensor 306, directional speaker 307, directional microphone 308, driver 309, communicator 310, controller 320, storage 330, and power supplier 341.

GPS receiver 301 is a receiver that constitutes a GPS (Global Positioning System) for measuring a position and obtains a position by receiving a signal. For example, GPS receiver 301 obtains the position of unmanned moving body 300.

Gyrosensor 302 is a sensor that detects an attitude of unmanned moving body 300, i.e., an angle or a tilt of unmanned moving body 300. Accelerometer 303 is a sensor that detects an acceleration of unmanned moving body 300. Person detection sensor 304 is a sensor that detects a person in the vicinity of unmanned moving body 300. Person detection sensor 304 may be an infrared sensor.

Range sensor 305 is a sensor that measures a distance between unmanned moving body 300 and a target, and generates range data. Image sensor 306 is a sensor that captures an image, and generates an image through the capturing. Image sensor 306 may be a camera.

Directional speaker 307 is, as described above, a speaker that emits sound in an orientation direction. The orientation direction of directional speaker 307 may be adjustable, and the sound pressure of the sound emitted by directional speaker 307 may be adjustable. Directional microphone 308 is, as described above, a microphone that collects sound from an orientation direction. The orientation direction of directional microphone 308 may be adjustable, and a sound collection sensitivity of directional microphone 308 may be adjustable.

Driver 309 is a motor, an actuator, and the like that cause unmanned moving body 300 to move. Communicator 310 is a communication device that communicates with a device outside unmanned moving body 300. Communicator 310 may receive operation signals for moving unmanned moving body 300, Additionally, communicator 310 may send and receive content of conversations.

Controller 320 corresponds to processor 350 illustrated in FIG. 75, and is constituted by circuitry that processes information. Specifically, in this example, controller 320 includes person detector 321, related person determiner 322, range determiner 323, conversation position determiner 324, conversation controller 325, and movement controller 326. In other words, processor 350 may realize these roles.

Person detector 321 detects a person present in the vicinity of unmanned moving body 300, Person detector 321 detects the person present in the vicinity of unmanned moving body 300 in accordance with sensing data obtained from person detection sensor 304 or another sensor.

Related person determiner 322 determines whether or not the person detected by person detector 321 is a related person related to the conversation partner, Range determiner 323 determines a sound emission range and a sound collection range in accordance with a positional relationship between the conversation partner and the related person.

Conversation position determiner 324 determines a conversation position in accordance with the sound emission range and the sound collection range. Conversation controller 325 controls emission of sound from directional speaker 307 by sending control signals to directional speaker 307, and controls the sound collection by directional microphone 308 by sending control signals to directional microphone 308.

Movement controller 326 controls movement of unmanned moving body 300 by sending control signals to driver 309. In this example, movement controller 326 controls flight of unmanned moving body 300, which is an unmanned aircraft.

Storage 330 is memory for storing information, and stores control program 331 and correspondence information 332. Control program 331 is a program with which controller 320 processes information. Correspondence information 332 is information indicating a correspondence relationship between a sound pressure at which directional speaker 307 emits sound and a sound emission range over which sound reaches at at least a predetermined quality, and a correspondence relationship between the sound collection sensitivity of directional microphone 308 and the sound collection range over which sound can be collected at at least a predetermined quality.

Power supplier 341 is a circuit that supplies power to a plurality of constituent elements included in unmanned moving body 300. For example, power supplier 341 includes a power source.

Figure 81:
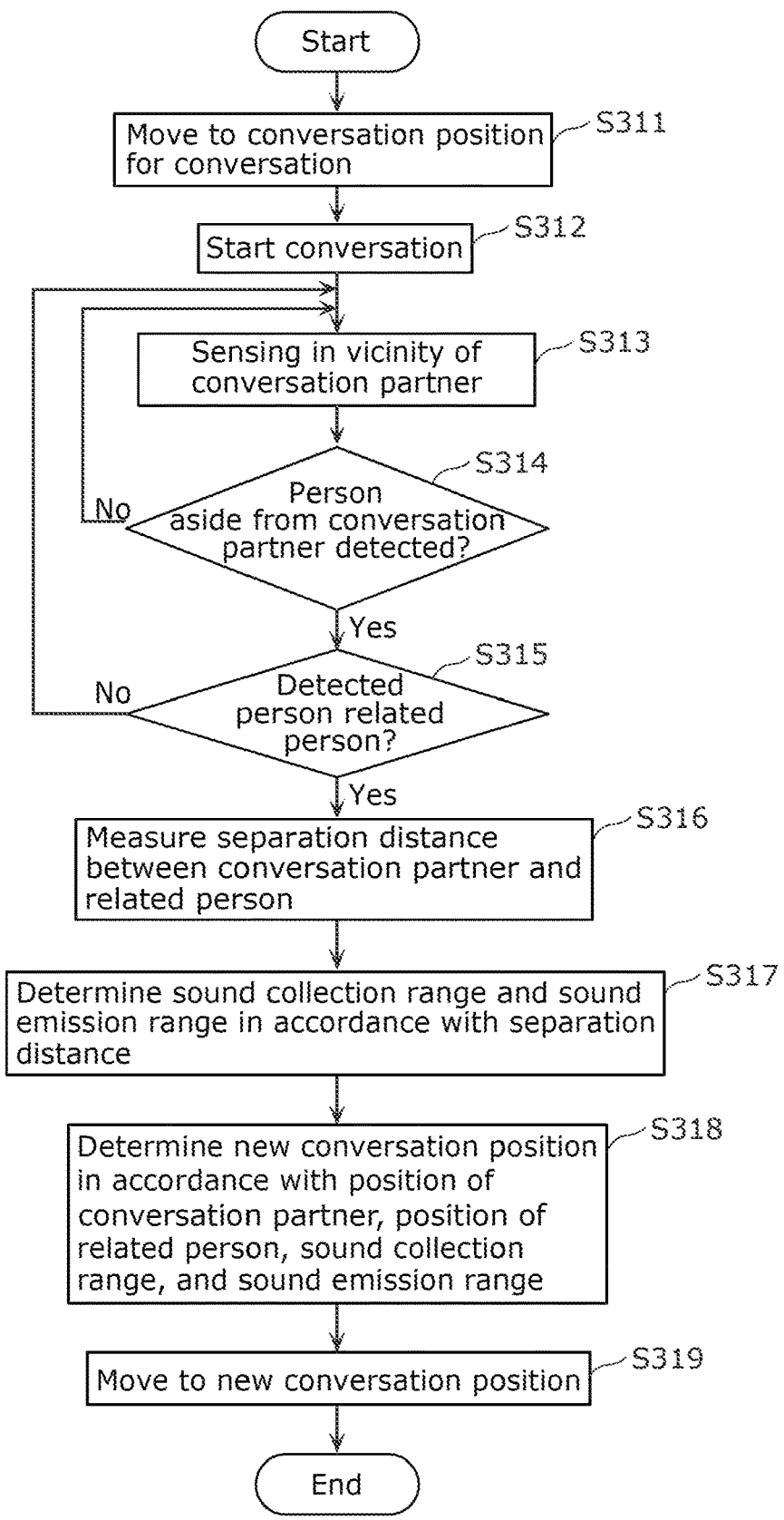
FIG. 81 is a flowchart illustrating an example of specific operations of the unmanned moving body according to Embodiment 3.

FIG. 81 is a flowchart illustrating an example of the specific operations of unmanned moving body 300 illustrated in FIG. 80, For example, a plurality of constituent elements of unmanned moving body 300, illustrated in FIG. 80, perform the operations illustrated in FIG. 81 by operating in tandem.

First, unmanned moving body 300 moves to the conversation position for conversing with the conversation partner (S311), The conversation position can be, for example, a position which voice emitted by the conversation partner reaches from the conversation partner's position and a position which sound from unmanned moving body 300 reaches. In other words, unmanned moving body 300 moves to a conversation position that places the conversation partner within the overlapping range between the sound emission range and the sound collection range. The conversation partner may be determined in advance. Unmanned moving body 300 may determine the conversation partner during flight.

For example, in unmanned moving body 300, person detector 321 detects the conversation partner in accordance with sensing data obtained from person detection sensor 304, image sensor 306, or the like. Then, using driver 309, movement controller 326 causes unmanned moving body 300 to move to a conversation position within a predetermined range from the conversation partner.

Then, unmanned moving body 300 starts a conversation (S312). In other words, unmanned moving body 300 starts at least one of emitting sound or collecting sound. Specifically, conversation controller 325 may cause directional microphone 308 to start collecting sound, or may cause directional speaker 307 to start emitting sound.

Then, unmanned moving body 300 senses the vicinity of the conversation partner (S313). For example, person detector 321 detects a person in the vicinity of the conversation partner by causing person detection sensor 304, image sensor 306, or the like to sense the vicinity of the conversation partner. Any sensor for detecting a person can be used for this detection. Additionally, the vicinity of the conversation partner corresponds to, for example, a region in a predetermined range from the conversation partner.

Then, unmanned moving body 300 determines whether or not a person aside from the conversation partner has been detected (S314). For example, person detector 321 determines whether or not a person aside from the conversation partner has been detected in the vicinity of the conversation partner. When a person aside from the conversation partner has not been detected (No in S314), unmanned moving body 300 repeats the sensing of the vicinity of the conversation partner (S313).

When a person aside from the conversation partner has been detected (Yes in S314), unmanned moving body 300 determines whether or not the detected person is a related person related to the conversation partner (S315). For example, related person determiner 322 may determine whether or not the detected person is the related person in accordance with whether or not the distance between the conversation partner and the related person is within a threshold, or may determine whether or not the detected person is the related person in accordance with another determination standard pertaining to grouping or the like. This determination is the same as the determination described in Embodiment 1.

When the detected person is not the related person (No in S315), unmanned moving body 300 repeats the sensing of the vicinity of the conversation partner (S313).

When the detected person is the related person (Yes in S315), unmanned moving body 300 measures a separation distance between the conversation partner and the related person (S316), For example, the separation distance between the conversation partner and the related person may be measured by range determiner 323 calculating a distance between the position of the conversation partner detected in accordance with the sensing data and the position of the related person detected in accordance with the sensing data.

Then, unmanned moving body 300 determines the sound emission range and the sound collection range in accordance with the separation distance between the conversation partner and the related person (S317). For example, range determiner 323 determines the sound emission range and the sound collection range in accordance with the measured separation distance. At this time, range determiner 323 makes the sound emission range and the sound collection range larger the larger the measured separation distance is.

The sound emission range is, for example, a range defined relatively using unmanned moving body 300 as a reference, and is a range over which sound from directional speaker 307 reaches at at least a predetermined quality. The sound collection range is, for example, a range defined relatively using unmanned moving body 300 as a reference, and is a range over which sound is collected by directional microphone 308 at at least a predetermined quality. "At least a predetermined quality" may correspond to a sound pressure within a predetermined range, or may correspond to an SN ratio (signal-to-noise ratio) within a predetermined range.

Then, unmanned moving body 300 determines a new conversation position in accordance with the position of the conversation partner, the position of the related person, the sound emission range, and the sound collection range (S318). For example, conversation position determiner 324 determines the new conversation position in such a manner that the position of the detected conversation partner and the position of the detected related person are within the overlapping range between the sound emission range and the sound collection range.

Then, unmanned moving body 300 moves to the new conversation position (S319). For example, movement controller 326 causes unmanned moving body 300 to move to the new conversation position by controlling operations of driver 309. Additionally, conversation controller 325 may control the emission of sound from directional speaker 307 so that sound reaches the sound emission range at at least the predetermined quality. Additionally, conversation controller 325 may control the sound collection by directional microphone 308 so that sound is collected from the sound collection range at at least the predetermined quality.

This makes it possible for unmanned moving body 300 to emit and collect sound appropriately to and from the conversation partner and the related person.

In the foregoing example, unmanned moving body 300 performs the processing for moving to the new conversation position for the conversation partner and the related person (S313 to S319) after a conversation with the conversation partner has been started (after S312). However, unmanned moving body 300 may perform the processing for moving to the new conversation position for the conversation partner and the related person before a conversation with the conversation partner is started.

Additionally, in the foregoing example, when the detected person is not the related person (No in S315), unmanned moving body 300 repeats the sensing of the vicinity of the conversation partner (S313), However, unmanned moving body 300 may modify the conversation position such that sound is not emitted to or collected from a person who is not a related person. In other words, conversation position determiner 324 in unmanned moving body 300 may modify the conversation position such that a person who is not a related person is in neither the sound emission range nor the sound collection range.

Additionally, conversation position determiner 324 may modify the conversation position such that a person who is not a related person is excluded from both the sound emission direction and the sound collection direction. Through this, the likelihood that a person who is not a related person will enter the sound emission range or the sound collection range upon moving is reduced.

Additionally, if the sound emission range and the sound collection range are fixed, unmanned moving body 300 may determine whether or not the separation distance between the conversation partner and the related person is within the overlapping range between the sound emission range and the sound collection range. Then, unmanned moving body 300 may determine the new conversation position such that the separation distance is within the overlapping range, and move to the determined new conversation position. Unmanned moving body 300 need not move if the separation distance is not within the overlapping range.

Additionally, as described above, the configuration and operations described in Embodiment 1, and the configuration and operations described in Embodiment 2, can also be applied to the present embodiment.

Although the foregoing has described aspects of an unmanned moving body based on embodiments and the like, the aspects of the unmanned moving body are not intended to be limited to the embodiments. Variations that can be conceived of by a person skilled in the art may be applied to the embodiments and the like, and a plurality of constituent elements in the embodiments and the like may be combined as desired. For example, processing executed by a specific constituent element in the embodiments and the like may be executed by a different constituent element instead of the specific constituent element. Additionally, the order of multiple processes may be changed, and multiple processes may be executed in parallel.

Additionally, the conversations described in the foregoing may be unidirectional conversations or bidirectional conversations. Additionally, the unmanned moving body may control the orientation directions of the directional speaker and the directional microphone in such a manner that the orientation directions of the directional speaker and the directional microphone are oriented toward the conversation partner and the related person.

In the foregoing descriptions, sound is emitted and collected to and from the conversation partner and the related person. However, when it is determined in advance that sound is to be emitted and collected to and from only one person, or when it is specified that sound is to be emitted and collected to and from only one person by switching and operation mode, sound may be emitted and collected to and from only the one person. In other words, sound may be emitted and collected to and from the conversation partner without determining a related person.

A position may then be determined in such a manner that no sound is emitted or collected to or from a person aside from the conversation partner. Specifically, the position may be determined in such a manner that no sound is emitted or collected to or from a person aside from the conversation partner, in the same manner as with the unrelated person in FIGS. 35 to 37 and FIGS. 62 to 64.

Additionally, an information processing method including steps performed by the constituent elements of the unmanned moving body may be executed by a desire device or system. In other words, the information processing method may be executed by the unmanned moving body, or may be executed by another device or system.

For example, the aforementioned information processing method may be executed by a computer including a processor, memory, input/output circuitry, and the like. At this time, the information processing method may be executed by having the computer execute a program for causing the computer to execute the information processing method. Additionally, the program may be recorded in a non-transitory computer-readable recording medium.

For example, the program causes a computer to execute an information processing method including: obtaining one or more instances of sensing data; determining whether or not a second target is present in a vicinity of a first target in accordance with at least one of the one or more instances of sensing data; calculating a positional relationship between the first target and the second target from at least one of the one or more instances of sensing data when it is determined that the second target is present; and determining a first position of an unmanned moving body in accordance with the positional relationship and causing the unmanned moving body to move to the first position, the first position being a position that places the first target and the second target within a range over which sound from a directional speaker included in the unmanned moving body reaches at at least a predetermined quality.

Additionally, for example, the program causes a computer to execute an information processing method including: obtaining one or more instances of sensing data; determining whether or not a second target is present in a vicinity of a first target in accordance with at least one of the one or more instances of sensing data; calculating a positional relationship between the first target and the second target from at least one of the one or more instances of sensing data when it is determined that the second target is present; and determining a first position of an unmanned moving body in accordance with the positional relationship and causing the unmanned moving body to move to the first position, the first position being a position that places the first target and the second target within a range over which sound is collected by a directional microphone included in the unmanned moving body at at least a predetermined quality.

Additionally, the plurality of constituent elements of the unmanned moving body may be constituted by dedicated hardware, by generic hardware that executes the aforementioned program and the like, or by a combination thereof. The generic hardware may be constituted by memory in which the program is stored, a generic processor for reading out the program from the memory and executing the program, and the like. Here, the memory may be a semiconductor memory, a hard disk, or the like, and the generic processor may be a CPU or the like.

Additionally, the dedicated hardware may be constituted by memory, a dedicated processor, and the like. For example, the dedicated processor may execute the above-described information processing method by referring to the memory.

Additionally, the constituent elements of the unmanned moving body may be electric circuits. These electric circuits may constitute a single overall electric circuit, or may be separate electric circuits. Additionally, these electric circuits may correspond dedicated hardware, or may correspond to generic hardware that executes the aforementioned program and the like.

A basic configuration, exemplary variations, and the like of an unmanned moving body according to an aspect of the present disclosure will be described hereinafter. These may be combined with each other, or may be combined with parts of the above-described embodiments and the like.

(1) For example, an unmanned moving body (100, 200, 300) according to one aspect of the present disclosure includes a directional speaker (107, 207, 307) and a processor (150, 250, 350). The directional speaker (107, 207, 307) outputs sound in an orientation direction.

The processor (150, 250, 350) obtains one or more instances of sensing data. Additionally, the processor (150, 250, 350) determines whether or not a second target is present in a vicinity of a first target in accordance with at least one of the one or more instances of sensing data. Additionally, the processor (150, 250, 350) calculates a positional relationship between the first target and the second target from the at least one of the one or more instances of sensing data when it is determined that the second target is present.

Additionally, the processor (150, 250, 350) determines a first position in accordance with the positional relationship. Here, the first position is a position of the unmanned moving body (100, 200, 300) that places the first target and the second target within a range over which sound from the directional speaker (107, 207, 307) reaches at at least a predetermined quality. The processor (150, 250, 350) then causes the unmanned moving body (100, 200, 300) to move to the first position.

Through this, the unmanned moving body (100, 200, 300) can emit sound appropriately to the first target and the second target. In other words, the unmanned moving body (100, 200, 300) can emit sound for a plurality of targets in an integrated manner.

(2) For example, an unmanned moving body (100, 200, 300) according to one aspect of the present disclosure includes a directional microphone (108, 208, 308) and a processor (150, 250, 350). The directional microphone (108, 208, 308) collects sound from an orientation direction.

The processor (150, 250, 350) obtains one or more instances of sensing data including data obtained from the directional microphone (108, 208, 308). Additionally, the processor (150, 250, 350) determines whether or not a second target is present in a vicinity of a first target in accordance with at least one of the one or more instances of sensing data. Additionally, the processor (150, 250, 350) calculates a positional relationship between the first target and the second target from the at least one of the one or more instances of sensing data when it is determined that the second target is present.

Additionally, the processor (150, 250, 350) determines a first position in accordance with the positional relationship. Here, the first position is a position of the unmanned moving body (100, 200, 300) that places the first target and the second target within a range over which sound is collected by the directional microphone (108, 208, 308) at at least a predetermined quality. The processor (150, 250, 350) then causes the unmanned moving body (100, 200, 300) to move to the first position.

Through this, the unmanned moving body (100, 200, 300) can collect sound appropriately from the first target and the second target. In other words, the unmanned moving body (100, 200, 300) can collected sound from a plurality of targets in an integrated manner.

(3) For example, the processor (150, 250, 350) adjusts the range in accordance with the positional relationship, and determines the first position in accordance with the range that has been adjusted. Here, the range is at least one of a range over which sound from the directional speaker (107, 207, 307) reaches at at least a predetermined quality or a range over which sound is collected by the directional microphone (108, 208, 308) at at least a predetermined quality.

Through this, the unmanned moving body (100, 200, 300) can appropriately adjust the range of sound emission or sound collection in accordance with the positional relationship, and can appropriately include a plurality of targets in the adjusted range.

(4) For example, the first position is a position on a front side of the first target and the second target. Through this, the unmanned moving body (100, 200, 300) can move to an appropriate position for conversing with a plurality of targets.

(5) For example, the processor (150, 250, 350) obtains body information of the first target and body information of the second target in accordance with at least one of the one or more instances of sensing data. Then, the processor (150, 250, 350) determines the first position in accordance with the body information of the first target and the body information of the second target. Through this, the unmanned moving body (100, 200, 300) can move to a position appropriate with respect to the body information of the first target and the body information of the second target.

(6) For example, the processor (150, 250, 350) estimates at least one of an age of the first target or an age of the second target in accordance with at least one of the one or more instances of sensing data. Then, the processor (150, 250, 350) determines the first position in accordance with the age of at least one of the first target or the second target.

Through this, the unmanned moving body (100, 200, 300) can move to a position close to a target presumed to have a low level of ability, and can appropriately emit sound to or collect sound from a plurality of targets.

(7) For example, the processor (150, 250, 350) determines the first position to be a position that does not place a third target unrelated to the first target and the second target within the range. Through this, the unmanned moving body (100, 200, 300) can suppress a situation in which sound is emitted to or collected from a third target which is unrelated.

(8) For example, the processor (150, 250, 350) detects a position of an obstruction in accordance with at least one of the one or more instances of sensing data, and determines the first position in accordance with the position of the obstruction. Through this, the unmanned moving body (100, 200, 300) can appropriately determine a position for emitting sound to or collecting sound from a plurality of targets in accordance with the position of an obstruction. Then, the unmanned moving body (100, 200, 300) can use the obstruction to suppress a situation in which sound is emitted to or collected from a third target which is unrelated.

(9) For example, when it is determined that the second target is present during a period in which sound is being emitted to or collected from the first target, the processor (150, 250, 350) causes the unmanned moving body (100, 200, 300) to move to the first position in a state in which the first target is within the range. Through this, the unmanned moving body (100, 200, 300) can move to a position appropriate for conversing with the first target and the second target while continuing a conversation with the first target.

(10) For example, when it is determined that the second target is present during a period in which sound is being emitted to or collected from the first target, the processor (150, 250, 350) causes the unmanned moving body (100, 200, 300) to move to the first position by passing on a front side of the first target. Through this, the unmanned moving body (100, 200, 300) can move to a position appropriate for conversing with the first target and the second target by passing through a region appropriate for having a conversation with the first target.

(11) For example, when it is determined that the second target is present during a period in which sound is being emitted to or collected from the first target, the processor (150, 250, 350) causes the unmanned moving body (100, 200, 300) to move to the first position while maintaining a constant quality of sound emitted to or collected from the first target.

Through this, the unmanned moving body (100, 200, 300) can move to a position appropriate for conversing with the first target and the second target while appropriately continuing a conversation with the first target.

(12) For example, the second target is a target related to the first target. The processor (150, 250, 350) obtains at least one of information indicating a relationship with the first target or information indicating a relationship with the unmanned moving body (100, 200, 300) from at least one of the one or more instances of sensing data.

Then, the processor (150, 250, 350) determines whether or not the second target is present in the vicinity of the first target by determining whether or not a target present in the vicinity of the first target is related to the first target in accordance with the at least one of the information indicating a relationship with the first target or the information indicating a relationship with the unmanned moving body (100, 200, 300).

Through this, the unmanned moving body (100, 200, 300) can appropriately determine whether or not a second target related to the first target is present in the vicinity of the first target.

(13) For example, the processor (150, 250, 350) detects a frequency at which the first target emits sound and a frequency at which the second target emits sound in accordance with at least one of the one or more instances of sensing data. Then, the processor (150, 250, 350) determines the first position closer to the one of the first target and the second target that emits sound at a higher frequency than the one that emits sound at a lower frequency.

Through this, the unmanned moving body (100, 200, 300) can move close to a target that emits sound at a high frequency. Accordingly, the unmanned moving body (100, 200, 300) can collect sound appropriately from the target that emits sound at a high frequency.

(14) For example, the processor (150, 250, 350) detects a volume of the first target and a volume of the second target in accordance with at least one of the one or more instances of sensing data. Then, the processor (150, 250, 350) determines the first position in such a manner that the first position is closer to one of the first target and the second target having a lower volume than an other of the first target and the second target.

Through this, the unmanned moving body (100, 200, 300) can move close to a target that has a low volume. Accordingly, the unmanned moving body (100, 200, 300) can collect sound appropriately from the target that has a low volume.

(15) For example, the unmanned moving body (100, 200, 300) including the directional speaker (107, 207, 307) and the processor (150, 250, 350) may further include a directional microphone (108, 208, 308). The range over which sound from the directional speaker (107, 207, 307) reaches at at least a predetermined quality is furthermore is a range over which sound is collected by the directional microphone (108, 208, 308) at at least a predetermined quality.

Through this, the unmanned moving body (100, 200, 300) can emit sound appropriately to the first target and the second target, and can collect sound appropriately from the first target and the second target.

(16) For example, the processor (150, 250, 350) controls a timing of the movement of the unmanned moving body (100, 200, 300) in accordance with a conversation between the first target and the unmanned moving body (100, 200, 300). Through this, the unmanned moving body (100, 200, 300) can move at an appropriate timing based on the conversation.

(17) For example, the processor (150, 250, 350) causes the unmanned moving body (100, 200, 300) to move to the first position during a period in which sound is being collected from the first target.

Through this, the unmanned moving body (100, 200, 300) can move during a period in which it is assumed that the first target is emitting sound and the unmanned moving body (100, 200, 300) is not emitting sound. Accordingly, the unmanned moving body (100, 200, 300) can suppress situations in which the second target enters the range of sound emission while sound is being emitted, and can ensure all content of the sound emission reaches the second target.

(18) For example, when sound emitted from the first target has stopped during the movement of the unmanned moving body (100, 200, 300), the processor (150, 250, 350) causes the directional speaker (107, 207, 307) to emit sound after the movement of the unmanned moving body (100, 200, 300) is complete.

Through this, the unmanned moving body (100, 200, 300) can start emitting sound after moving to a position appropriate for emitting sound to the first target and the second target. Accordingly, the unmanned moving body (100, 200,

300) can suppress situations in which the second target enters the range of sound emission while sound is being emitted, and can ensure all content of the sound emission reaches the second target.

(19) For example, the processor (150, 250, 350) causes the unmanned moving body (100, 200, 300) to move during a period in which no sound is being emitted to or collected from the first target. Through this, the unmanned moving body (100, 200, 300) can suppress fragmentation of the sound, and can emit or collect sound in complete units. The unmanned moving body (100, 200, 300) can also suppress situations in which noise produced by movement is intermixed.

(20) For example, the one or more instances of sensing data includes image data generated by an image sensor. The processor (150, 250, 350) obtains the positional relationship between the first target and the second target in accordance with the image data generated by the image sensor, Through this, the unmanned moving body (100, 200, 300) can appropriately obtain the positional relationship between the first target and the second target in accordance with the image data.

(21) For example, the one or more instances of sensing data includes range data generated by a range sensor. The processor (150, 250, 350) obtains the positional relationship between the first target and the second target in accordance with the range data generated by the range sensor. Through this, the unmanned moving body (100, 200, 300) can appropriately obtain the positional relationship between the first target and the second target in accordance with the range data.

(22) For example, the positional relationship includes at least one of a distance or a position pertaining to the first target and the second target. Through this, the unmanned moving body (100, 200, 300) can move to an appropriate position in accordance with the distance or the position pertaining to the first target and the second target.

(23) For example, in an information processing method according to one aspect of the present disclosure, one or more instances of sensing data are obtained (S101). Additionally, whether or not a second target is present in a vicinity of a first target is determined in accordance with at least one of the one or more instances of sensing data (S102). Additionally, a positional relationship between the first target and the second target is calculated from at least one of the one or more instances of sensing data when it is determined that the second target is present (S103).

Additionally, the first position is determined in accordance with the positional relationship. Here, the first position is a position of an unmanned moving body (100, 200, 300) that places the first target and the second target within a range over which sound from a directional speaker (107, 207, 307) included in the unmanned moving body (100, 200, 300) reaches at at least a predetermined quality. The unmanned moving body (100, 200, 300) is then caused to move to the first position (S104).

Through this, sound can be emitted appropriately to the first target and the second target by performing the information processing method. In other words, sound can be emitted to a plurality of targets in an integrated manner.

(24) For example, a program according to one aspect of the present disclosure is a program that causes a computer to execute the information processing method. Through this, sound can be emitted appropriately to the first target and the second target by executing the program. In other words, sound can be emitted to a plurality of targets in an integrated manner.

(25) For example, in an information processing method according to one aspect of the present disclosure, one or more instances of sensing data are obtained (S201). Additionally, whether or not a second target is present in a vicinity of a first target is determined in accordance with at least one of the one or more instances of sensing data (S202). Additionally, a positional relationship between the first target and the second target is calculated from at least one of the one or more instances of sensing data when it is determined that the second target is present (S203).

Additionally, the first position is determined in accordance with the positional relationship, Here, the first position is a position of an unmanned moving body (100, 200, 300) that places the first target and the second target within a range over which sound is collected by a directional microphone (108, 208, 308) included in the unmanned moving body (100, 200, 300) at at least a predetermined quality. The unmanned moving body (100, 200, 300) is then caused to move to the first position (S204).

Through this, sound can be collected appropriately from the first target and the second target by performing the information processing method. In other words, sound can be collected from a plurality of targets in an integrated manner.

(26) For example, a program according to one aspect of the present disclosure is a program that causes a computer to execute the information processing method. Through this, sound can be collected appropriately from the first target and the second target by executing the program. In other words, sound can be collected from a plurality of targets in an integrated manner.

Although the position of the unmanned moving body is determined based on the sound emission range of the speaker or the sound collection range of the microphone in the foregoing embodiments, another presentation device may be used as long as it is a presentation device that presents directly to a target, in the same manner as a speaker. A display is an example of such a presentation device. In other words, the present disclosure is not limited to sound, and can be applied to other information transmission media such as light or the like.

INDUSTRIAL APPLICABILITY

The present disclosure can be used in an unmanned moving body or the like that converses with a conversation partner, and can be applied in a guidance system, a guardian system, or the like.

The invention claimed is:

1. An unmanned moving body, comprising:
a directional speaker that outputs sound in an orientation direction; and
a processor,
wherein the processor:
obtains one or more instances of sensing data,
determines whether or not a second target is present in a vicinity of a first target in accordance with at least one of the one or more instances of sensing data,
calculates a positional relationship between the first target and the second target from at least one of the one or more instances of sensing data when it is determined that the second target is present,
determines a first position of the unmanned moving body in accordance with the positional relationship and causes the unmanned moving body to move to the first position, the first position being a position that places the first target and the second target within a range over which the sound from the directional speaker reaches at at least a predetermined quality, and when the processor determines that the second target is present during a period in which the directional speaker is emitting sound to the first target:
 (i) causes the unmanned moving body to move to the first position by passing on a front side of the first target; or
 (ii) causes the unmanned moving body to move to the first position while maintaining a constant quality of sound emitted to the first target.

2. The unmanned moving body according to claim 1, wherein the processor adjusts the range in accordance with the positional relationship, and determines the first position in accordance with the range that has been adjusted.

3. The unmanned moving body according to claim 1, wherein the first position is a position on a front side of the first target and the second target.

4. The unmanned moving body according to claim 1, wherein the processor:
obtains body information of the first target and body information of the second target in accordance with at least one of the one or more instances of sensing data, and
determines the first position in accordance with the body information of the first target and the body information of the second target.

5. The unmanned moving body according to claim 1, wherein the processor:
estimates at least one of an age of the first target or an age of the second target in accordance with at least one of the one or more instances of sensing data, and
determines the first position in accordance with at least one of the age of the first target or the age of the second target.

6. The unmanned moving body according to claim 1, wherein the processor determines the first position to be a position that does not place a third target unrelated to the first target and the second target within the range.

7. The unmanned moving body according to claim 6, wherein the processor detects a position of an obstruction in accordance with at least one of the one or more instances of sensing data, and determines the first position in accordance with the position of the obstruction.

8. The unmanned moving body according to claim 1, wherein when the processor determines that the second target is present during a period in which the directional speaker is emitting sound to the first target, the processor causes the unmanned moving body to move to the first position in a state in which the first target is within the range.

9. The unmanned moving body according to claim 1, wherein the second target is a target related to the first target, and
the processor:
obtains at least one of information indicating a relationship with the first target or information indicating a relationship with the unmanned moving body from at least one of the one or more instances of sensing data, and
determines whether or not the second target is present in the vicinity of the first target by determining whether or not a target present in the vicinity of the first target is related to the first target in accordance with the at least one of the information indicating a relationship with the first target or the information indicating a relationship with the unmanned moving body.

10. The unmanned moving body according to claim 1, wherein the directional speaker outputs sound in the orientation direction with a directional width, and
the first position is (i) not between the first target and the second target, and is a position on a lateral side of the first target and the second target, and (ii) a location of the unmanned moving body that places the first target and the second target within the orientation width of the orientation direction.

11. An unmanned moving body, comprising:
a directional speaker that outputs sound in an orientation direction;
a directional microphone; and
a processor,
wherein the processor:
 obtains one or more instances of sensing data,
 determines whether or not a second target is present in a vicinity of a first target in accordance with at least one of the one or more instances of sensing data,
 calculates a positional relationship between the first target and the second target from at least one of the one or more instances of sensing data when it is determined that the second target is present,
 determines a first position of the unmanned moving body in accordance with the positional relationship and causes the unmanned moving body to move to the first position, the first position being a position that places the first target and the second target within a range over which the sound from the directional speaker reaches at at least a predetermined quality and sound is collected by the directional microphone at at least a predetermined quality,
 controls a timing of movement of the unmanned moving body in accordance with a conversation between the first target and the unmanned moving body, and
 (i) causes the unmanned moving body to start moving during a period in which sound is being collected from the first target, or
 (ii) causes the unmanned moving body to move during a period in which no sound is being emitted to or collected from the first target.

12. The unmanned moving body according to claim 11, wherein the processor causes the unmanned moving body to start moving during a period in which the sound is being collected from the first target, and
when sound emitted from the first target has stopped before the movement of the unmanned moving body to the first position is complete, the processor further causes the directional speaker to emit sound after the movement of the unmanned moving body to the first position is complete.

13. An information processing method comprising:
obtaining one or more instances of sensing data;
determining whether or not a second target is present in a vicinity of a first target in accordance with at least one of the one or more instances of sensing data;
calculating a positional relationship between the first target and the second target from at least one of the one or more instances of sensing data when it is determined that the second target is present;
determining a first position of an unmanned moving body in accordance with the positional relationship and causing the unmanned moving body to move to the first position, the first position being a position that places the first target and the second target within a range over which sound from a directional speaker included in the unmanned moving body reaches at at least a predetermined quality; and when it is determined that the second target is present during a period in which the directional speaker is emitting sound to the first target:
  (i) causing the unmanned moving body to move to the first position by passing on a front side of the first target; or
  (ii) causing the unmanned moving body to move to the first position while maintaining a constant quality of sound emitted to the first target.

14. An information processing method comprising:
obtaining one or more instances of sensing data;
determining whether or not a second target is present in a vicinity of a first target in accordance with at least one of the one or more instances of sensing data;
calculating a positional relationship between the first target and the second target from at least one of the one or more instances of sensing data when it is determined that the second target is present;
determining a first position of an unmanned moving body in accordance with the positional relationship and causing the unmanned moving body to move to the first position, the first position being a position that places the first target and the second target within a range over which the sound from a directional speaker included in the unmanned moving body reaches at at least a predetermined quality and sound is collected by a directional microphone included in the unmanned moving body at at least a predetermined quality;
controlling a timing of movement of the unmanned moving body in accordance with a conversation between the first target and the unmanned moving body; and
(i) causing the unmanned moving body to start moving during a period in which sound is being collected from the first target, or
(ii) causing the unmanned moving body to move during a period in which no sound is being emitted to or collected from the first target.

* * * * *